(12) United States Patent
Ohno et al.

(10) Patent No.: US 7,286,259 B2
(45) Date of Patent: Oct. 23, 2007

(54) SELF-SCANNED LIGHT-EMITTING DEVICE ARRAY, ITS DRIVING METHOD, AND DRIVING CIRCUIT

(75) Inventors: Seiji Ohno, Osaka (JP); Shuya Ogi, Osaka (JP)

(73) Assignee: Fuji Xerox Co., Ltd., Tokyo (JP)

( * ) Notice: Subject to any disclaimer, the term of this patent is extended or adjusted under 35 U.S.C. 154(b) by 1151 days.

(21) Appl. No.: 10/363,611

(22) PCT Filed: Sep. 4, 2001

(86) PCT No.: PCT/JP01/07633

§ 371 (c)(1),
(2), (4) Date: Mar. 4, 2003

(87) PCT Pub. No.: WO02/20272

PCT Pub. Date: Mar. 14, 2002

(65) Prior Publication Data

US 2004/0046976 A1    Mar. 11, 2004

(30) Foreign Application Priority Data

| Sep. 5, 2000 | (JP) | 2000-267949 |
| Sep. 28, 2000 | (JP) | 2000-295553 |
| Oct. 25, 2000 | (JP) | 2000-325462 |
| Nov. 6, 2000 | (JP) | 2000-337233 |
| Nov. 16, 2000 | (JP) | 2000-349462 |

(51) Int. Cl.
*G06F 15/00* (2006.01)
*H04N 1/46* (2006.01)
*G06K 1/00* (2006.01)

(52) U.S. Cl. ............ 358/1.8; 347/237; 347/241; 347/238; 347/129; 345/82; 345/81; 315/169.1; 315/169.3; 369/121; 358/509

(58) Field of Classification Search ........... 358/1.13, 358/509, 1.8; 372/50.124; 345/82
See application file for complete search history.

(56) References Cited

U.S. PATENT DOCUMENTS

| 5,969,744 A | * 10/1999 | Sakashita et al. ........... 347/237 |
| 6,262,758 B1 | * 7/2001 | Suzuki et al. ............... 347/237 |
| 6,710,794 B1 | * 3/2004 | Yamazaki et al. .......... 347/237 |

FOREIGN PATENT DOCUMENTS

| JP | 10-114101 A | 5/1998 |
| JP | 11-198429 A | 7/1999 |

OTHER PUBLICATIONS

International Search Report, Nov. 20, 2001.

* cited by examiner

*Primary Examiner*—Twyler Lamb
*Assistant Examiner*—Neil R. McLean
(74) *Attorney, Agent, or Firm*—RatnerPrestia

(57) ABSTRACT

A method for driving a self-scanning light-emitting element array is provided in which two light-emitting elements may be illuminated simultaneously in one chip. In a self-scanning light-emitting element array including a transfer element array and light-emitting element array, a magnitude of the write signal for illuminating adjacent two light-emitting elements simultaneously is two times that of the write signal for illuminating one light-emitting element. The self-scanning light-emitting element array is composed of a plurality of self-scanning light-emitting element array chips arranged in a linear manner, and the two-phase clock pulses are applied commonly to the plurality of self-scanning light-emitting element array chips.

37 Claims, 43 Drawing Sheets

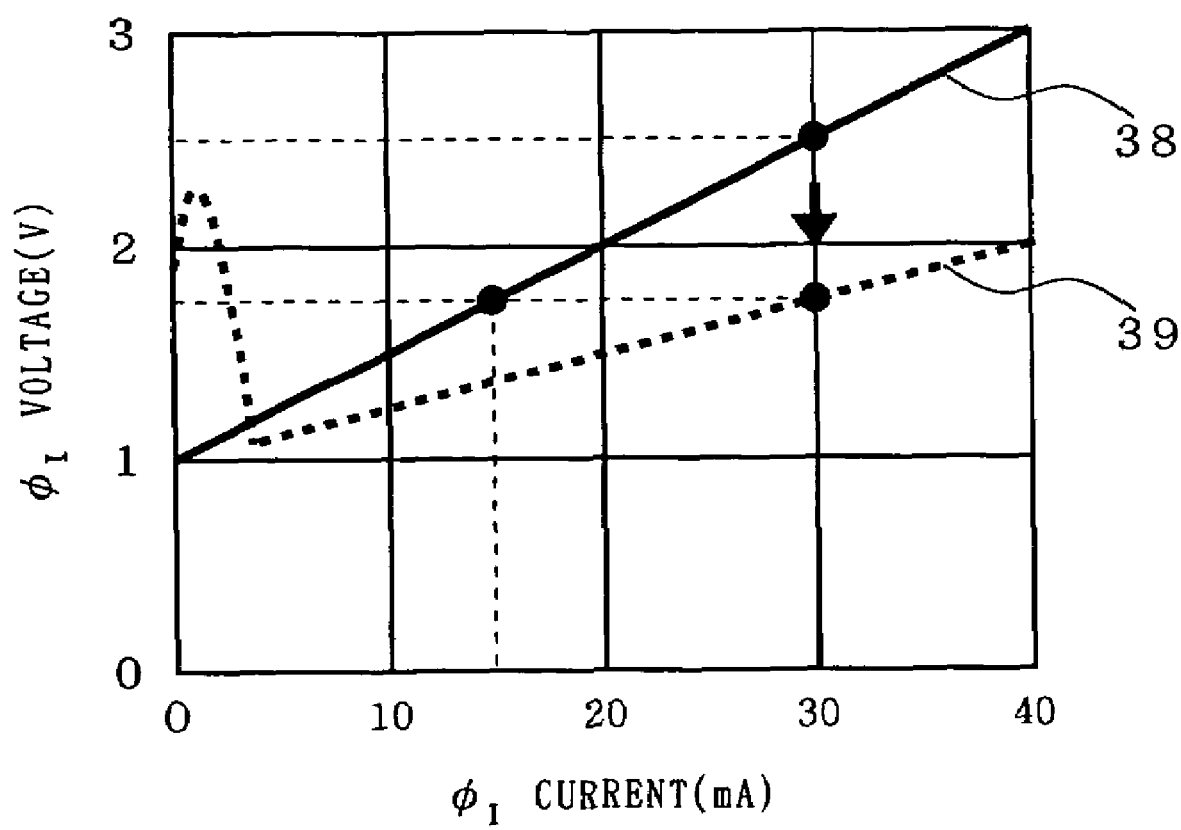
F I G. 1 1

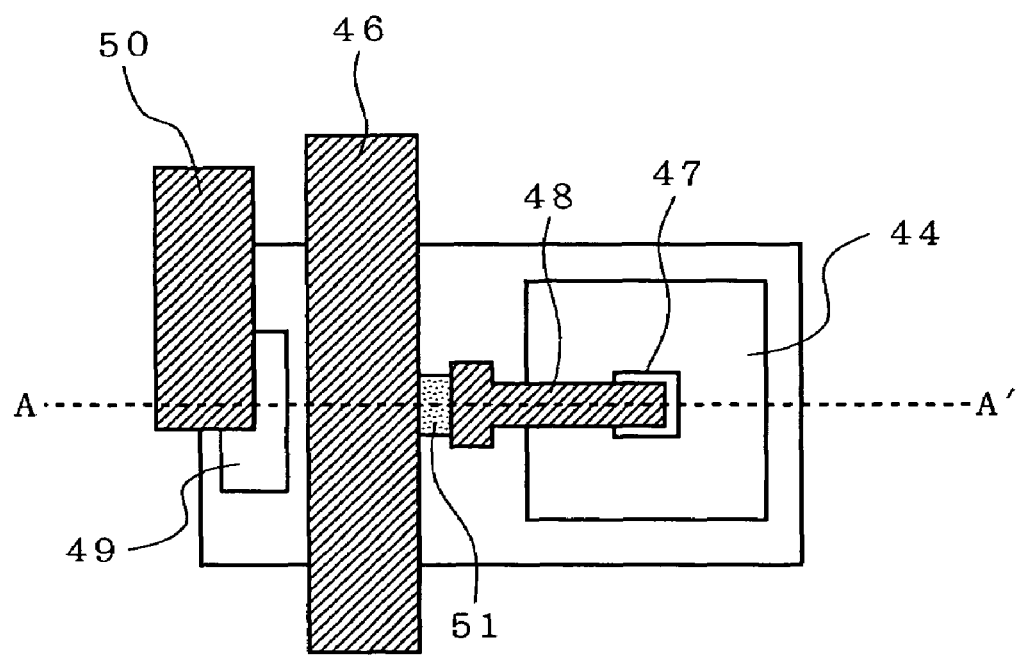
F I G . 1 2 A
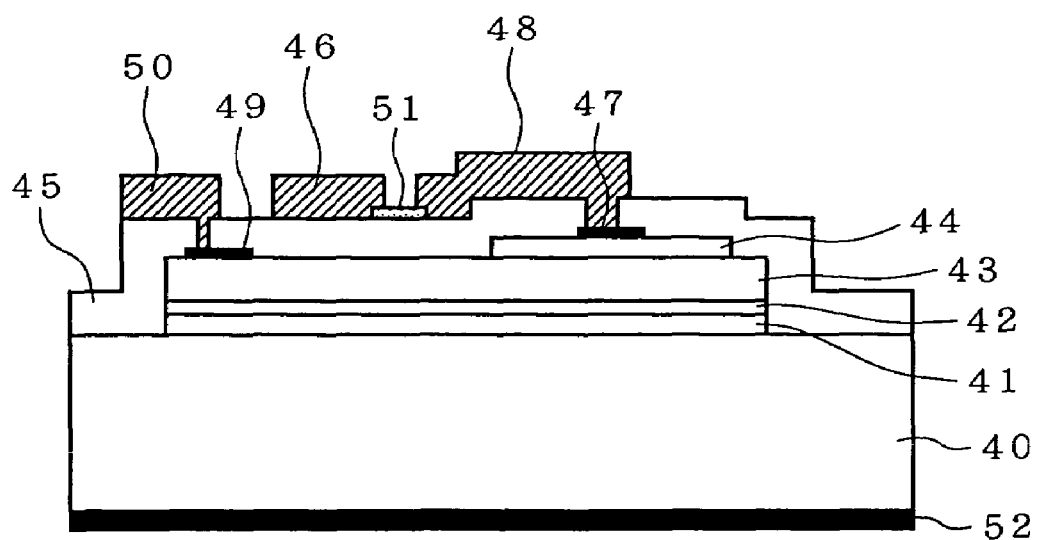
F I G . 1 2 B

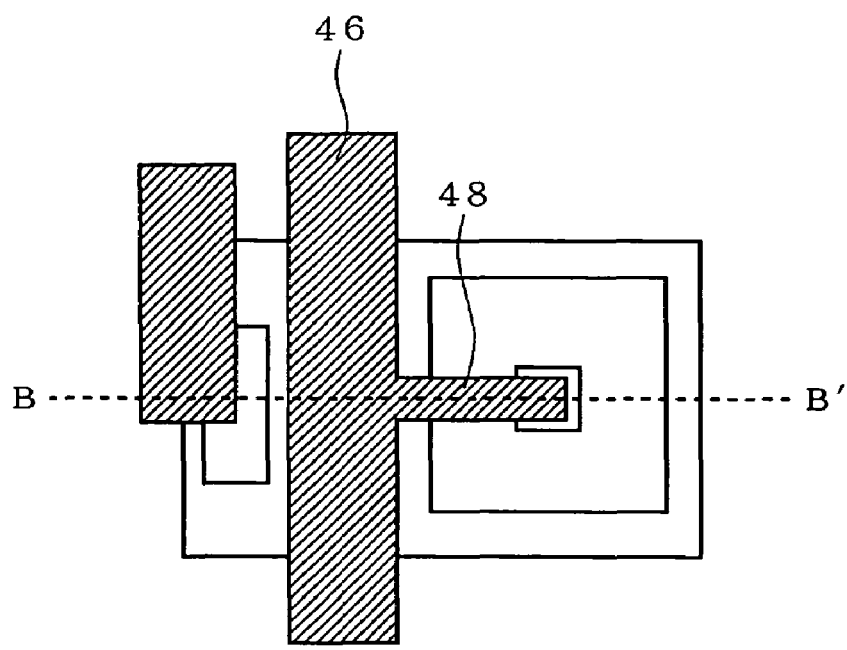
F I G. 1 3 A
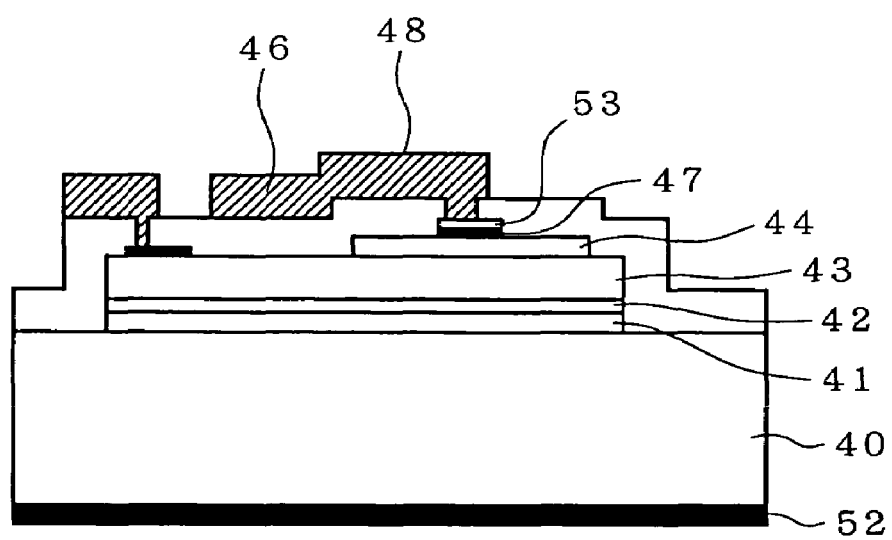
F I G. 1 3 B

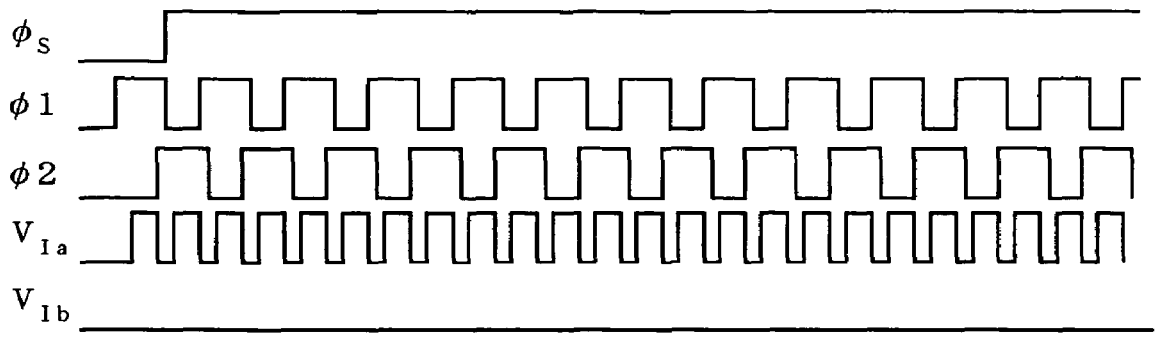
F I G . 1 4 A
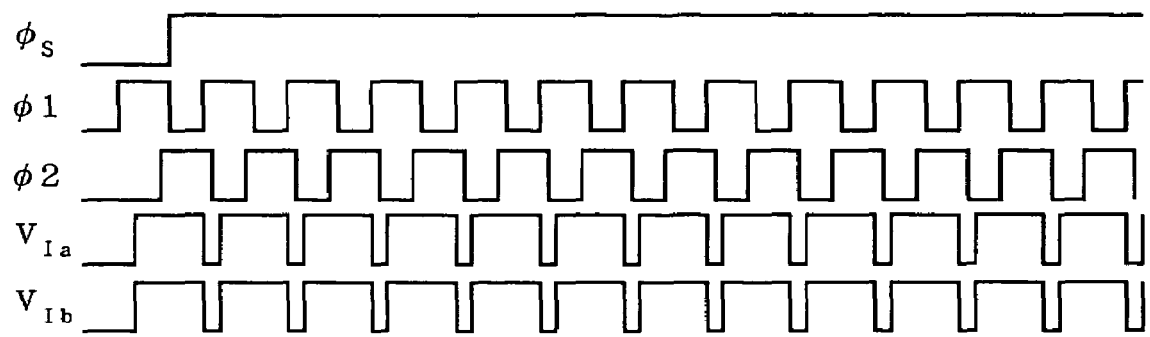
F I G . 1 4 B

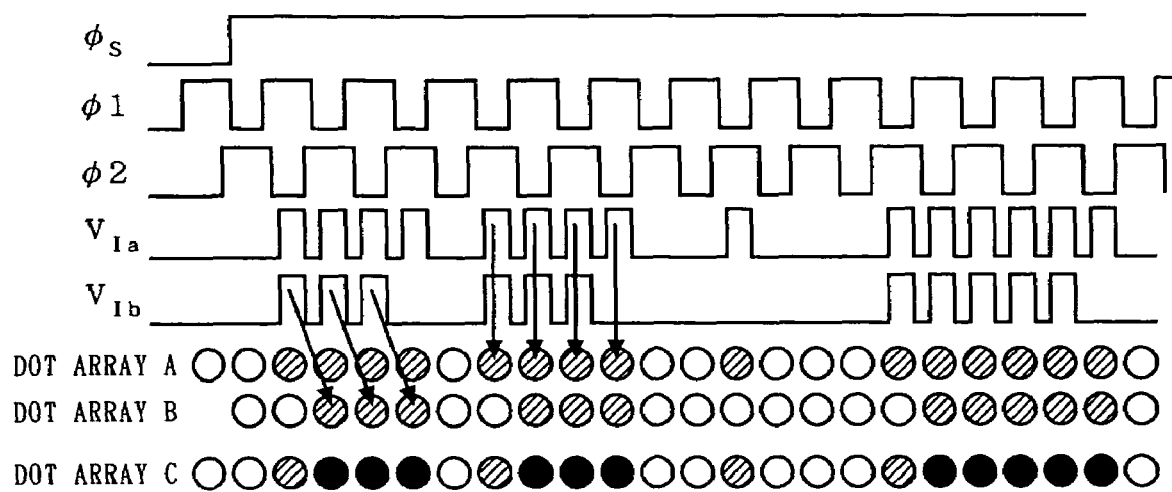
F I G . 1 5

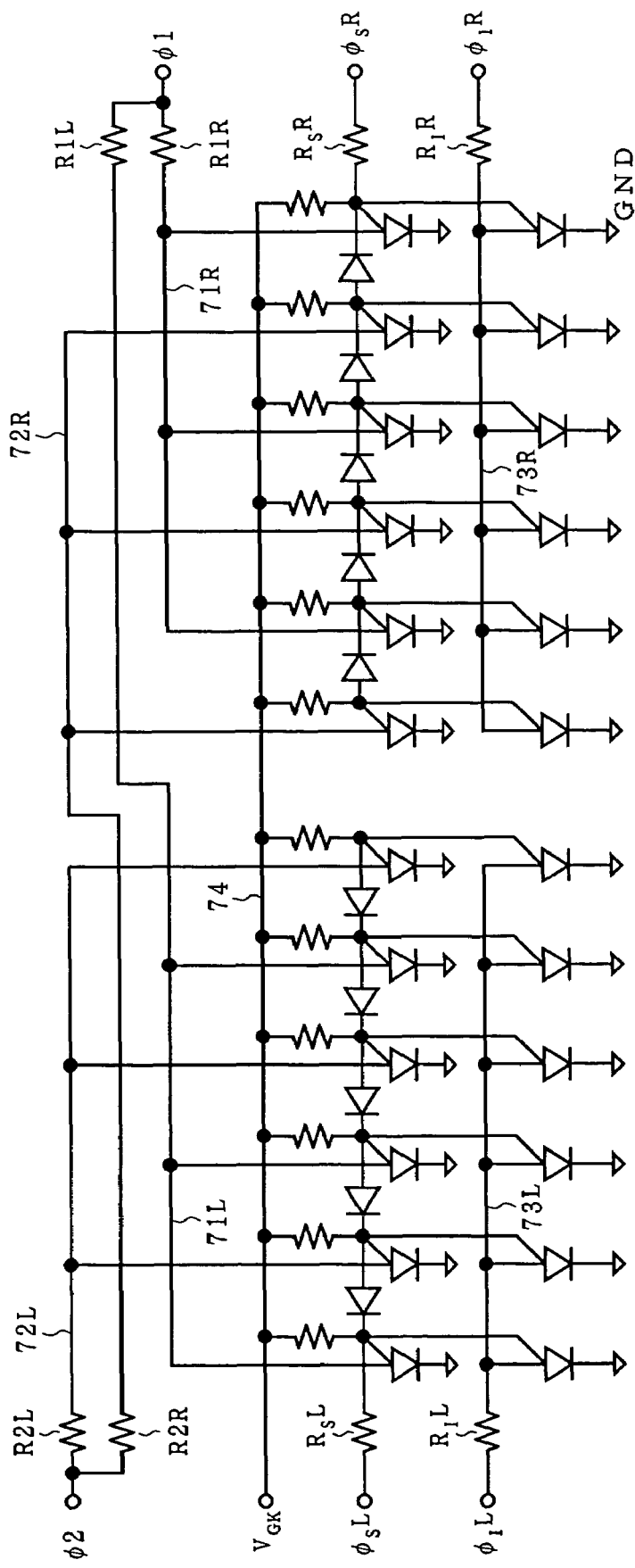
F I G. 19

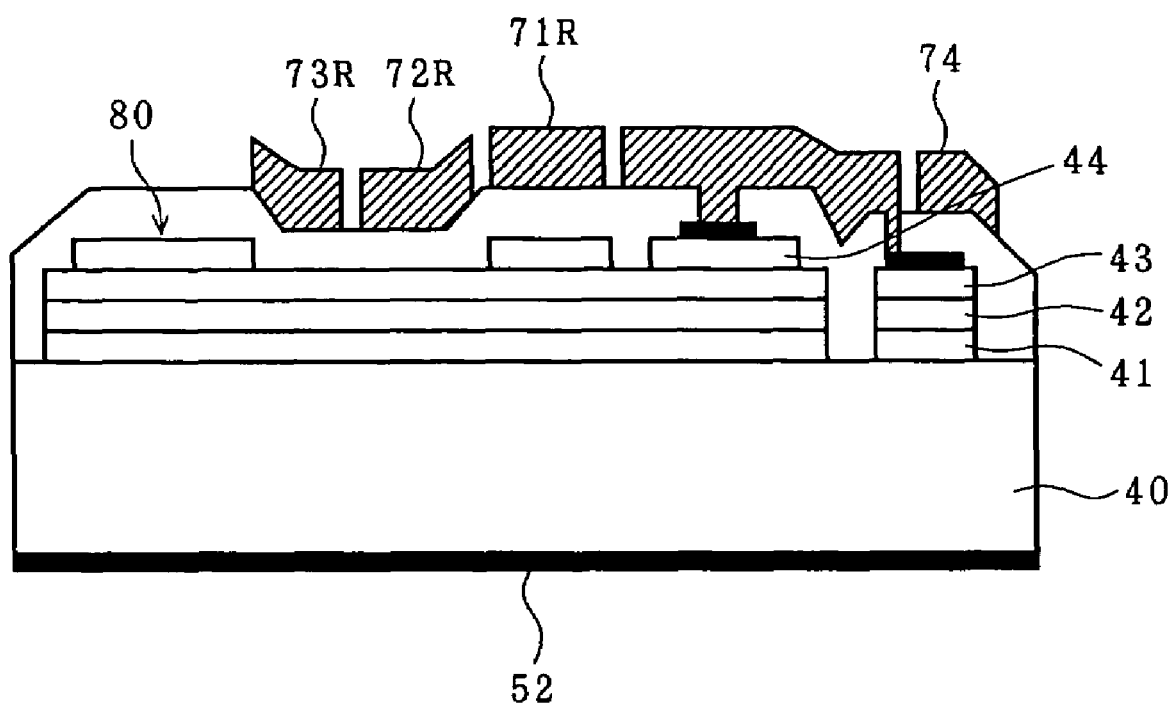
F I G. 2 4

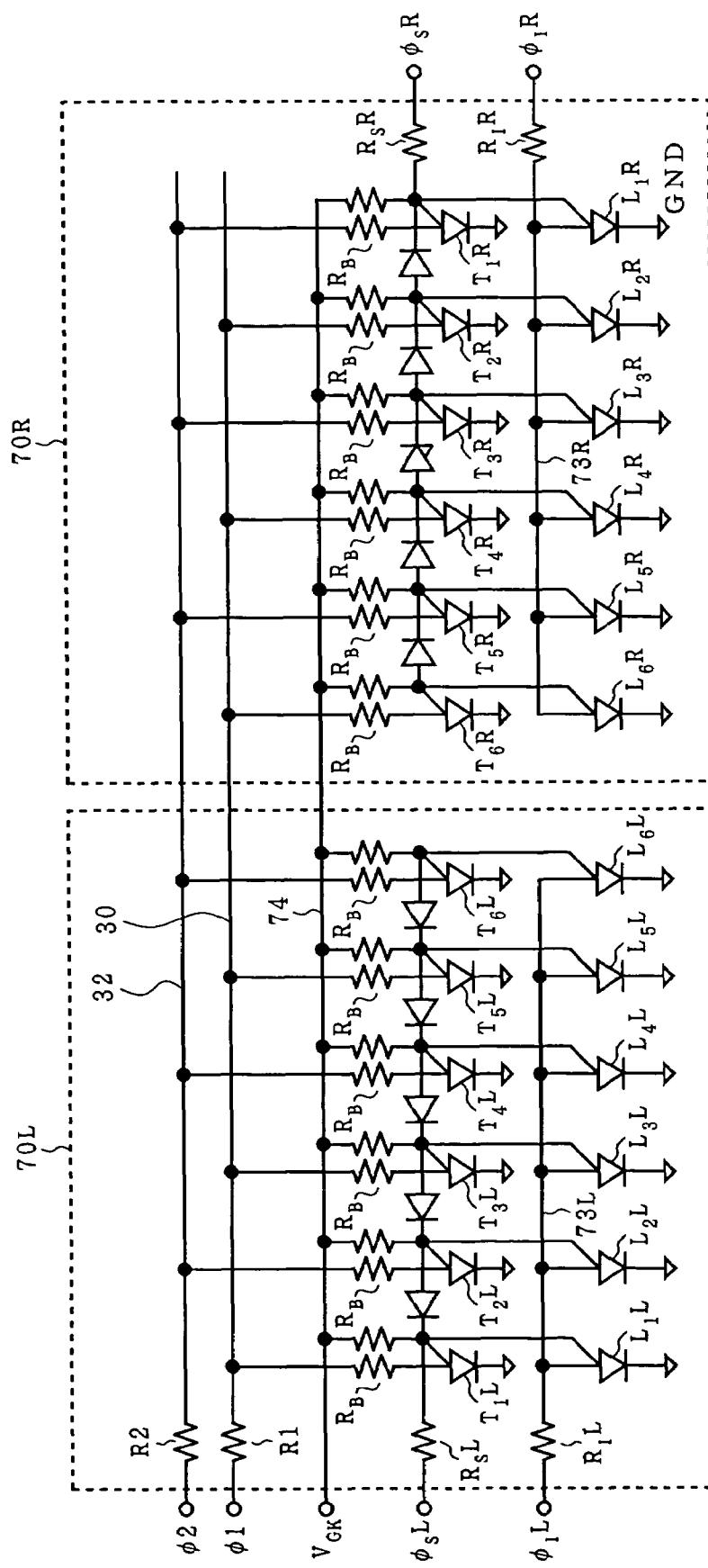
F I G . 2 5

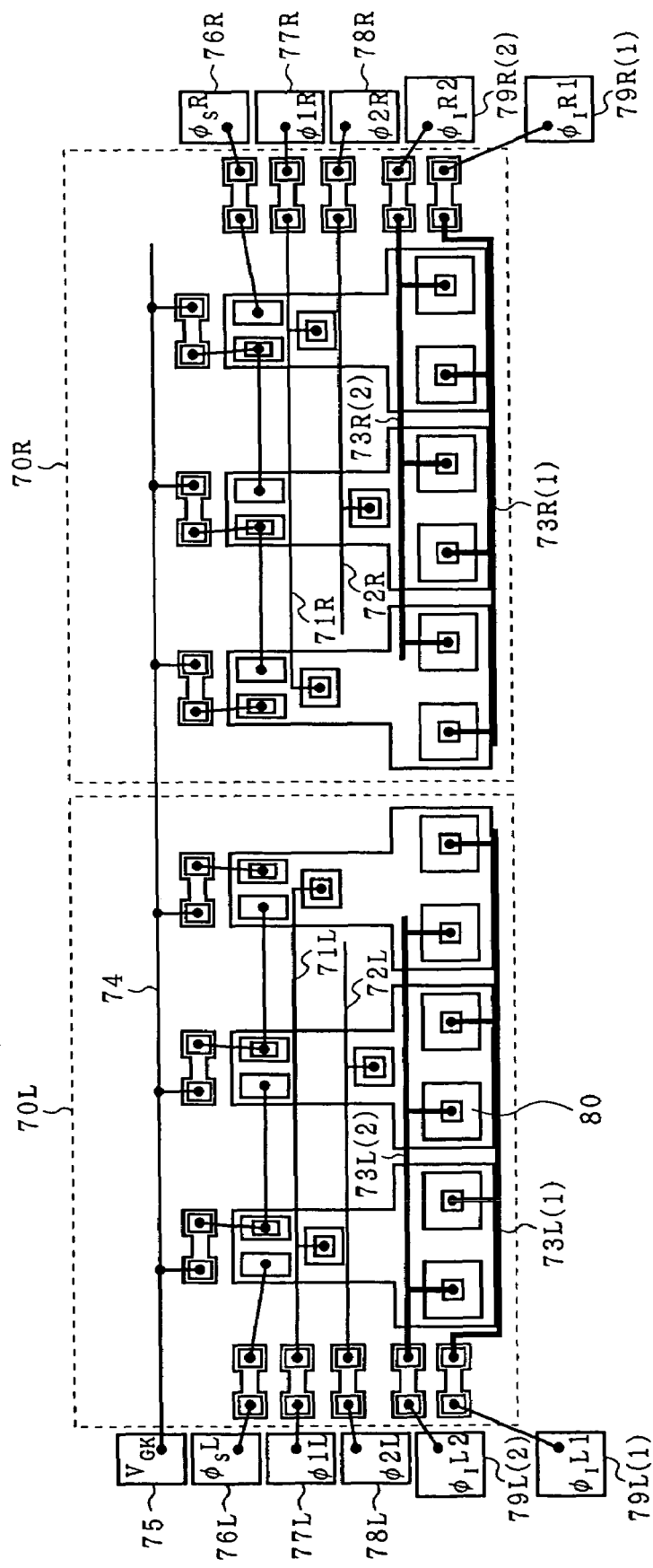
F I G . 3 0

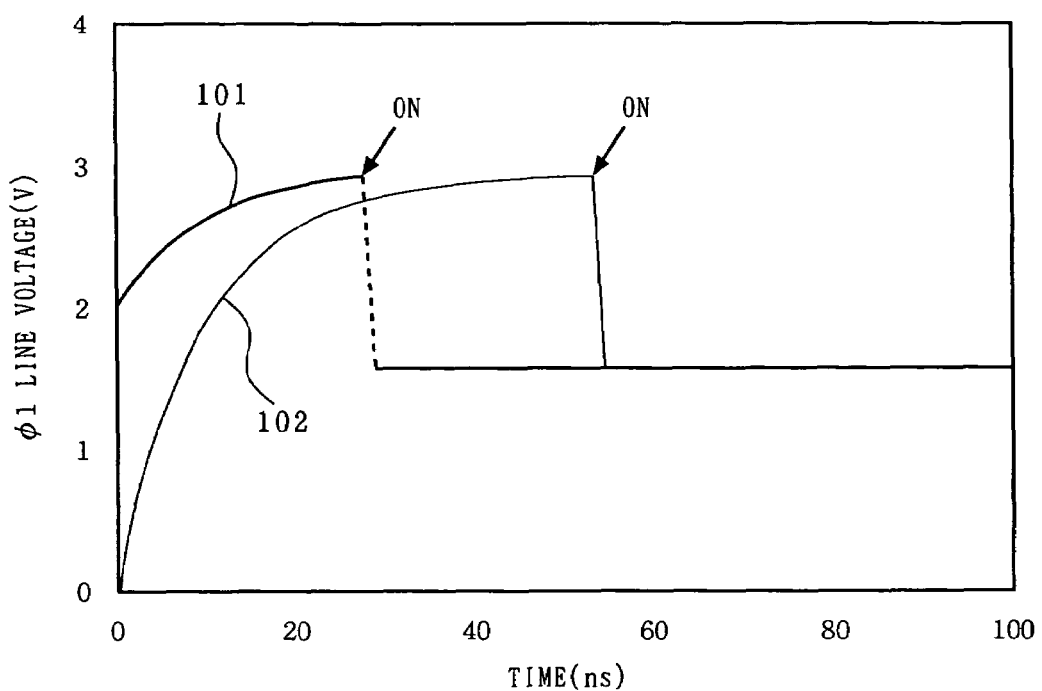
F I G . 3 1
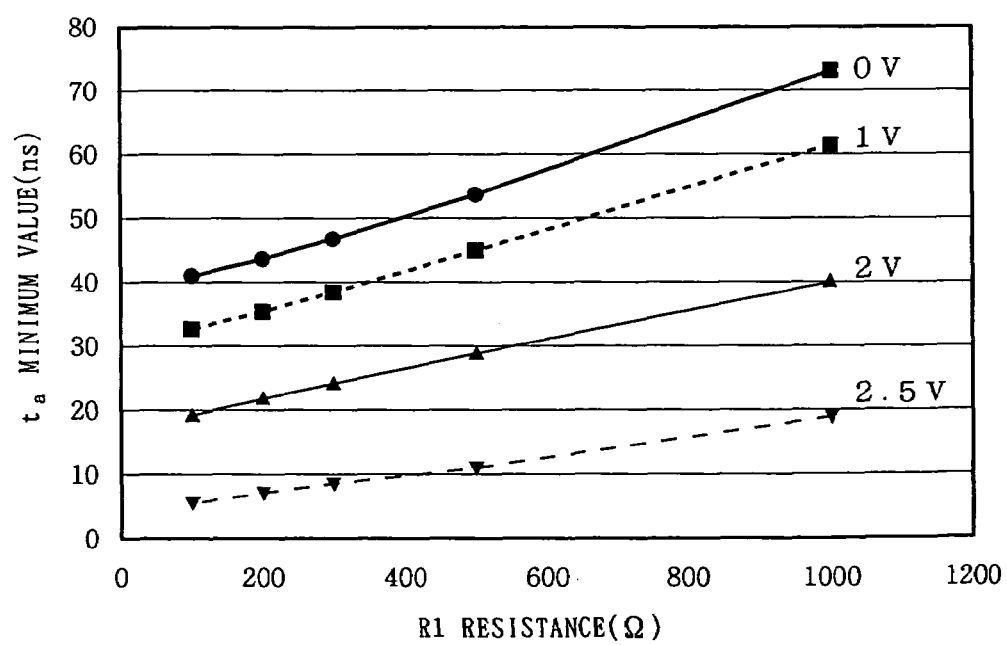
F I G . 3 2

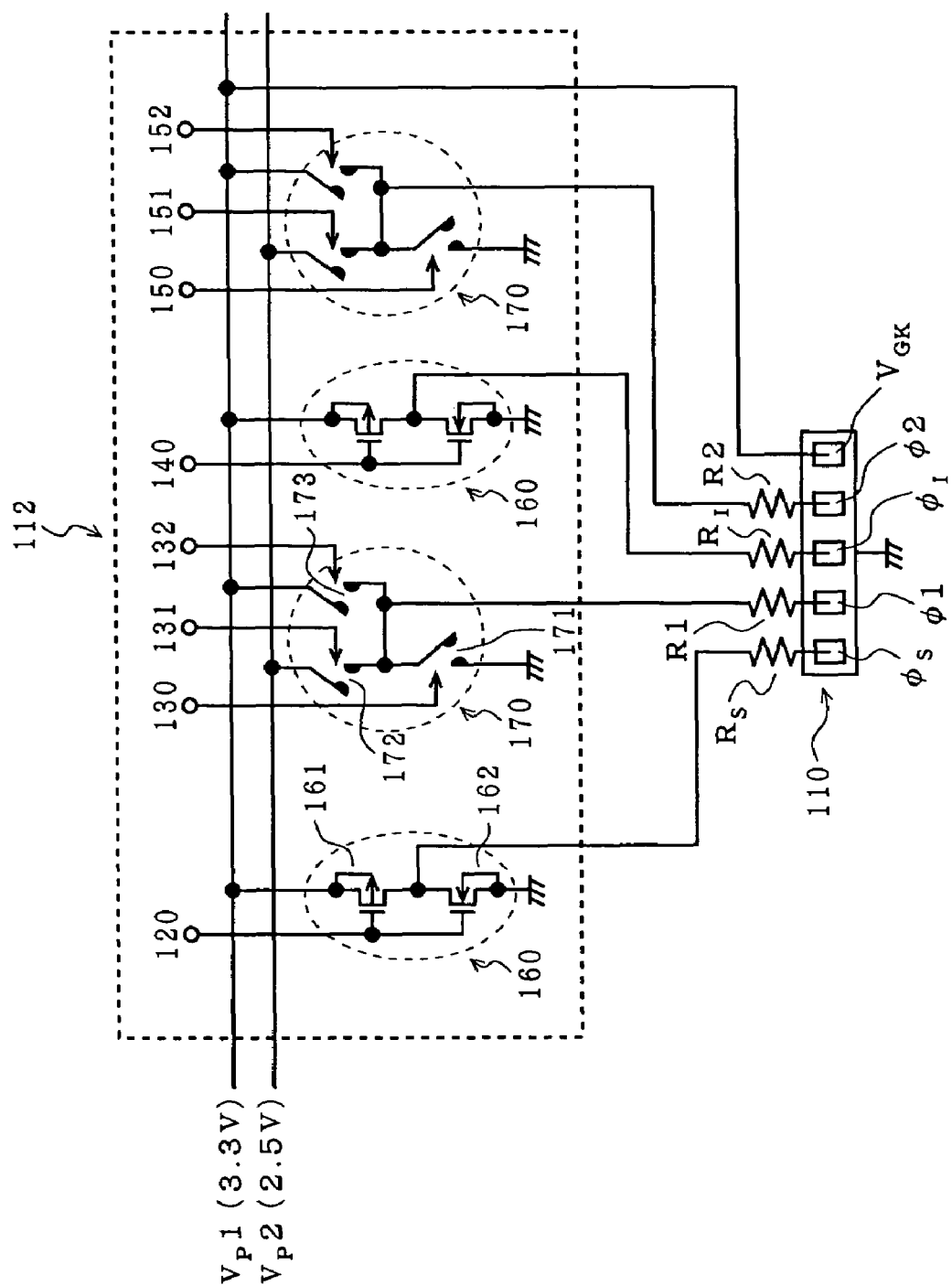
F I G. 3 3

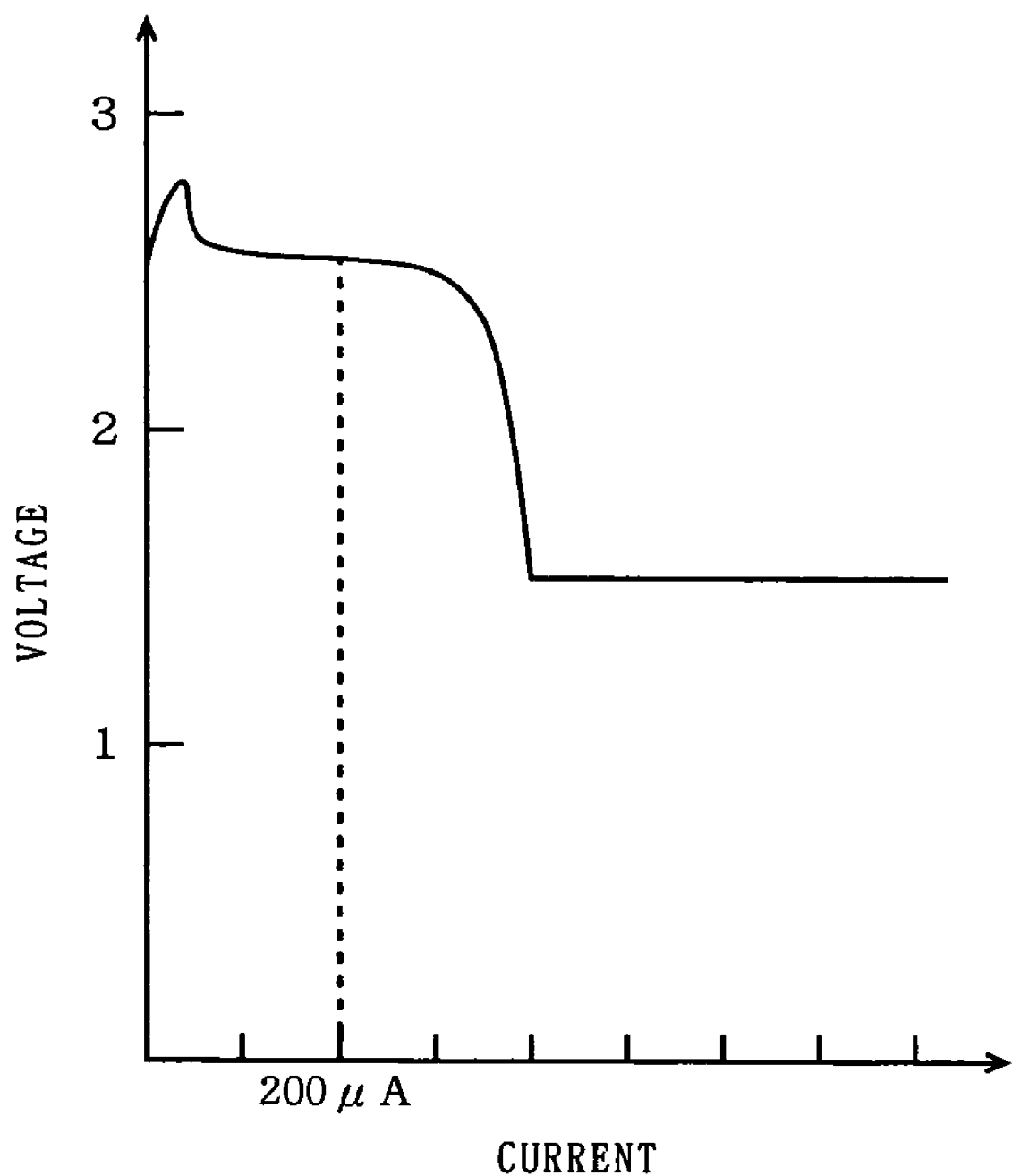
F I G. 3 9

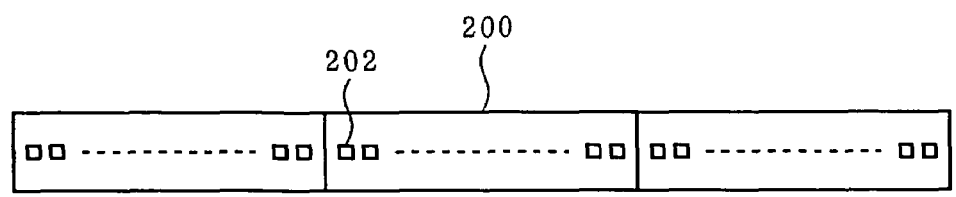
F I G. 4 1 A
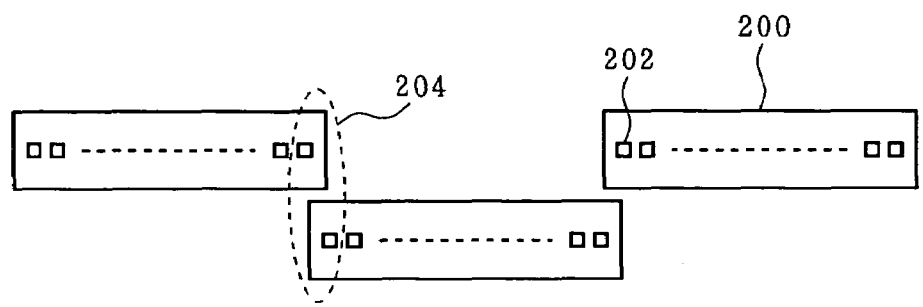
F I G. 4 1 B
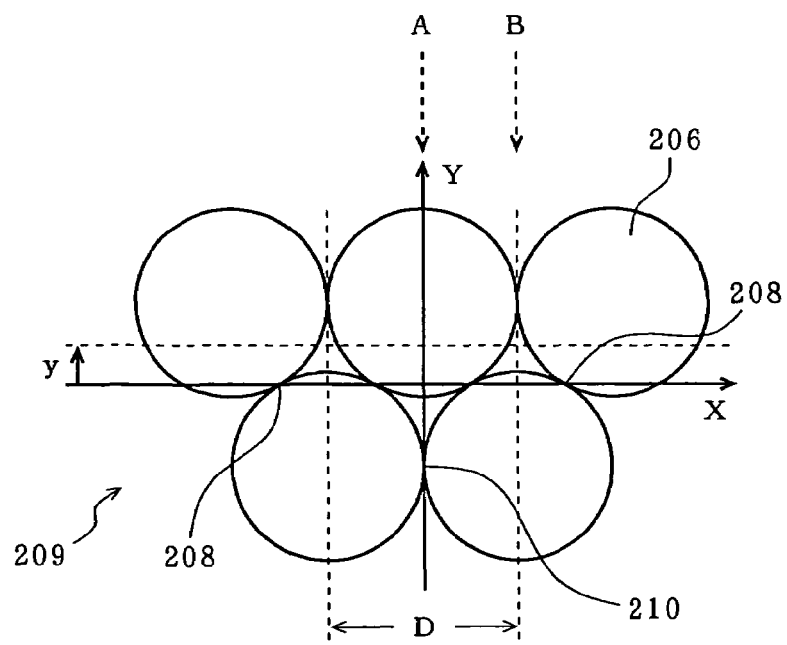
F I G. 4 2

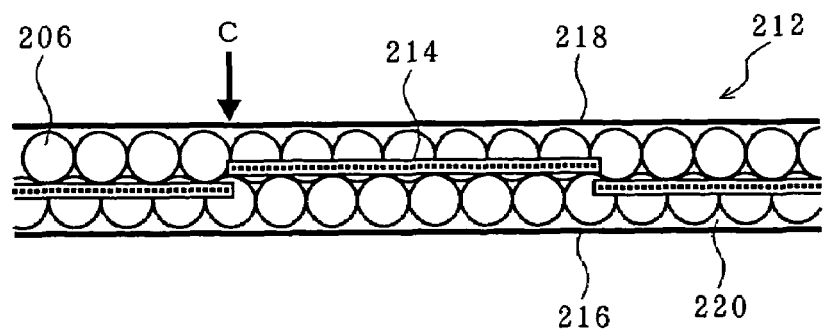
F I G. 4 5
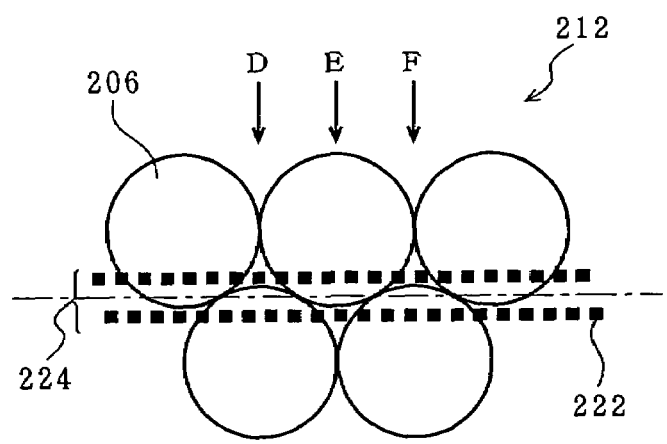
F I G. 4 6
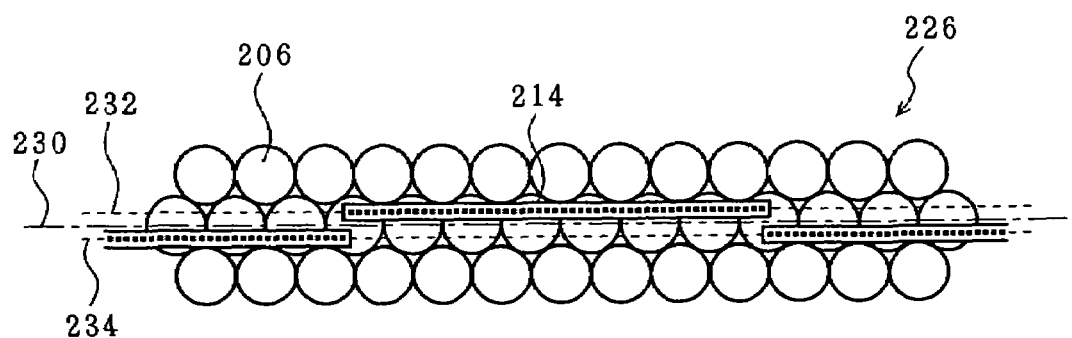
F I G. 4 7

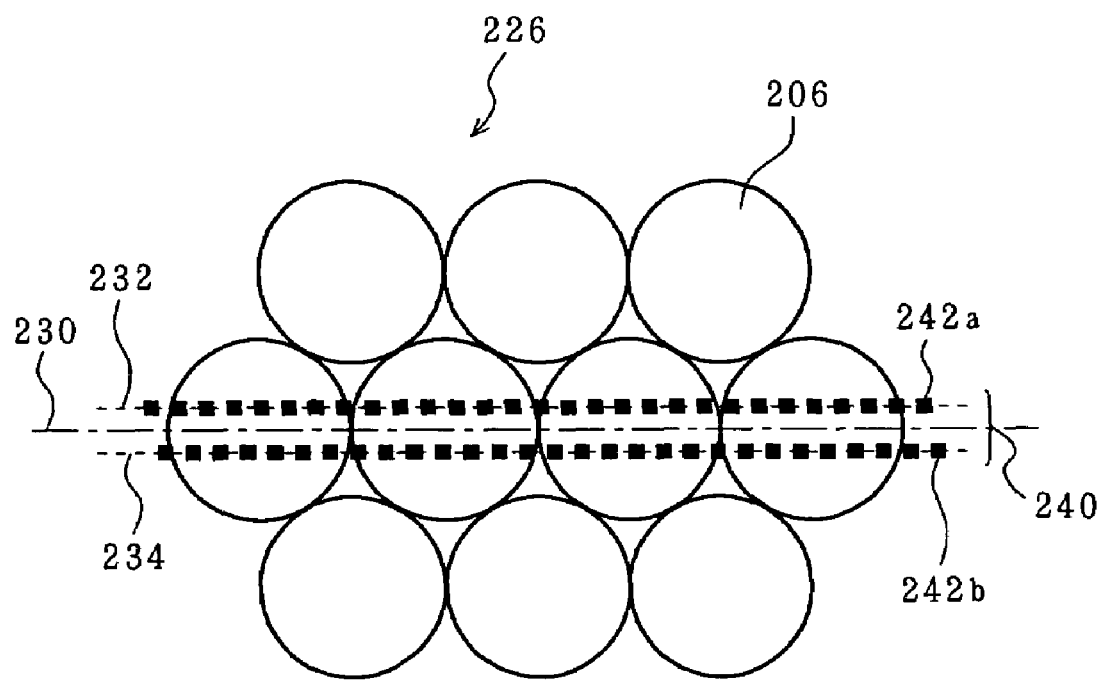
F I G. 4 8
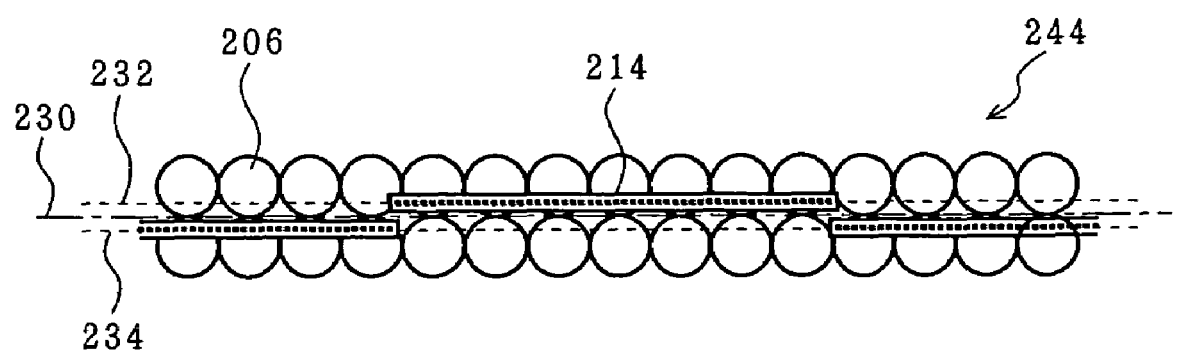
F I G. 4 9

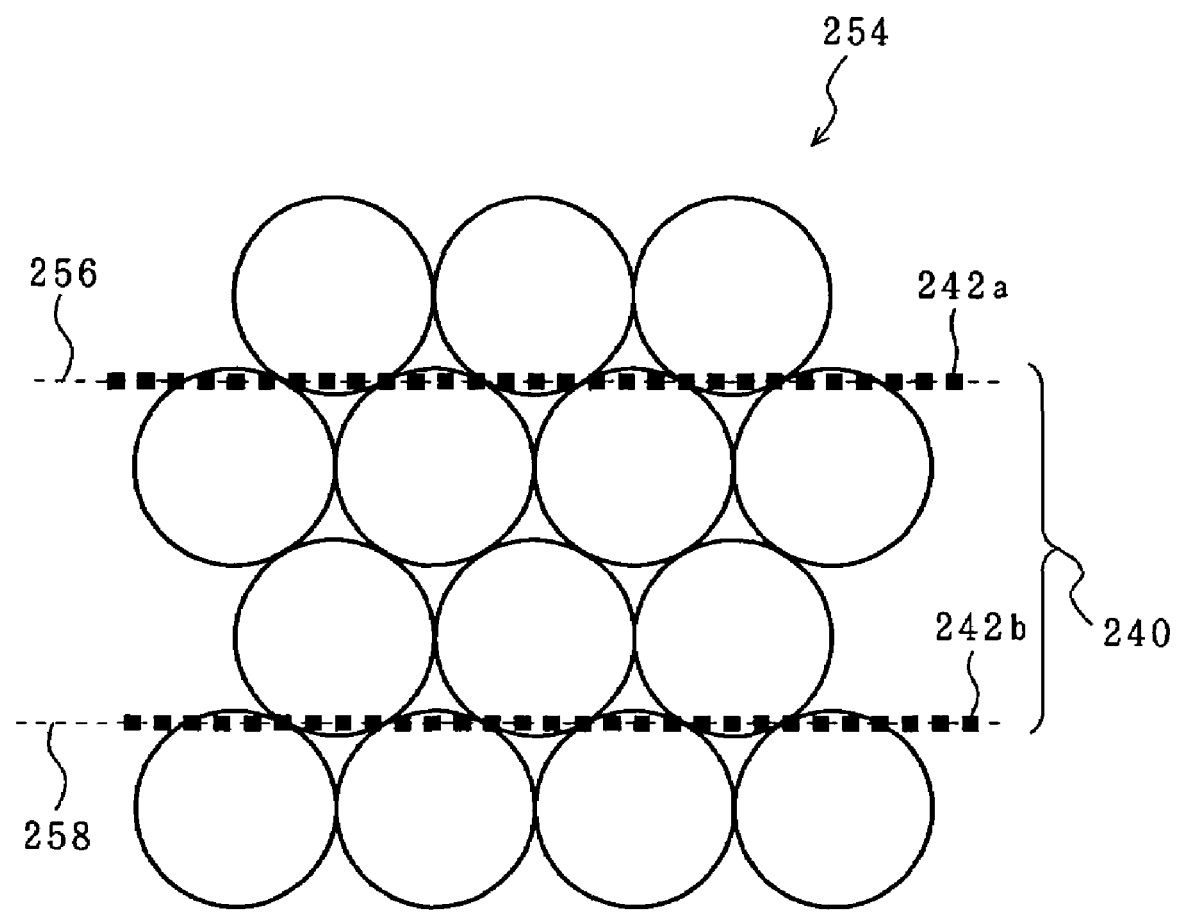
F I G. 5 2

SELF-SCANNED LIGHT-EMITTING DEVICE ARRAY, ITS DRIVING METHOD, AND DRIVING CIRCUIT

TECHNICAL FIELD

The present invention relates to a self-scanning element array, and a method and circuit for driving a self-scanning light-emitting element array. The present invention further relates to an optical writing head including a self-scanning light-emitting element array.

BACKGROUND ART

A writing head of an optical printer (hereinafter referred to as an optical writing head) is a light source for exposing a photosensitive drum and comprises a light-emitting element array. The structure of an optical printer including an optical writing head is shown in FIG. 1. An optically conductive material (photosensitive material) such as amorphous Si is provided on the surface of a cylindrical drum 2, which is rotated at printing speed. The surface of the photosensitive material is uniformly charged with an electrostatic charger 4. Then, light corresponding to a dot image being printed is projected by an optical writing head 6 onto the surface of the photosensitive material to neutralize the charge on the area to which the light is projected to form a latent image. Next, a developer 8 deposits the toner on the photosensitive material surface in accordance with the charged pattern on the photosensitive material surface. A transfer unit 10 transfers the toner on a paper sheet 14 fed from a cassette 12. The toner on the paper sheet is thermally fixed by the heat applied by a fixer 16, and the paper sheet is sent to a stacker 18. Upon completion of transfer, on the other hand, the charge on the drum is neutralized over the entire surface with an erasing lamp 20, and the remaining toner is removed by a cleaner 22.

The construction of the optical writing head 6 is shown in FIG. 2. This optical writing head comprises a light-emitting element array 24 and a rod-lens array 26 which is an erected image, unity magnification optical system, and the lens is adapted so as to focus on the photosensitive drum 2.

The inventors of the present invention have interested in a three-terminal light-emitting thyristor having a pnpn-structure as an element of the self-scanning light-emitting device, and have already filed several patent applications (see Japanese Patent Publication Nos. 1-238962, 2-14584, 2-92650, and 2-92651.) These publications have disclosed that such a self-scanning light-emitting device has a simple and compact structure for a light source of a printer, and has smaller arranging pitch of thyristors.

The inventors have further provided a self-scanning light-emitting device having such structure that a transfer portion including a transfer element array is separated from a light-emitting portion including a light-emitting element array (see Japanese Patent Publication No. 2-263668).

Referring to FIG. 3, there is shown an equivalent circuit diagram of a chip of this type of self-scanning light-emitting device of 1200 dpi/256 elements. A transfer portion of the chip comprises transfer elements $T_1$, $T_2$, $T_3$, ..., and a light-emitting portion comprises light-emitting elements $L_1$, $L_2$, $L_3$, ..., both transfer elements and light-emitting elements being composed of three-terminal light-emitting thyristors. The structure of the transfer portion includes diode $D_1$, $D_2$, $D_3$, ..., as means for electrically coupling the gate electrodes of neighboring thyristors to each other. $V_{GK}$ is a power supply (normally 5 volts), and is connected to all of the gate electrodes $G_1$, $G_2$, $G_3$, ... of the thyristors in the transfer portion via a load register $R_L$, respectively. Respective gate electrodes $G_1$, $G_2$, $G_3$, ... of the thyristors in the transfer portion are correspondingly connected to the gate electrodes of the thyristors in the light-emitting portion. A start pulse $ø_S$ is applied to the gate electrode of the thyristor $T_1$ in the transfer portion, transfer clock pulses ø1 and ø2 are alternately applied to all of the anode electrodes of the thyristors in the transfer portion, and a write signal $ø_I$ is applied to all of the anode electrodes of the thyristors in the light-emitting portion.

In the figure, reference numerals 30, 32, 34, and 36 indicate ø1 line, ø2 line, $ø_I$ line, and power supply line, respectively. R1, R2 and $R_I$ designate current limiting resistors inserted in ø1 line 30, ø2 line 32, and $ø_I$ line 34, respectively. $R_S$ indicates a current limiting resistor for the start pulse.

The operation of this self-scanning light-emitting device will now be described briefly. Assume that as the transfer clock ø2 is driven to a high level, the thyristor $T_2$ is now turned on. At this time, the voltage of the gate electrode $G_2$ is dropped to a level near zero volt from 5 volts. The effect of this voltage drop is transferred to the gate electrode $G_3$ via the diode $D_2$ to cause the voltage of the gate electrode $G_3$ to set about 1 volt which is the diffusion potential of the diode $D_2$. On the other hand, the diode $D_1$ is reverse-biased so that the potential is not conducted to the gate electrode $G_1$, then the potential of the gate electrode $G_1$ remaining at 5 volts. The turn on voltage of the light-emitting thyristor of pnpn-structure is approximated to a gate electrode potential + a diffusion potential of pn junction (about 1 volt). Therefore, if a high level of a next transfer clock pulse ø1 is set to the voltage larger than about 2 volts (which is required to turn-on the thyristor $T_3$) and smaller than about 4 volts (which is required to turn on the thyristor $T_5$), then only the thyristor $T_3$ is turned on and other thyristors remain off-state, respectively. In this manner, on-state of transfer elements are sequentially transferred by means of two-phase clock pulses ø1 and ø2.

The start pulse $ø_S$ works for starting the transfer operation described above. When the start pulse $ø_S$ is driven to a low level (about 0 volt) and the transfer clock pulse ø1 is driven to a high level (about 2-4 volts) at the same time, the thyristor $T_1$ is turned on. Just after that, the start pulse $ø_S$ is returned to a high level.

Assuming that the thyristor $T_2$ is in on-state, the voltage of the gate electrode $G_2$ is lowered to almost zero volt. Consequently, if the voltage of the write signal $ø_I$ is higher than the diffusion potential (about 1 volt) of the pn junction between gate and anode, the thyristor $L_2$ may be turned into on-state (a light-emitting state).

On the other hand, the voltage of the gate electrode $G_1$ is about 5 volts, and the voltage of the gate electrode $G_3$ is about 1 volt. Consequently, the write voltage of the thyristor $L_1$ is about 6 volts, and the write voltage of the thyristor $L_3$ is about 2 volts. It follows from this that the voltage of the write signal $ø_I$ which can write into only the thyristor $L_2$ is in a range of about 1-2 volts. When the thyristor $L_2$ is turned on, that is, in the light-emitting state, the amount of light thereof is determined by the current value supplied by the write signal $ø_I$. Accordingly, the thyristors may emit light at any desired amount of light. In order to transfer on-state to the next thyristor in the light-emitting portion, it is necessary to first turn off the thyristor in on-state by temporarily dropping the voltage of the write signal $ø_I$ down to zero volt.

A self-scanning light-emitting element array in an optical writing head may be fabricated by arranging a plurality of chips described above in a linear manner. As apparent from the operation described above, the number of light-emitting elements which may be illuminated simultaneously in one chip is only 1.

In order to make the printing speed of an optical printer fast, it is required to increase an energy exposed on a photosensitive drum. An exposure energy is a product of an optical output (which has a dimension of power) and an exposure time, so that it is required to increase an optical output or an exposure time in order to make an exposure energy large. A current applied to a light-emitting element is caused to be increased to make an optical output large, but it is not permitted to increase extremely the current due to the effect for a lifetime of the light-emitting element. On the other hand, the number of light-emitting elements which may be illuminated simultaneously in one chip is required to be increased in order to extend an exposure time, i.e. increase a light emission duty.

An object of the present invention is to provide a method for driving a self-scanning light-emitting element array in such a manner that two or more light-emitting elements may be illuminated simultaneously in one chip.

Another object of the present invention is to provide a self-scanning light-emitting array in which two or more light-emitting elements may be illuminated simultaneously in one chip.

A diode-coupled self-scanning light-emitting element array shown in FIG. 3 is structured so as to be driven by a driver IC (Integrated Circuit) of a 5V power supply system. The voltage of a power supply for a driver IC, however, has been changed from a 5V power supply system to a 3.3V or lower power supply system, which has decreased a power consumption. It is, therefore, desirable to drive a self-scanning light-emitting element array by a 3.3V power supply system.

A still another object of the present invention is to provide a method for driving a diode-coupled self-scanning light-emitting element array by a 3.3V power supply system, and a driver circuit for implementing the method.

An optical writing head is composed of a light-emitting element array and a rod-lens array. When the light-emitting element array is structured by arraying a plurality of self-scanning element array chips in a linear manner with the ends of adjacent chips being butted to each other to form junctions, it is impossible to make the array pitch of light-emitting elements constant over the light-emitting element array, especially an array pitch is disordered at the junctions. In order to avoid this, the chips are arrayed in a zigzag manner with the ends of each chip being overlapped to one another to make an array pitch of light-emitting elements at the junctions of chips constant.

When a printing is carried out by an optical writing head comprising such a light-emitting element array, stripes may be printed on a paper sheet at the junctions of chips.

A further object of the present invention is to provide an optical writing head in which the stripes due to above-described reason are not printed on a paper sheet.

A still another object of the present invention is to provide a method for arranging a rod-lens array and a light-emitting element array to implement the above-described optical writing head.

DISCLOSURE OF THE INVENTION

According to a first aspect of the present invention, a method for driving a self-scanning light-emitting element array is provided in which two light-emitting elements may be illuminated simultaneously in one chip without changing the circuit structure of a conventional self-scanning light-emitting element array.

According to a second aspect of the present invention, a self-scanning light-emitting element array is provided in which two light-emitting elements may be illuminated simultaneously in one chip by adding resistors to the circuit structure of a conventional self-scanning light-emitting element array.

According to a third aspect of the present invention, a self-scanning light-emitting element array is provided in which two or more light-emitting elements may be illuminated simultaneously by structuring two light-emitting element arrays in one chip.

According to a fourth aspect of the present invention, a method for driving a self-scanning light-emitting element array by 3.3V power supply system is provided in which a clock pulse line is precharged to a predetermined voltage prior to turn on a transfer element, the value of the predetermined voltage being smaller than that of a voltage of a clock pulse to turn on the transfer element.

According to a fifth aspect of the invention, an optical writing head is provided in which stripes are not printed on a paper sheet by structuring a rod-lens array such that light-emitting elements are considered to be arrayed in a linear manner viewed from the rod-lens array.

BRIEF DESCRIPTION OF THE DRAWINGS

FIG. 11 shows a current-voltage (I-V) characteristic of a thyristor in a light-emitting portion.

FIGS. 12A and 12B show a first example in which a resistor is built in a three-terminal light-emitting thyristor of pnpn-structure.

FIGS. 13A and 13B show a second example in which a resistor is built in a three-terminal light-emitting thyristor of pnpn-structure.

FIGS. 14A and 14B show waveforms illustrating a first example of a driving method.

FIG. 15 shows waveforms illustrating a second example of a driving method.

FIG. 19 shows an equivalent circuit diagram of a second example of a self-scanning light-emitting element array chip in accordance with the present invention.

FIG. 24 shows a sectional view taken along E-E' line in FIG. 23.

FIG. 25 shows an equivalent circuit diagram of a fourth example of a self-scanning light-emitting element array chip in accordance with the present invention.

FIG. 30 shows a plan view of the structure of a chip in FIG. 29.

FIG. 31 shows a variation in time of the voltage of ø1 line.

FIG. 32 shows the relation among the current limiting resistance R1, the voltage to be precharged, and the minimum value of an overlap time $t_a$ required for transferring.

FIG. 33 shows an example of a circuit for driving a diode-coupled self-scanning light-emitting element array.

FIG. 39 shows a current-voltage (I-V) characteristic of a thyristor.

FIGS. 41A and 41B show an arrangement of light-emitting element array chips, respectively.

FIG. 42 shows a rod-lens array in which rod-lenses are stacked triangularly in upper and lower rows.

FIG. 45 shows an unsuitable example of an arrangement of a rod-lens array and a plurality of light-emitting element array chips.

FIG. 46 shows an unsuitable example of an arrangement of a rod-lens array and a plurality of light-emitting element arrays.

FIG. 47 shows a first example of an optical writing head of the present invention.

FIG. 48 shows a second example of an optical writing head of the present invention.

FIG. 49 shows a third example of an optical writing head of the present invention.

FIG. 52 shows a sixth example of an optical writing head of the present invention.

DESCRIPTION OF THE PREFERRED EMBODIMENT

First Embodiment

Figure 1:
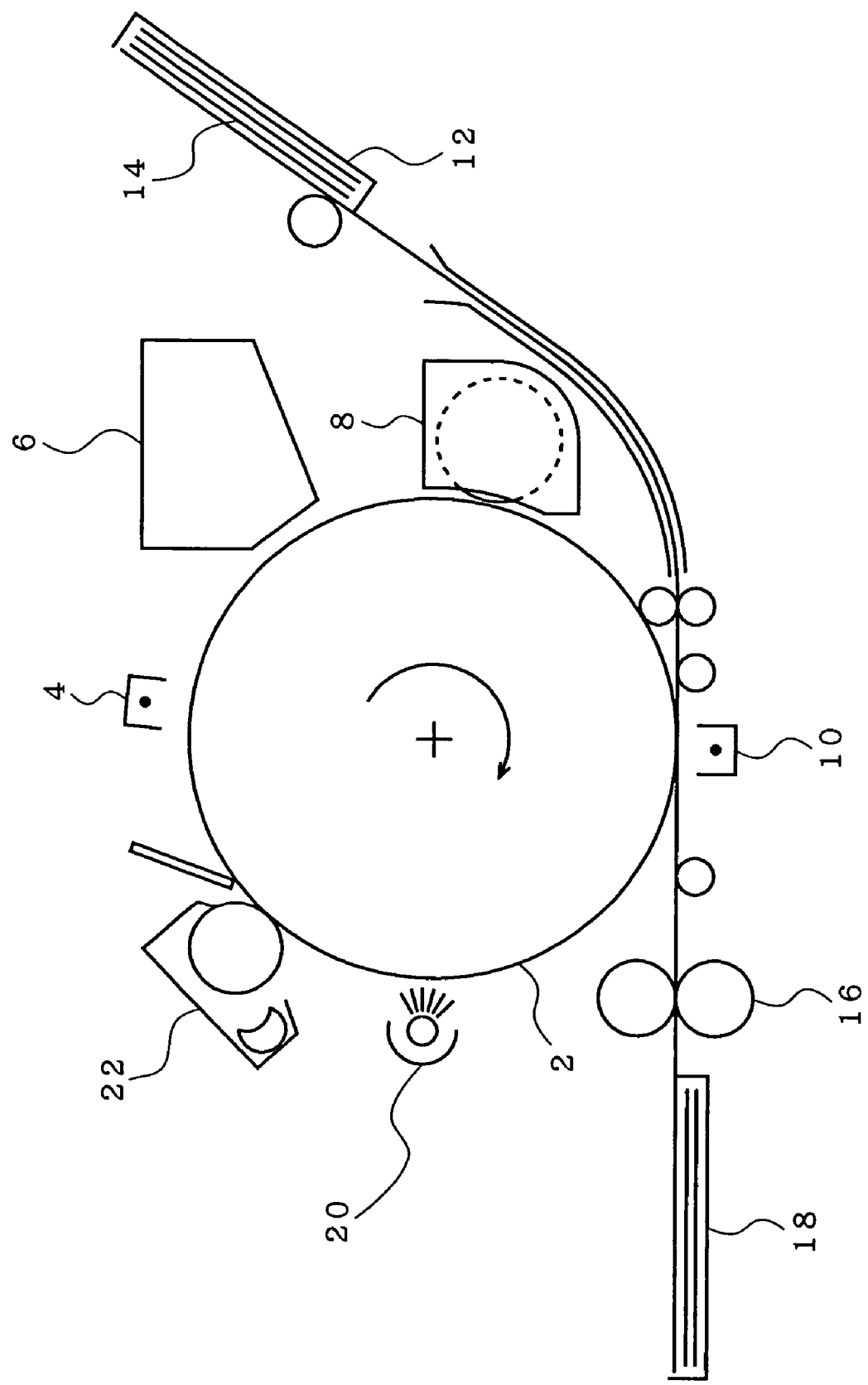
FIG. 1 shows the structure of an optical printer including an optical writing head.
Figure 2:
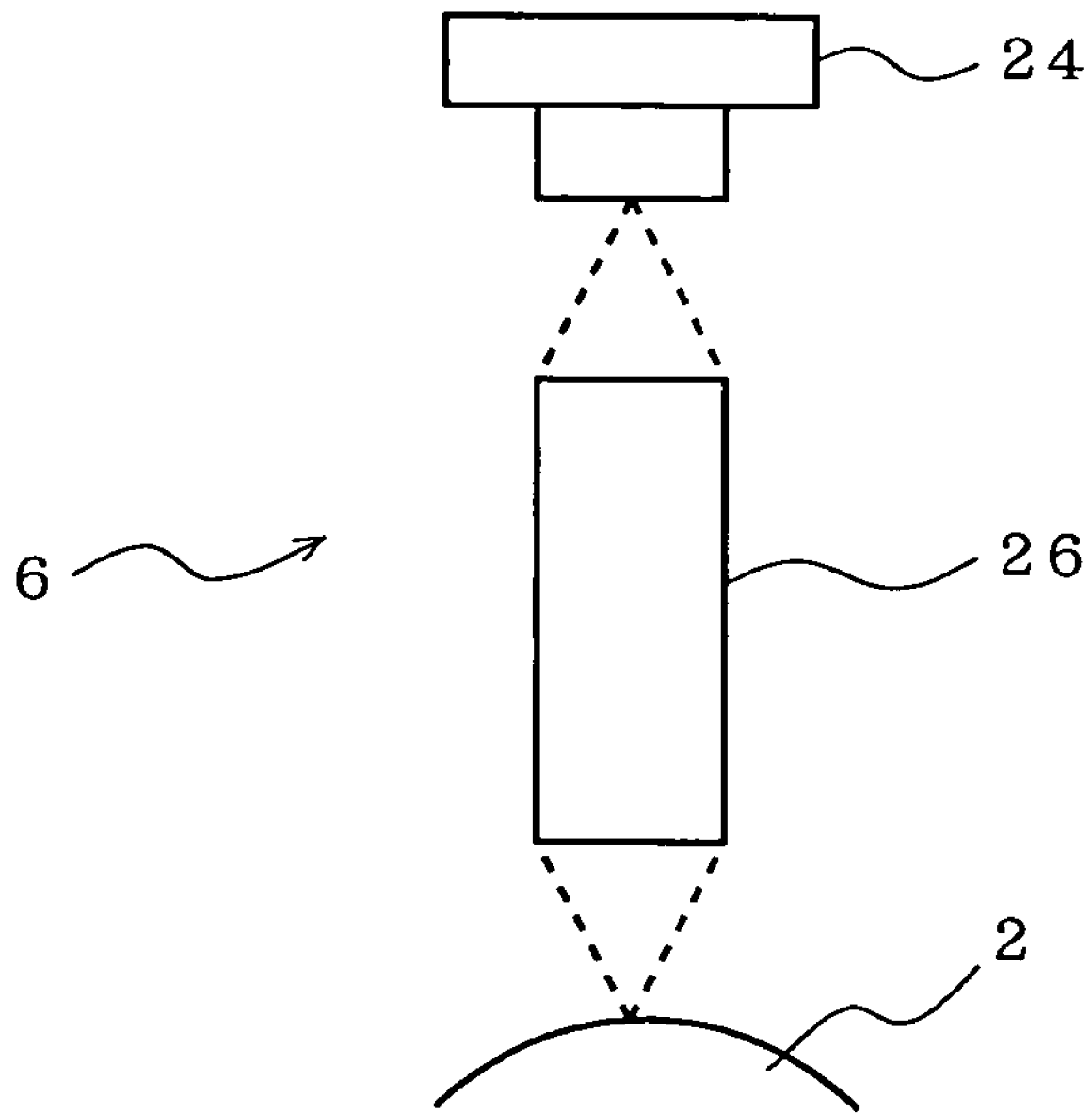
FIG. 2 shows the structure of an optical writing head.
Figure 3:
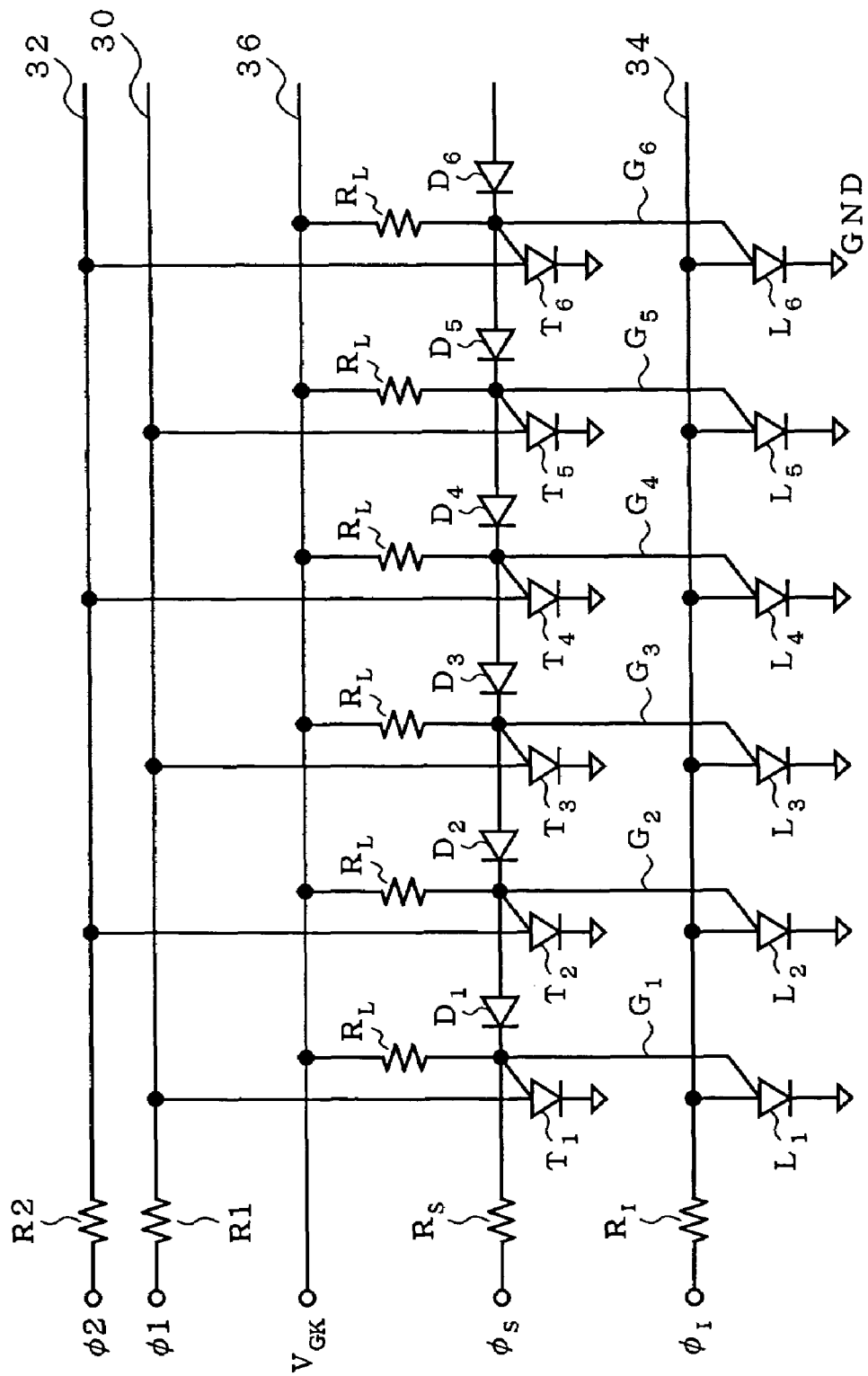
FIG. 3 shows an equivalent circuit diagram of self-scanning light-emitting array chip in which a transfer portion is separated from a light-emitting portion.

The present embodiment is directed to a method for driving a self-scanning light-emitting element array in which two light-emitting elements may be illuminated simultaneously in one chip without changing the circuit structure of the self-scanning light-emitting element array chip shown in FIG. 3.

First Example

Figure 4:
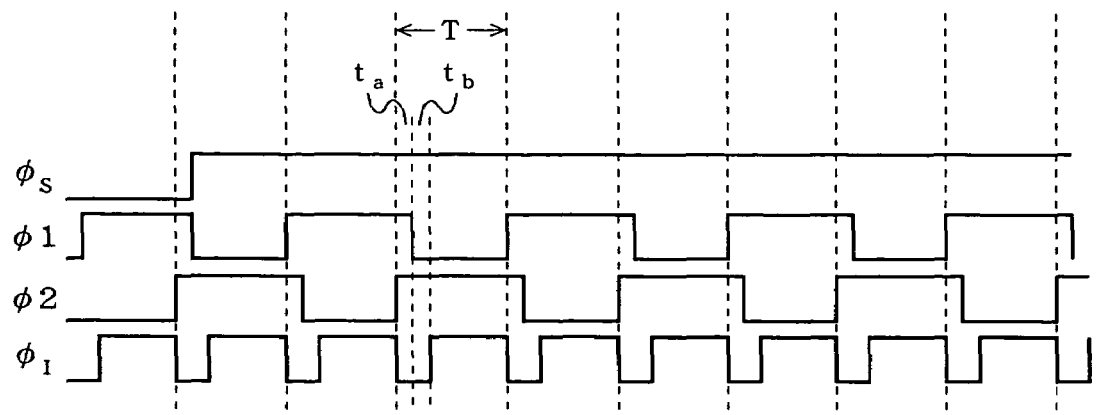
FIG. 4 shows waveforms for driving in a resolution of 1200 dpi.
Figure 5:
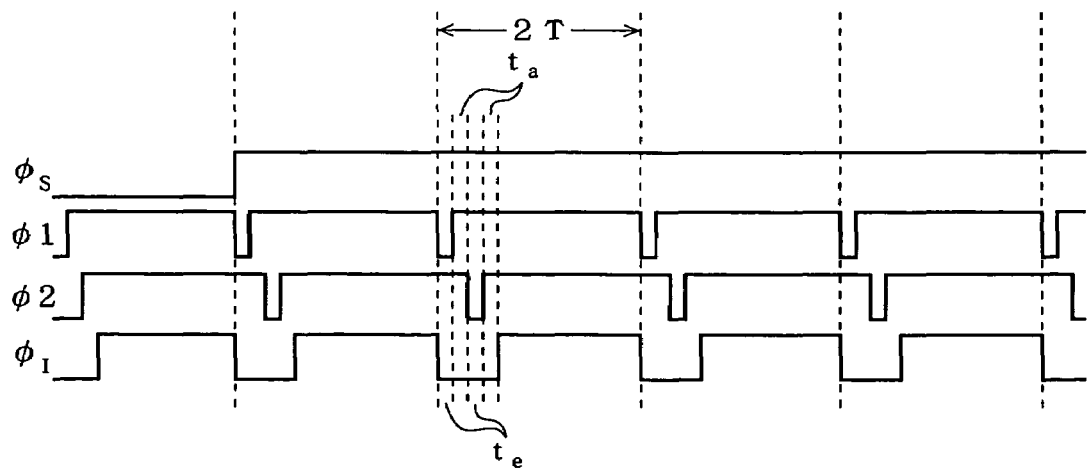
FIG. 5 shows waveforms for driving in a resolution of 600 dpi.

Referring to FIGS. 4 and 5, there are shown two types of waveforms of signals for driving in resolutions of 1200 dpi and 600 dpi, respectively, an optical writing head comprising a light-emitting element array which is structured by arranging a plurality of self-scanning light-emitting element array chips each thereof is 1200 dpi/256 elements as shown in FIG. 3.

The two types of waveforms are selected for use in the first embodiment in order to implement a printing speed which is doubled compared to that in a resolution of 1200 dpi by illuminating adjacent two light-emitting elements simultaneously with regarding these two elements as one block in a case that an image is printed in a resolution of 600 dpi using a self-scanning light-emitting element array of 1200 dpi.

It is assumed in the first example that clock pulses ø1 and ø2 are common for a plurality of self-scanning light-emitting element array chips constituting the optical writing head.

The waveforms shown in FIG. 4 for driving in a resolution of 600 dpi will now be explained. A write signal $ø_I$ has a period of T, and each of clock pulses ø1 and ø2 has a period of 2T. In the figure, an interval $t_a$ is an overlap time required for turning on the thyristor $T_n$ when the thyristor $T_{n-1}$ is turned on, and an interval $t_b$ is a waiting time until the thyristor $L_n$ is turned on after the thyristor $T_n$ is turned on. The thyristor $L_n$ may not be illuminated during the intervals $t_a$ and $t_b$, but may be illuminated during a residual interval $T-(t_a+t_b)$. These waveforms are characterized in that only the thyristor $T_n$ is turned on when the thyristor $L_n$ is illuminated.

Next, the waveforms shown in FIG. 5 for driving in a resolution of 600 dpi will now be explained. Each of the write signal $ø_I$ and clock pulses ø1, ø2 has a period of 2T. It is now assumed that adjacent two thyristors $T_{2n-3}$, $T_{2n-2}$ are turned on simultaneously. In the figure, a first interval $t_e$ is a time required for turning off the thyristor $T_{2n-3}$, a next interval $t_a$ is an overlap time required for turning on the thyristor $T_{2n-1}$, a next interval $t_e$ is a time required for turning off the thyristor $T_{2n-2}$, a next interval $t_a$ is an overlap time required for turning on the thyristor $T_{2n}$, and a residual interval $2T-2(t_a+t_e)$ is a time during which adjacent two thyristors $L_{2n-1}$ and $L_{2n}$ may be illuminated simultaneously.

These waveforms are characterized in that the thyristors $T_{2n-1}$ and $T_{2n}$ are turned on simultaneously when the thyristor $L_{2n-1}$ and $L_{2n}$ are illuminated simultaneously. The adjacent two thyristors $L_{2n-1}$ and $L_{2n}$ are illuminated simultaneously, so that a current required for two thyristors must be held in the write signal $\emptyset_I$. Therefore, a driver circuit for $\emptyset_I$ line must have two levels of currents based on a resolution, i.e., one current $I_L$ for one illuminated thyristor and the other current $2I_L$ for two illuminated thyristors.

Figure 6:
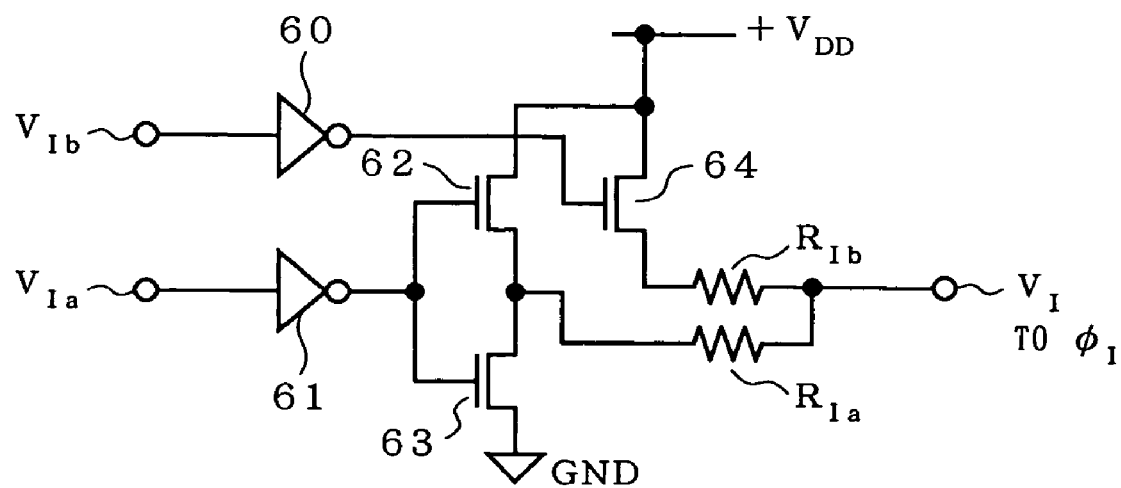
FIG. 6 shows an example of a driver circuit for $\phi_I$ line.

Referring to FIG. 6, there is shown an example of a driver circuit for $\emptyset_I$ line in the above-described self-scanning light-emitting element array. The driver circuit comprises two inverters 60 and 61, three MOSFETs 62, 63 and 64, and two current limiting resistors $R_{Ia}$, and $R_{Ib}$. $V_{Ia}$ and $V_{Ib}$ show control terminals, and $V_I$ designates an output terminal which is connected to the $\emptyset_I$ terminal in FIG. 3.

If the control terminal $V_{Ia}$ is driven to H level, the output terminal $V_I$ is connected to a positive power supply ($+V_{DD}$) through the resistor $R_{Ia}$. If the control terminal $V_{Ib}$ is driven to H level, the resistor $R_{Ib}$ is connected in parallel with the resistor $R_{Ia}$. Assuming that respective resistances of the resistors $R_{Ia}$ and $R_{Ib}$ are equal, the parallel resistance thereof is equal to a half of one resistance, as a result of which the $\emptyset_I$ current is doubled.

Accordingly, the control terminal $V_{Ia}$ is driven to H level to illuminate one thyristor, and the control terminals $V_{Ia}$ and $V_{Ib}$ are driven to H level simultaneously to illuminate adjacent two thyristors simultaneously.

Figure 7:
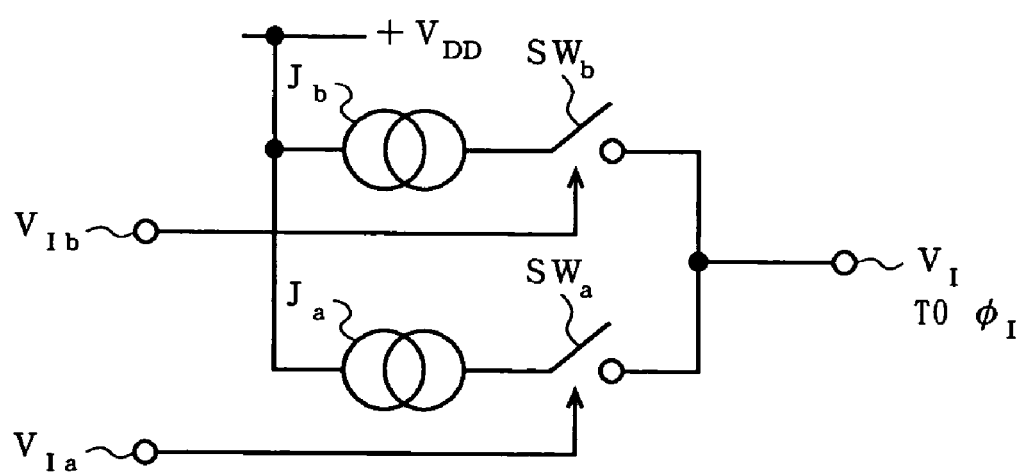
FIG. 7 shows another example of a driver circuit for $\phi_I$ line.

Referring to FIG. 7, there is shown another example of the driver circuit for $\emptyset_I$ line, the driver circuit comprising two current sources $J_a$ and $J_b$, and switches $SW_a$ and $SW_b$ which are connected to the output terminals of the current sources, respectively. The open/close of respective switches are controlled by means of the control terminals $V_{Ia}$ and $V_{Ib}$, i.e., if the control terminal is driven to H level, the switch is closed.

If the control terminal $V_{Ia}$ is driven to H level, the switch $SW_a$ is closed and a current flows from the current source $J_a$ to the $\emptyset_I$ terminal. If the control terminal $V_{Ib}$ is driven to H level, currents flow from the current sources $J_a$ and $J_b$. When the respective currents of the current sources are equal, a current of doubled value flows to the terminal $\emptyset_I$.

Accordingly, the control terminal $V_{Ia}$ is driven to H level to illuminate one thyristor, and the control terminals $V_{Ia}$ and $V_{Ib}$ are driven to H level simultaneously to illuminate adjacent two thyristors simultaneously, in the same way as the driver circuit of FIG. 6.

It will now be considered that the optical writing head is driven by the waveforms in FIG. 4, the optical writing head using the driver circuit in FIG. 6 or FIG. 7 and being able to print 20 paper sheets of A4 size per minute in a resolution of 1200 dpi×1200 dpi (a main-scanning direction×a sub-scanning direction). A longitudinal side of an A4 size paper sheet corresponds to 13800 lines. These lines are printed in three seconds (20 sheets per minute), so that a printing time per line is 200 µs and a period T per thyristor is 850 ns. Assuming that $t_a=t_b=100$ ns, a time during which one thyristor may be illuminated is about 650 ns.

Next, it will be considered that a printing is carried out in a resolution of 600 dpi×1200 dpi, i.e., a resolution in a sub-scanning direction is the same as that of 1200 dpi×1200 dpi. In this case, the optical writing head is driven by the waveforms in FIG. 5. Assuming that $t_a=t_b=100$ ns, 2T=650 ns+400 ns is established and a printing time per line is 1050 ns×128=143 µs. This printing time corresponds to about 1/1.6 times that in 1200 dpi×1200 dpi, so that a 1.6 times printing speed may be realized by using a resolution of 600 dpi×1200 dpi.

If the intervals $t_a$, $t_b$ and $t_e$ are small enough to be ignored, a printing speed will be approximately doubled.

According to this example, an image of 600 dpi may be implemented by using a light-emitting element array of 1200 dpi without changing the structure of a driver circuit. Therefore, a cost for manufacturing a dedicated optical writing head of 600 dpi may be decreased, because components thereof may be shared with that of the optical writing head of 1200 dpi.

Second Example

In the first example, the case such that the clock pulses ø1 and ø2 are common to a plurality of self-scanning light-emitting element array chips has been illustrated, which has a merit of simplification for the structure of a driver circuit.

In a second example, a circuit structure will now be considered in which the clock pulses ø1 and ø2 are applied independently to every self-scanning light-emitting element array chip. While adjacent two thyristors $L_{2n-1}$ and $L_{2n}$ are illuminated simultaneously with regarding these two elements as one block in the first example, if the thyristor $L_{2,-1}$ or $L_{2n}$ only in one block is illuminated, a high speed printing may be implemented with maintaining a resolution of the chip. Therefore, a printing in an original resolution of the chip may be realized in a mode wherein adjacent two thyristors are illuminated simultaneously by transforming the waveforms of the clock pulses ø1, ø2 and the signals at the control terminals $V_{Ia}$, $V_{Ib}$.

Figure 8:
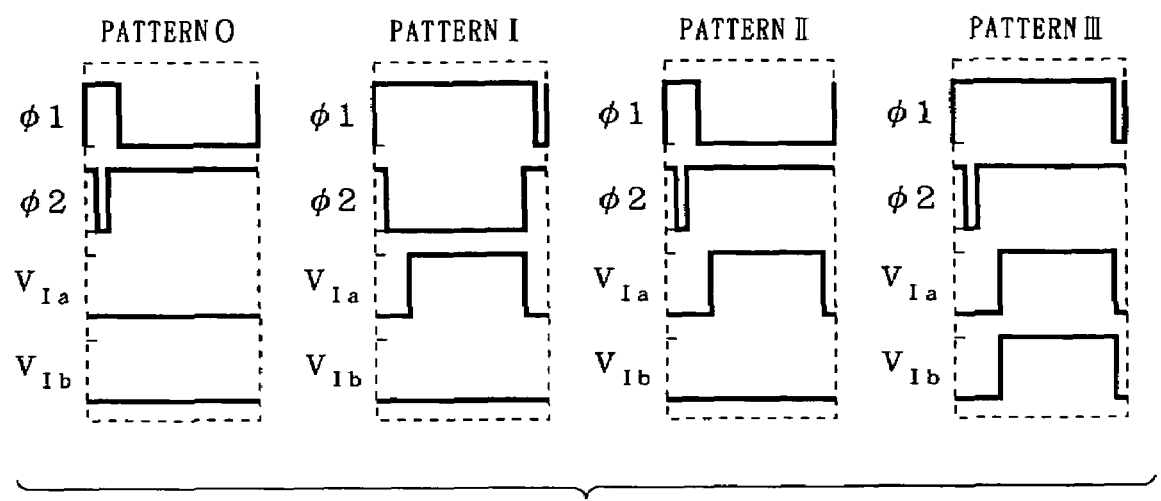
FIG. 8 shows four types of waveforms patterns.

Referring to FIG. 8, there are shown four transformed waveform patterns 0, I, II, and III of the clock pulses ø1 and ø2, and the signals at the control terminals $V_{Ia}$ and $V_{Ib}$. The waveform pattern 0 shows that both the thyristors $L_{2n-1}$ and $L_{2n-1}$ are not illuminated, the waveform pattern I the thyristor $L_{2n-1}$ only is illuminated, the waveform pattern II the thyristor $L_{2n}$ only is illuminated, the waveform pattern III both the thyristors $L_{2n-1}$ and $L_{2n}$ are illuminated.

In the waveform pattern 0, the clock pulse ø1 is driven to L level and the clock pulse ø2 is driven to H level in order to transfer on-state in the transfer portion, and the write signal $\emptyset_I$ is retained to L level with holding both the control terminals $V_{Ia}$ and $V_{Ib}$ to L level. In this case, both the thyristors $L_{2n-1}$ and $L_{2n}$ are not illuminated.

In the waveform pattern I, when the thyristor $T_{2n-1}$ only is turned on, the control terminals $V_{Ia}$ and $V_{Ib}$ are driven to H level and L level, respectively, and the write signal $\emptyset_I$ is driven to H level in order to illuminate the thyristor $L_{2n-1}$. Then, after the thyristor $L_{2n-1}$ is turned to be non-illuminated, the on-state is transferred to the thyristor $T_{2n}$ in the transfer portion.

In the waveform pattern II, the on-state is first transferred from the thyristor $T_{2n-1}$ to the thyristor $T_{2n}$ in different from the case of the waveform pattern I. Then, the control terminal $V_{Ia}$ is driven to H level and the write signal $\emptyset_I$ is driven to H level to illuminate the thyristor $L_{2n}$ only.

In the waveform pattern III, when both the thyristor $T_{2n-1}$ and $T_{2n}$ are turned on, the control terminals $V_{Ia}$ and $V_{Ib}$ are driven to H level and the write signal $\emptyset_I$ is driven to H level to illuminate the thyristor $L_{2n-1}$ and $L_n$ simultaneously. This situation is the same as in the first example. According to the waveform pattern III, the control terminals $V_{Ia}$ and $V_{Ib}$ are driven to H level simultaneously to flow a current of doubled value to illuminate two thyristors in the light-emitting portion.

Figure 9:
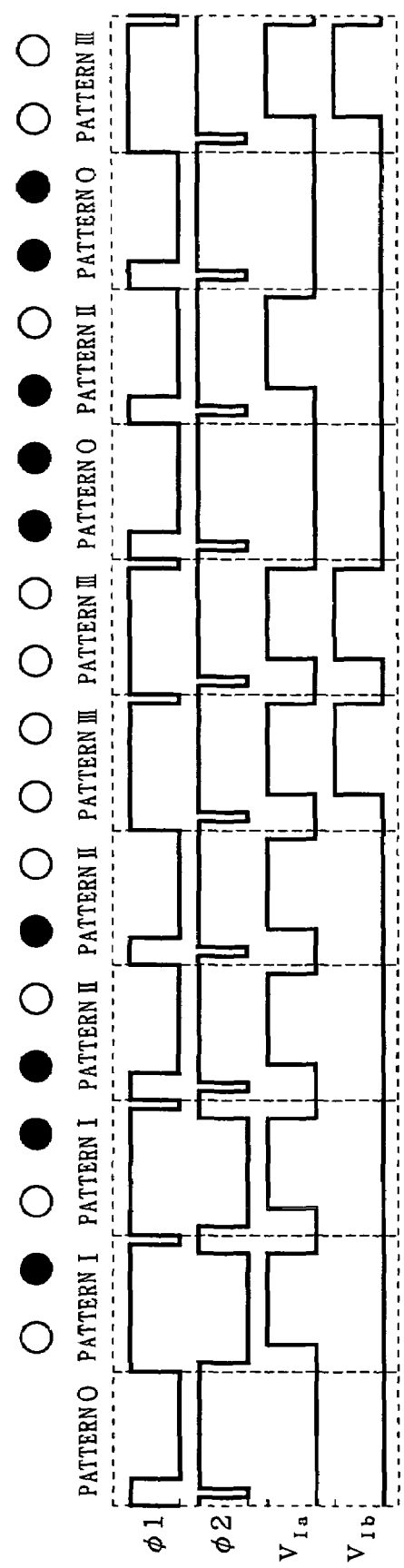
FIG. 9 shows an example of combination of four types of waveform patterns.

An example of combination of four types of waveform patterns describe above is shown in FIG. 9. The figure illustrates the illuminated or non-illuminated state of adjacent two thyristors $L_{2n-1}$ and $L_{2n}$ based on the transformation of waveforms of the clock pulse ø1, ø2 and the signals applied to the control terminals $V_{Ia}$, $V_{Ib}$. The sign ○ shows illuminated state, and the sign designates non-illuminated state. It is appreciated that even if any of four types of waveform pattern are combined, a transfer is carried out every two thyristors per block in the transfer portion.

Second Embodiment

The present embodiment is directed to a self-scanning light-emitting element array in which two light-emitting element may be illuminated simultaneously in one chip by adding resistors to the circuit structure of the self-scanning light-emitting element array shown in FIG. 3.

Figure 10:
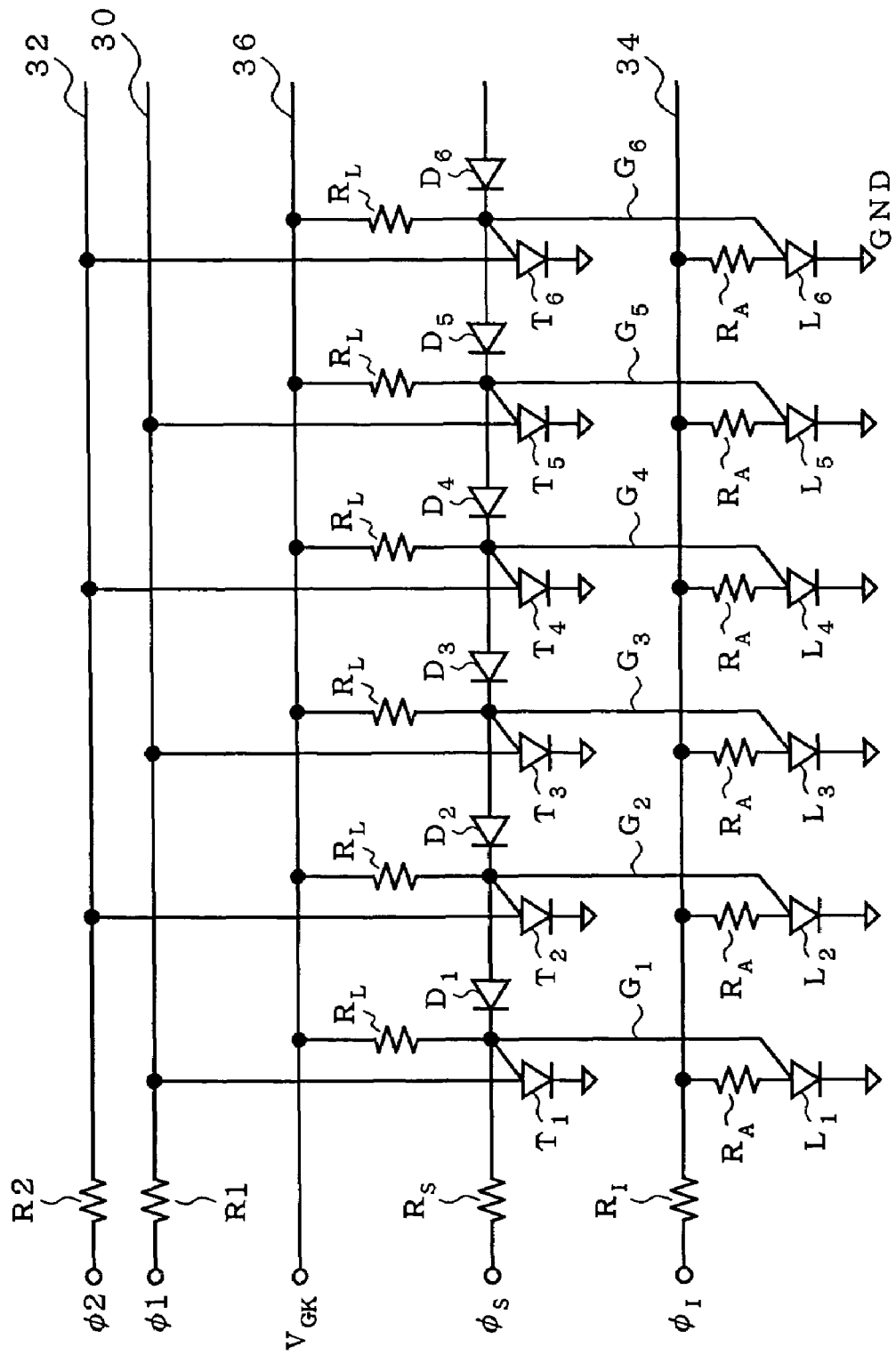
FIG. 10 shows an equivalent circuit diagram of a self-scanning light-emitting element array chip in accordance with the present embodiment.

Referring to FIG. 10, there is shown an equivalent circuit diagram of a self-scanning light-emitting element array chip in accordance with the present embodiment. The circuit is substantially the same as that in FIG. 3. Therefore, like reference numerals in FIG. 3 are used for describing like elements.

According to the present embodiment, in the circuit of FIG. 3, respective resistors $R_A$ each having a suitable resistance are provided between respective anode terminals of thyristors in a light-emitting portion and a ø$_I$ line 34. In this self-scanning light-emitting element array, it is assumed that a thyristor $T_n$ in a transfer portion is turned on. An example of a current-voltage (I-V) characteristic of a thyristor $L_n$ in a light-emitting portion is shown by a solid line 38 in a graph of FIG. 11, the gate of the thyristor $L_n$ being connected to that of the turned-on thyristor $T_n$ in a transfer portion. In the figure, the abscissa designates a ø$_I$ current and the ordinate a ø$_I$ voltage. Since the thyristor $T_n$ is turned on, the thyristor $L_n$ has a straight I-V characteristic which is same as that of a diode. That is, a diffusion potential is about one volt, and the gradient of the straight I-V characteristic corresponds to the resistance of the resistor $R_A$ ($R_A$ may also indicate a resistance thereof hereinafter), e.g., 50 Ω. On the other hand, to the gate of a thyristor $L_{n+1}$ on the right side of the thyristor $L_n$ is supplied a voltage that is higher by a voltage drop (about one volt) of a coupling diode $D_n$, so that the thyristor $L_{n+1}$ may be turned on only when a voltage of about two volts is supplied thereto. In order to illuminate the thyristor $L_{n+1}$ together with the thyristor $L_n$, the ø$_I$ voltage must exceed a turn-on voltage (a threshold voltage) of the thyristor $L_{n+1}$ by increasing the ø$_I$ current. At this time, the I-V characteristic of the thyristor $L_n$ is changed from the characteristic designated by a solid line 38 to the characteristic designated by a dotted line 39.

In the case of $R_A$=0, i.e., in the case of the circuit in FIG. 3, the I-V characteristic of the thyristor $L_n$ extends horizontally if the internal resistance of the thyristor in a light-emitting portion is ignored. Therefore, the ø$_I$ voltage may not exceed the threshold voltage of the thyristor $L_{n+1}$ even if the ø$_I$ current is increased. This is a reason for that only one thyristor is illuminated in one chip for a conventional self-scanning light-emitting element array.

In the circuit of FIG. 10, the resistance $R_A$ is selected such that a current applied to one thyristor does not illuminate a thyristor neighbored thereto, but a current the value thereof is two times that of the current applied to said one thyristor illuminates the neighbored thyristor together with said one thyristor. That is, the following relation is established, $$V_D + R_A \times I_L < V_{th(n+1)} < V_D + R_A \times 2I_L$$

wherein $I_L$ is a ø$_I$ current to illuminate the thyristor $L_n$, $V_{th(n+1)}$ is the threshold voltage of the thyristor $L_{n+1}$, and $V_D$ is the diffusion potential of a pn-junction of the thyristor. Considering to the resistance $R_A$, the relation may be deformed as follows;

$$(V_{th(n+1)} - V_D)/I_L > R_A > (V_{th(n+1)} - V_D)/2I_L.$$

For example, assuming that $V_{th(n+1)}$=2.1V, $I_L$=15 mA, $V_D$=1V, the following relation is established.

$$73.3\ \Omega > R_A > 36.7\ \Omega$$

A first example in which a resistor having above-described resistance $R_A$ is built in a three-terminal light-emitting thyristor of pnpn-structure is shown in FIGS. 12A and 12B. FIG. 12A is a plan view, and FIG. 12B is a sectional view taken along the A-A' line in FIG. 12A.

A three-terminal light-emitting thyristor comprises an n-type semiconductor layer 41, a p-type semiconductor layer 42, an n-type semiconductor layer 43, and a p-type semiconductor layer 44 stacked in this order on an n-type semiconductor substrate 40. A ø$_I$ line (Al wiring) 46, an Al wiring 48 to an anode electrode 47 of a thyristor in a light-emitting portion, and an Al wiring 50 to a gate electrode 49 of the thyristor are provided on a protective layer 45. The resistor $R_A$ may be formed by a thin film resistor 51 composed of CrSiO cermet provided on the protective layer 45 between the Al wiring 46 and Al wiring 48. While CrSiO cermet is used as a resistor material, another cermet (AuSiO, AgSiO, or the like) may also be used. Alternately, a metal film composed of Ni, Cr, NiCr, W, Pt, Pd, or the like may be used as a resistor material. A bottom electrode 52 is provided on a bottom surface of the n-type semiconductor substrate 40.

Another example of the resistor $R_A$ is illustrated in FIGS. 13A and 13B. FIG. 13A is a plan view, and FIG. 13B is a sectional view taken along B-B' line in FIG. 13A. In this example, the resistor $R_A$ is formed by providing a resistor material 53 of Ni between the Al wiring 48 and the anode electrode 47. The resistor material described above in the first example may also used in this example.

Alternately, the resistor $R_A$ may be formed by regulating an impurity concentration of the anode layer 44 to control a contact resistance to the anode electrode 47. The resistor $R_A$ may also be formed by means of a parasitic resistance of the turned-on thyristor in a light-emitting portion.

It should be noted that the Al wiring 48 to the anode electrode 47 is directly connected to the Al wiring 46. Other structures are the same as that in FIGS. 12A and 12B.

As a driver circuit for a write signal ø$_I$ in the light-emitting element array of FIG. 10, the driver circuit shown in FIGS. 6 and 7 may be used.

Next, an example of a method for driving the self-scanning light-emitting element array in FIG. 10 by using the driver circuit in FIG. 6 or 7 will be explained. It is assumed that the self-scanning light-emitting element array has a resolution of 1200 dpi.

According to this driving method, an imaging is carried out in a resolution of 1200 dpi for a high resolution printing, while an imaging is carried out in a resolution of 600 dpi for a low resolution printing, i.e., adjacent two thyristors are simultaneously illuminated in turn.

Referring to FIGS. 14A and 14B, there are shown waveforms for imaging in a resolution 1200 dpi or 600 dpi, respectively. In FIG. 14A, the control terminal $V_{Ia}$ is driven to H level correspondingly to respective clock pulses ø1 and ø2, and the control terminal $V_{Ib}$ is retained at L level, thereby the thyristors in a light-emitting portion in FIG. 10 is illuminated in turn one by one. According to this driving method, an imaging is carried out in a resolution of 1200 dpi.

In FIG. 14B, the control terminals $V_{Ia}$ and $V_{Ib}$ are driven to a high level at the same time correspondingly to the clock pulses ø1 and ø2, thereby adjacent two thyristors are illuminated in turn two by two. According to this driving method, a printing is carried out in a resolution of 600 dpi, but a doubled printing speed is implemented because an exposure time is two times that in the driving method in FIG. 14A.

Another example of a method for driving the self-scanning light-emitting element array in FIG. 10 will now be explained. According to this driving method, the light exposure may be doubled without decreasing a resolution. An example of driving waveforms is shown in FIG. 15.

In the self-scanning light-emitting element array, the thyristor $L_n$ in a light-emitting portion is illuminated by driving the control terminal $V_{Ia}$ to H level when the thyristor $T_n$ in a transfer portion is turned on. The thyristor $L_{n+1}$ may be illuminated at the same time by driving the control terminal $V_{Ib}$ to H level when the control terminal $V_{Ia}$ is H level. FIG. 15 further shows an exposure state in dots on the photosensitive drum. In a dot array A, the light exposure of a dot formed by a thyristor $L_n$ illuminated based on a H level of the control terminal $V_{Ia}$ is designated by ◉mark. In a dot array B, the light exposure of a dot formed by the thyristor $L_{n+1}$ illuminated at the same time based on a H level of the control terminal $V_{Ib}$ is designated by ◉mark.

A light exposure of each dot after one line is imaged is determined by the number of ◉marks arranged in a sub-scanning direction. When the number is 0, ○ mark (non-illuminated) is illustrated in a dot array C. When the number is 1, ◉mark (one unit of light exposure) is illustrated in the dot array C. When the number is 2, ● mark (two units of light exposure) is illustrated in the array C. It is apparent in the dot array C that there certainly is ◉mark before the head of a series of ● marks, ◉mark designating the light exposure half of that of ● mark.

In this driving method, a light exposure may be doubled without decreasing a resolution, but the light exposure of a head dot in an imaged line is half that of another dot. In an electrophotography technique, an exposure which is faithful to an original picture may be implemented by suppressing the light exposure of a head dot. The light exposure of a rear dot in an imaged line may also be half, if necessary.

According to the present embodiment, a self-scanning light-emitting element array in which adjacent two thyristors in a light-emitting portion may be illuminated simultaneously in one chip. Therefore, a light exposure is increased on the photosensitive drum, thereby the printing speed of a printer device becomes faster.

Third Embodiment

The present embodiment is directed to a self-scanning light-emitting element array in which two or more light-emitting elements may be illuminated simultaneously in one chip.

First Example

Figure 16:
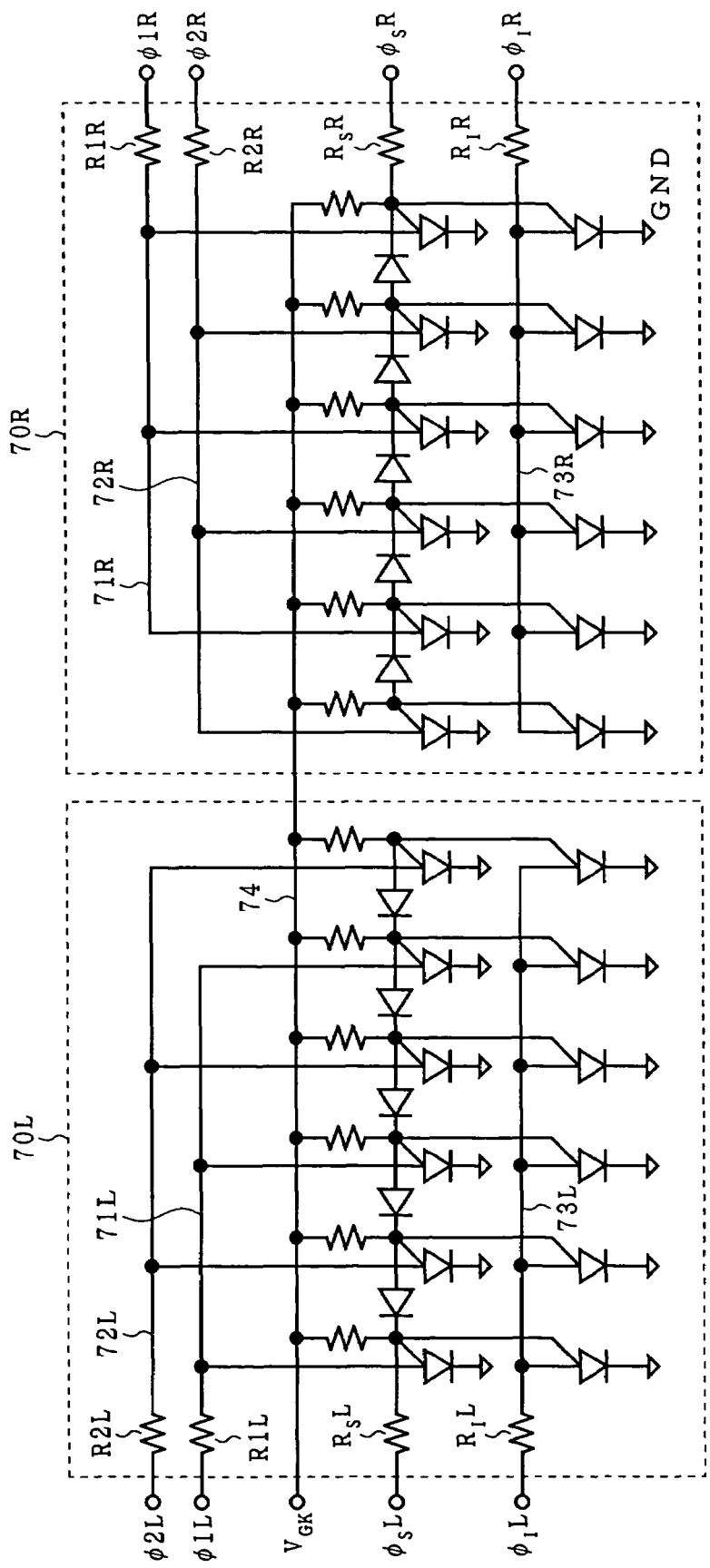
FIG. 16 shows an equivalent circuit diagram of a first example of a self-scanning light-emitting element array chip in accordance with the present invention.

Referring to FIG. 16, there is shown an equivalent circuit diagram of a self-scanning light-emitting element array chip in accordance with a first example. Two circuits 70L and 70R are built in the chip. In the figure, each of the left and right circuits 70L and 70R is shown with comprising only six thyristors in a light-emitting portion for simplifying the drawing.

Each of circuit 70L and 70R is the same as the circuit shown in FIG. 3. The circuit 70L is structured such that an illuminated point is transferred from left to right, and the circuit 70R is structured such that an illuminating point is transferred from right to left. Components constituting each circuit are the same as that in the circuit shown in FIG. 3. In the left circuit 70L, ø1L and ø2L are clock pulses, $ø_SL$ is a start pulse, $ø_IL$ is a write signal, 71L is $ø_1L$ line, 72L is ø2L line, and 73L is $ø_IL$ line. In the right circuit 70R, ø1R and ø2R are clock pulses, $ø_SR$ is a start pulse, $ø_IR$ is a write signal, 71R is $ø_1R$ line, 72R is ø2R line, and 73R is $ø_IR$ line. Current limiting resistors are also provided in each circuit.

In this manner, the clock pulses ø1 and ø2, the start pulse $ø_S$, and the write signal $ø_I$ are separately provided to the left and right circuits, and the power supply $V_{GK}$ only is commonly provided. A common $V_{GK}$ line is designated by reference numeral 74.

Figure 17:
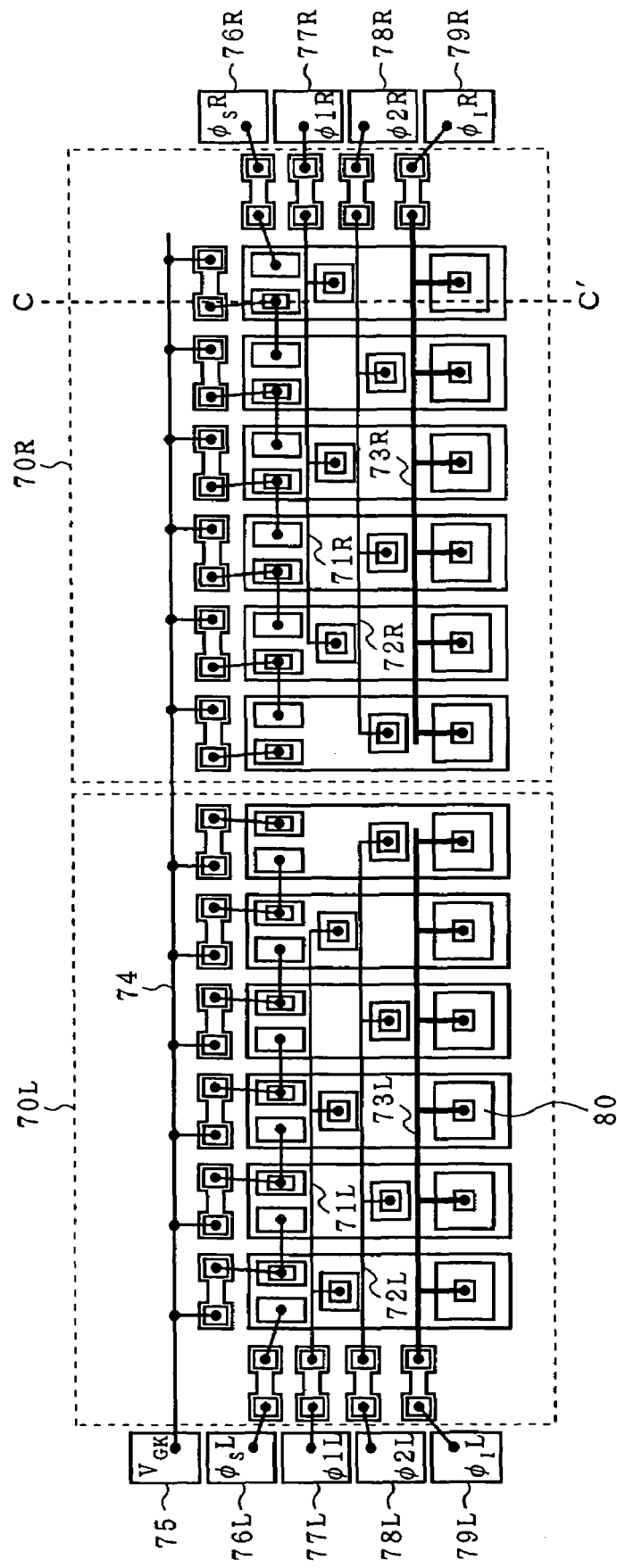
FIG. 17 shows a plan view of the structure of a chip in FIG. 16.
Figure 18:
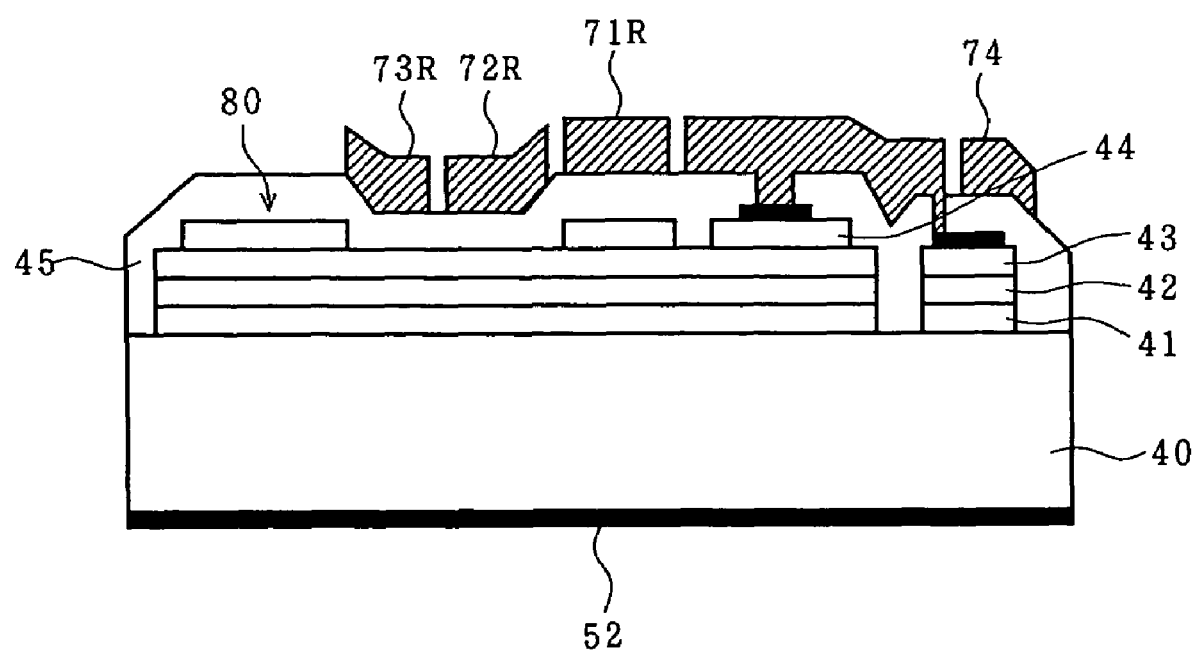
FIG. 18 shows a sectional view taken along C-C' line in FIG. 17.

FIG. 17 is a plan view of the structure of a chip in FIG. 16, and FIG. 18 is a sectional view taken along C-C' line in FIG. 17. It should be noted that in FIGS. 17 and 18, like reference numerals in FIG. 16 are used for describing like elements.

In FIG. 17, reference numerals 75, 76L, 77L, 78L, 79L, 76R, 77R, 78R and 79R designate bonding pads, and 80 shows a light-emitting area.

As shown in a sectional view of FIG. 18, the self-scanning light-emitting element array chip is fabricated by pnpn-structure. The pnpn-structure comprises, as explained in FIG. 12B, an n-type semiconductor layer 41, a p-type semiconductor layer 42, an n-type semiconductor layer 43, and a p-type semiconductor layer 44 stacked in this order on an n-type semiconductor substrate 40. A ø1R line 71R, ø2R line 72R, $ø_I$ line 73R, and $V_{GK}$ line 74 are provided on a protective layer 45. A common bottom electrode 52 is provided on a bottom surface of the n-type semiconductor substrate 40.

As apparent from FIGS. 16, 17 and 18, the self-scanning light-emitting element array chip has the structure in which two self-scanning light-emitting element arrays are built in one chip.

According to this structure, the $ø_I$ line is divided into left and right lines, i.e., $ø_IL$ line and $ø_IR$ line. One thyristor is illuminated in each of $ø_IL$ and $ø_IR$ lines, i.e., two thyristors are illuminated simultaneously in one chip. Therefore, a light-emitting duty may be increased, resulting in a high light output. While the numbers of light-emitting elements in the left and right circuits are selected to be identical in the first example, they may be selected to be different.

While an illuminated point is transferred from left to right in the left circuit 70L, and from right to left in the right circuit 70R, this structure is not necessarily essential. However, this structure is preferable, because the start pulse terminals are on both sides of the chip when bonding pads are provided on both sides of the chip.

Second Example

In the first example described above, two self-scanning light-emitting element arrays are simply built in one chip, so that there are ø1 and ø2 lines in the left and right circuits, respectively. Therefore, the number of bonding pads and the chip area are increased.

According to the present example, the number of bonding pads in FIG. 16 may be decreased by 2 compared to the first example by connecting the ø1L line 71L and ø1R line 71R to one bonding pad, and connecting the ø2L line 72L and ø2R line 72R to one bonding pad.

FIG. 19 shows a circuit diagram having such structure described above. The øIL line 71L and ø1R line 71R are connected to the ø1 bonding pad on right side, and the ø2L line 72L and ø2R line 72R are connected to the ø2 bonding pad on left side.

Figure 20:
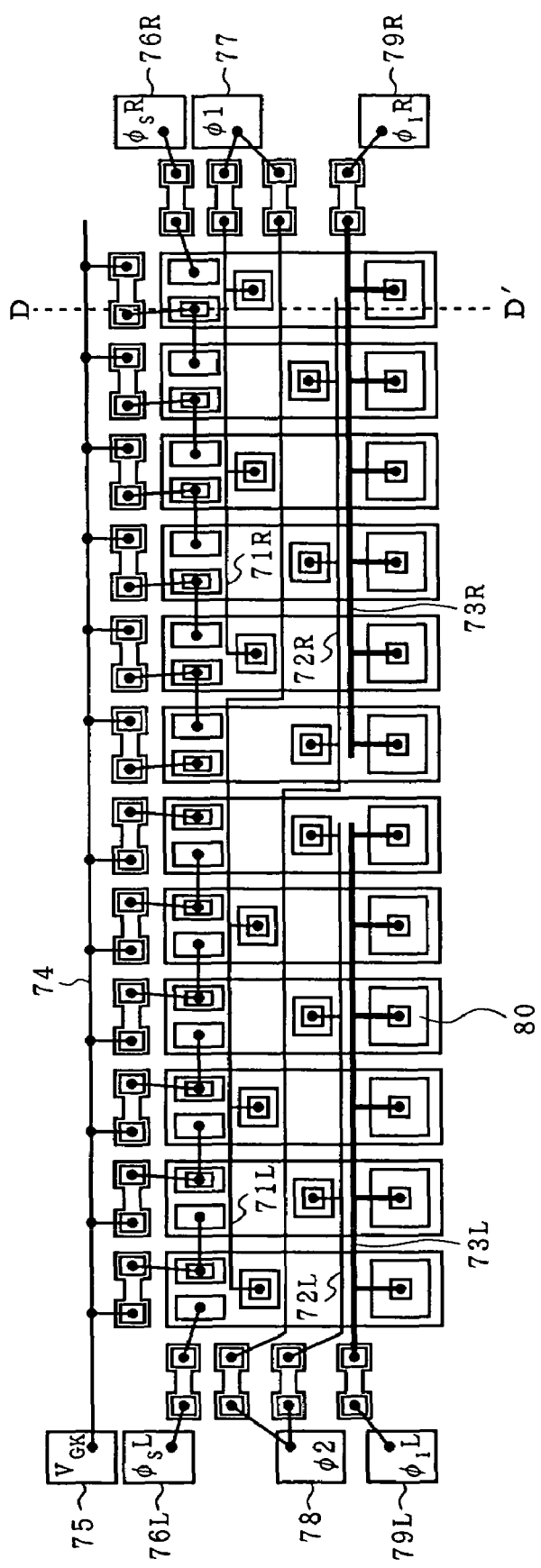
FIG. 20 shows a plan view of the structure of a chip in FIG. 19.
Figure 21:
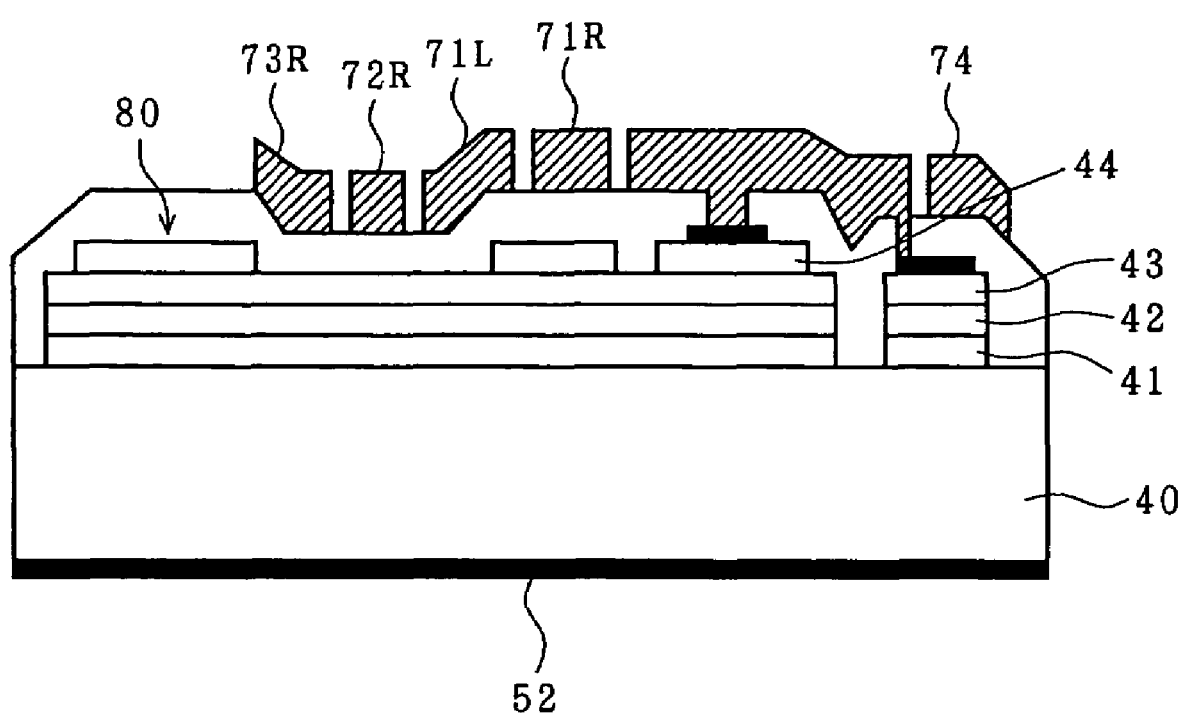
FIG. 21 shows a sectional view taken along D-D' line in FIG. 20.

FIG. 20 is a plan view of the structure of a chip in FIG. 19, and FIG. 21 is a sectional view taken along D-D' line in FIG. 20. It should be noted that in FIGS. 20 and 21, like reference numerals in FIGS. 17 and 18 are used for describing like elements.

The number of bonding pads may be decreased by 2 compared to the first example, resulting in the decrease of the chip area.

Third Example

While a start pulse terminal is provided in the first and second examples described above, it may be emitted by using a clock pulse as a start pulse.

Figure 22:
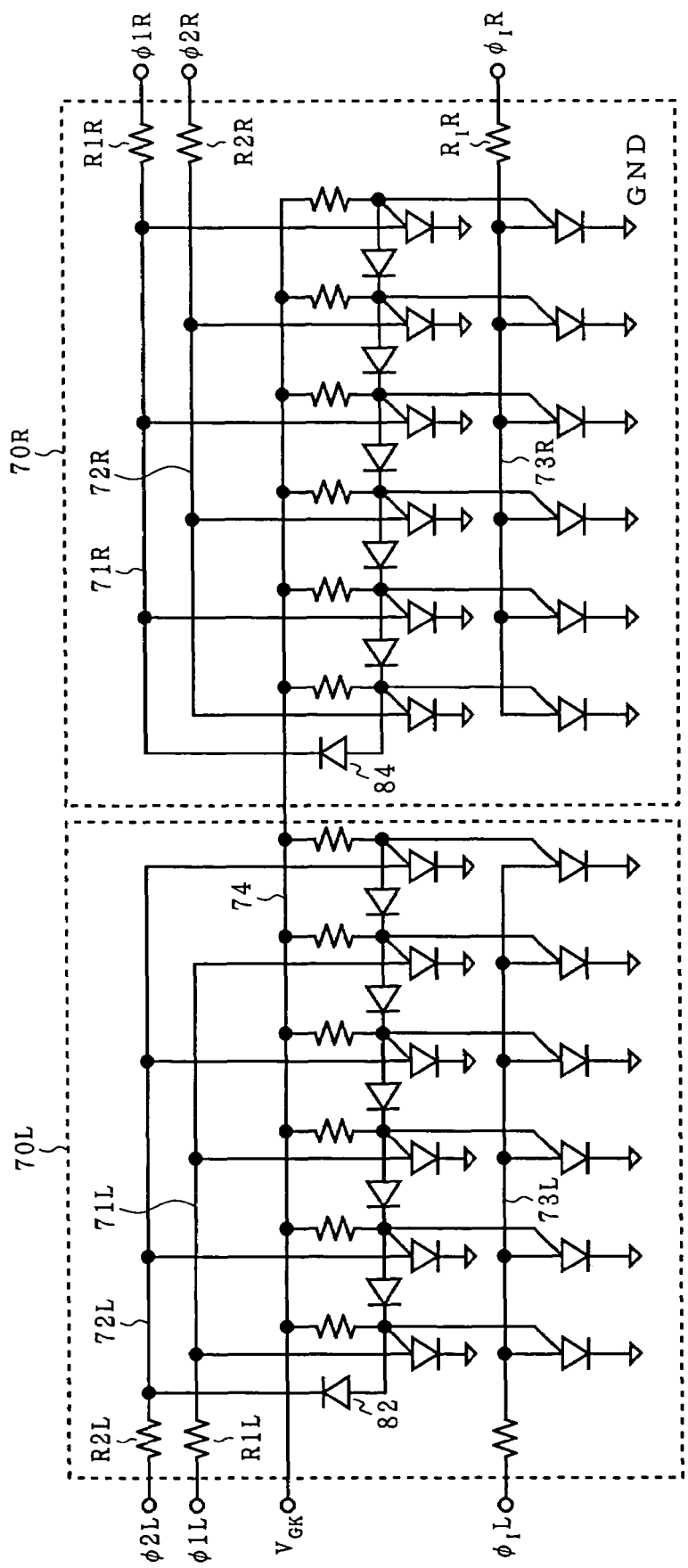
FIG. 22 shows an equivalent circuit diagram of a third example of a self-scanning light-emitting element array chip in accordance with the present invention.

FIG. 22 shows a circuit diagram having such structure described above. A diode 82 is provided between the gate of a leftmost thyristor in a transfer portion in the left circuit 70L and the ø2L line 72L, and a diode 84 is provided between the gate of a leftmost thyristor in a transfer portion in the right circuit 70R and the ø1R line 71R.

Figure 23:
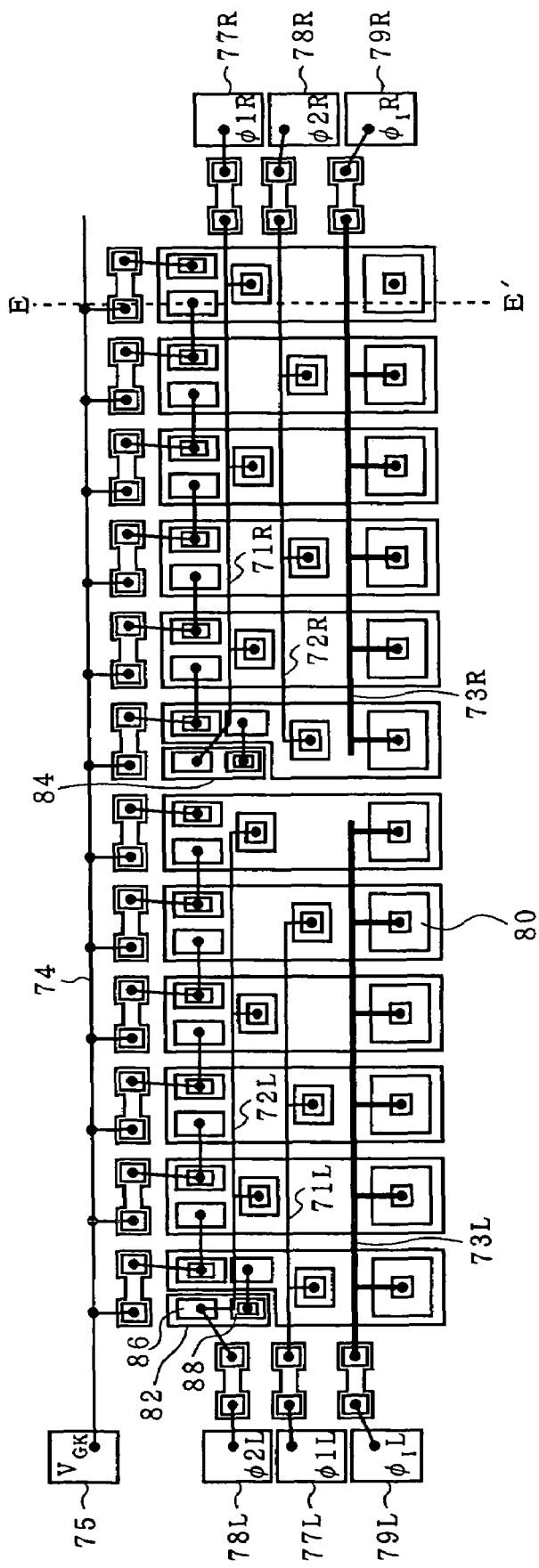
FIG. 23 shows a plan view of the structure of a chip in FIG. 22.

FIG. 23 is a plan view of the structure of a chip in FIG. 22, and FIG. 24 is a sectional view taken along E-E' line in FIG. 23. In the left circuit in FIG. 23, reference numerals 86 and 88 designate the cathode and anode of the diode 82, respectively.

According to the circuit of the present example, the $ø_S$L and $ø_S$R bonding pads may be omitted to decrease the area of a chip. While an illuminated point is transferred from left to right stating from the leftmost thyristor in each of the left and right circuits in the present example, a transfer direction may be optionally selected in the circuit structure having no $ø_S$ bonding pad, because a thyristor in a light-emitting portion to be started may be optionally selected.

Fourth Example

While one bonding pad may be provided for each of ø1 and ø2 in one chip in the second example, a space is required through which three clock pulse lines pass on a chip surface as apparent from FIG. 19. As a result, a problem related to an increase of a chip area is caused. To resolve the problem, in the present example, two thyristors in a light-emitting portion is illuminated simultaneously by providing a resistor $R_B$ between the anode of a thyristor in a transfer portion and the clock pulse line.

FIG. 25 shows a circuit diagram having such structure described above. Two ø1 line 30 and ø2 line 32 are provided, and respective anodes of thyristors $T_1L, T_2L, T_3L, \ldots$, and $T_1R, T_2R, T_3R$, in a transfer portion are connected to the ø1 line 30 and ø2 line 32 through resistors $R_B$, respectively. Other components are the same as that in FIG. 16.

Figure 26:
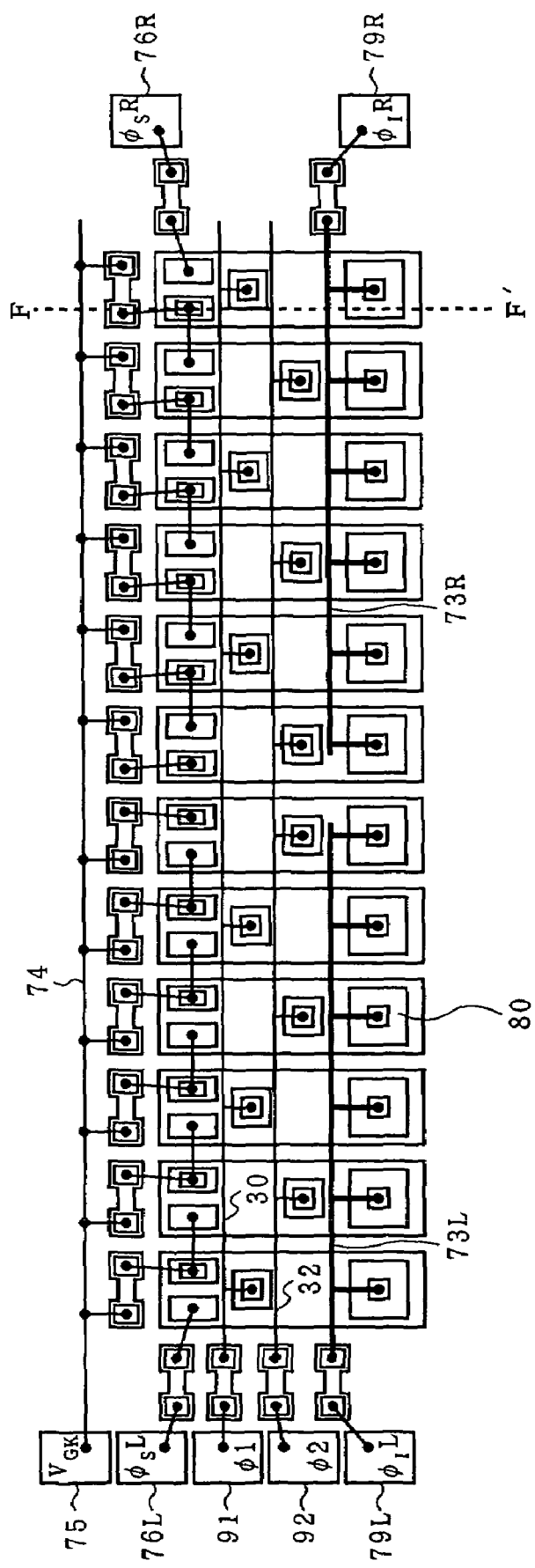
FIG. 26 shows a plan view of the structure of a chip in FIG. 25.
Figure 27:
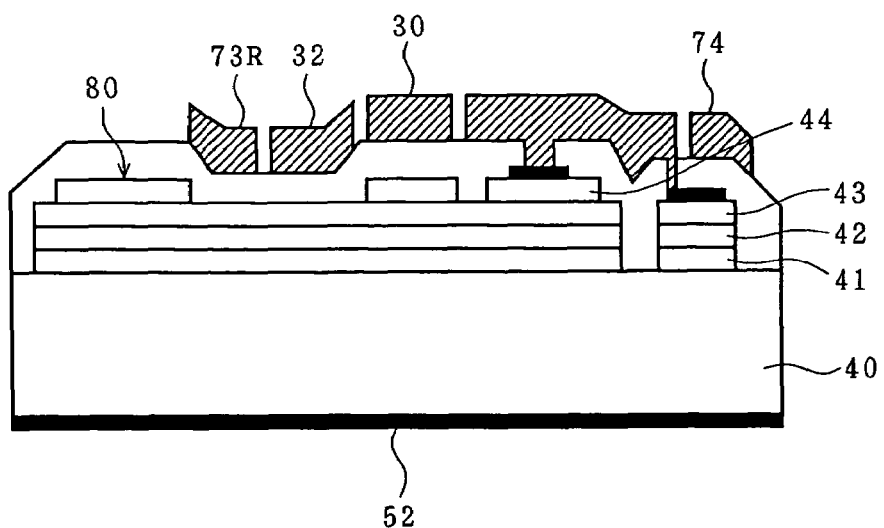
FIG. 27 shows a sectional view taken along F-F' line in FIG. 26.

FIG. 26 is a plan view of the structure of a chip in FIG. 25, and FIG. 27 is a sectional view taken along F-F' line in FIG. 26. In FIG. 26, reference numerals 91 and 92 designate ø1 and ø2 bonding pads, respectively.

A mechanism will now be described in which two adjacent thyristors in a transfer portion may be turned on simultaneously by providing the resistor $R_B$. The case in which the $ø_S$L and $ø_S$R terminals are at L level (i.e., ground potential) will now be considered. In this case, each threshold voltage $V_{th}$ of $T_1L$ and $T_1R$ is about $V_D$ (a diffusion potential of pn junction). When the clock pulse ø1 is driven to H level, any one of the thyristors $T_1L$ and $T_1R$ is turned on. The anode of the turned-on thyristor is now fixed to about $V_D$. At this time, the voltage of the clock pulse ø1 is set to the voltage larger than the anode voltage ($\approx V_D$) by the voltage drop of the resistor $R_B$ ($R_B$ is also used for designating a resistance of the resistor), thereby the thyristor which has not been turned on at a previous timing may be immediately turned on. That is, the thyristor $T_1L$ and $T_1R$ may be simultaneously turned on, thereby corresponding thyristors $L_1L$ and $L_1R$ may be illuminated simultaneously.

Figure 28:
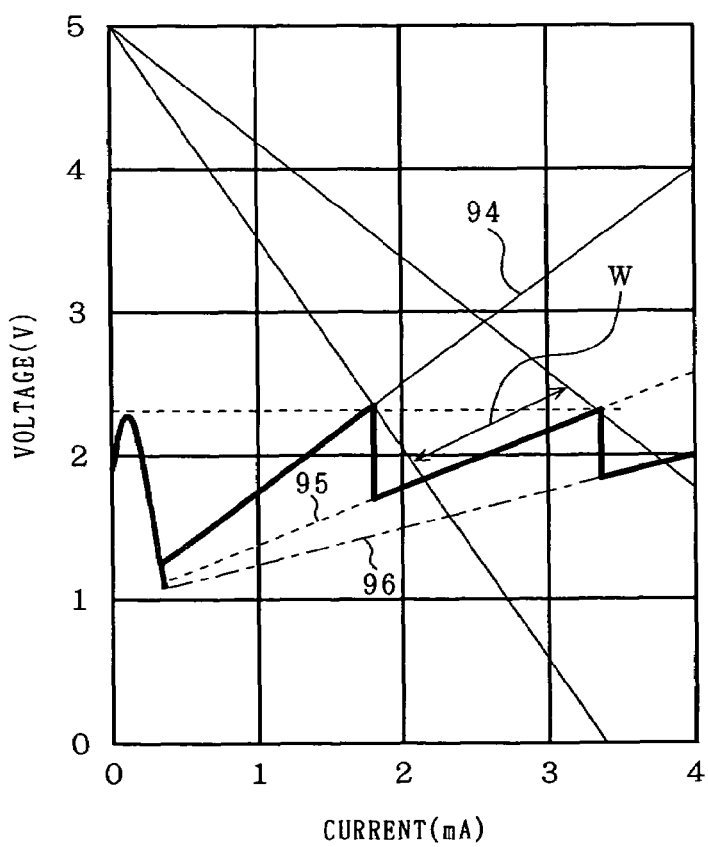
FIG. 28 shows a current-voltage (I-V) characteristic of a thyristor.

At this time, each threshold voltage $V_{th}$ of the thyristors $T_2L$ and $T_2R$ in a transfer portion is about $2V_D$. If the clock pulse ø2 is driven to H level, any one of the thyristors $T_2L$ and $T_2R$ is turned on. A current-voltage (I-V) characteristic of a thyristor in a transfer portion is shown in FIG. 28. The I-V characteristic designated by a solid line 94 is a characteristic in which one thyristor is turned on, and is expressed by $V=V_D+R_B\times I$. The I-V characteristic designated by a dotted line 95 is a characteristic in which two thyristors are turned on, and is expressed by $V=V_D+(R_B/2)\times I$. The I-V characteristic designated by a dashed line 96 is a characteristic in which three thyristors are turned on, and is expressed by $V=V_D+(R_B/3)\times I$.

If the resistance $R_B$ and current limiting resistance R2, and a clock pulse voltage are selected so as to be I=3 mA, the voltage of ø2 line becomes lower than the threshold voltage ($\approx 2V_D$) of the thyristor which could not be turned on, so that only one thyristor may be illuminated. However, as a current is increased, the voltage of ø2 line is going up, and finally exceeds the threshold voltage. As a result, the I-V characteristic is changed from the solid line 94 to the dotted line 95 so that two thyristors $T_2L$ and $T_2R$ are turned on simultaneously.

In this case, the resistance $R_B$ and current limiting resistance R2 are selected such that two thyristors in a transfer portion may turned on, and three thyristors may not be turned on simultaneously.

In order that two thyristors are turned on when a current I flows through the ø2 line, the following relation must be established.

$$V_{th}<V_D+R_B\times I$$

Also, the following relation must be established in order that three thyristors are not turned on.

$$V_{th}>V_D+(R_B/2)\times I$$

Considering to the current I, the relation may be deformed as follows;

$$2(V_{th}-V_D)+R_B>I>(V_{th}-V_D)/R_B.$$

The current I is determined by H level voltage $V_H$ of a clock pulse and the resistance R2, and is expressed in the following relation.

$$I=(V_{th}-V_D)+R2$$

These relations are also established in a case that a current I flows through the ø1 line.

These relations and the operational condition of a thyristor are considered to determine the resistances $R_B$, R1 and R2. In the I-V characteristic in FIG. 28, the resistances R1 and R2 are R1>411 Ω and R2<800 Ω when R3=375 Ω.

While the resistor $R_B$ may be fabricated in various manners, the contact resistance between the anode electrode and the anode layer may be used as the resistor $R_B$, for example, the contact resistance being regulated to be increased by setting the impurity concentration in the epitaxial anode layer to a lower level.

The resistor $R_B$ may be fabricated in another method, for example, a resistor layer is formed between the anode electrode and the metal wiring, or a resistor is made using a semiconductor layer, a metal film, or the like.

Fifth Example

In the first, second, third and fourth examples, the structure has been illustrated in which the $ø_I$ line is arranged along one side of the thyristor array in a light-emitting portion (see FIGS. 17, 20, 23 and 26). If more light exposure is required, the $ø_I$ line is divided into two parallel lines, and the divided $ø_I$ lines are arranged along both sides of the thyristor array so that four thyristors are illuminated simultaneously in one chip.

Figure 29:
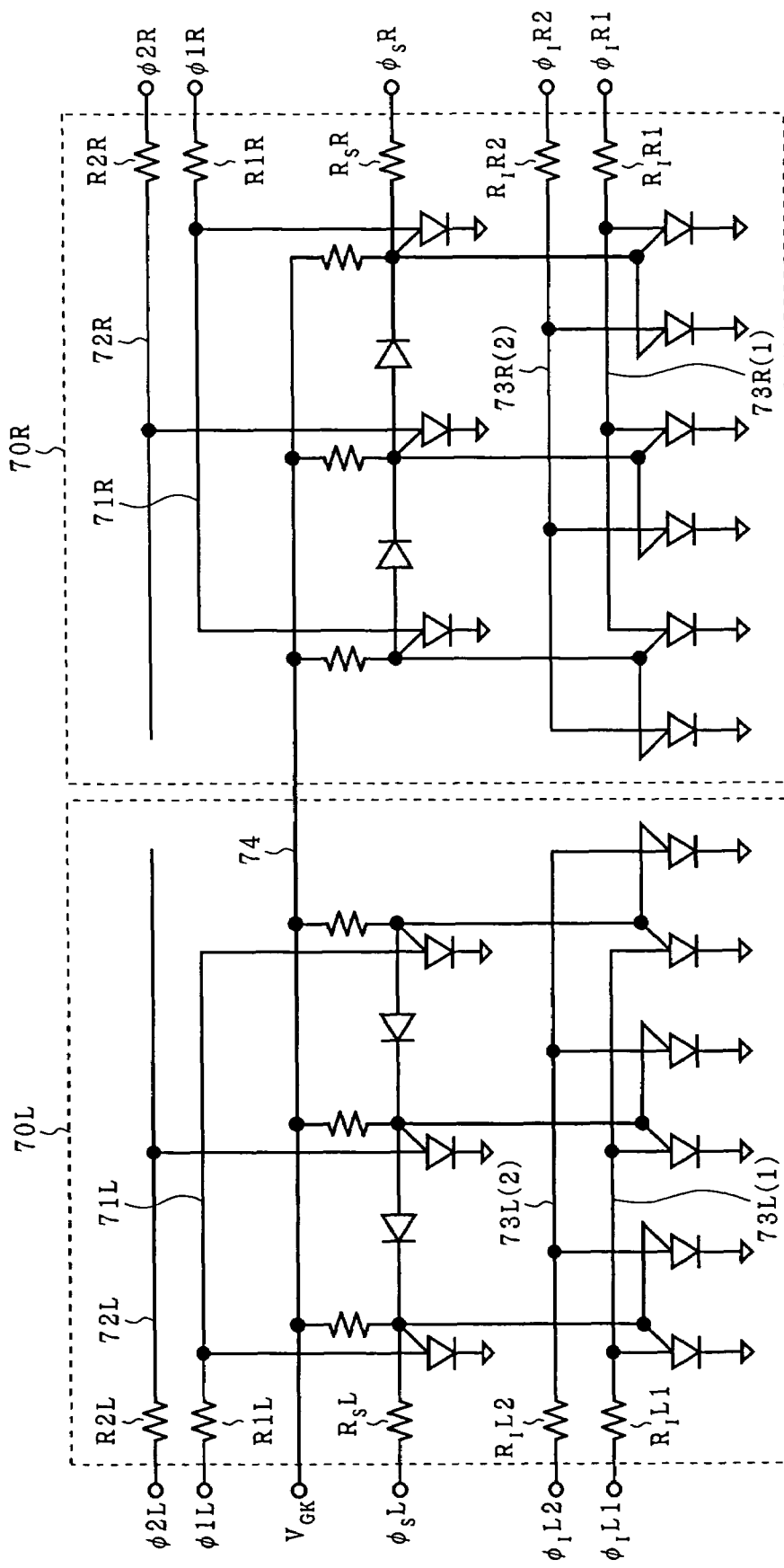
FIG. 29 shows an equivalent circuit diagram of a fifth example of a self-scanning light-emitting element array chip in accordance with the present invention.

FIG. 29 shows a circuit diagram having such structure described above and FIG. 30 shows a plan view of a chip. The present example has the structure such that the $ø_I$ L line 73L and $ø_I$R line 73R are divided into two parallel lines, respectively.

Two thyristors in a light-emitting portion corresponds to one thyristor in a transfer portion as shown in FIG. 29. The thyristors in a light-emitting portion are connected to $ø_I$L line 73L(1) and $ø_I$L line 73L(2) alternately in the left circuit 70L, and the thyristors in a light-emitting portion are connected to $ø_I$R line 73R(1) and $ø_I$R line 73R(2) alternately in the right circuit 70R.

In the FIG. 30, 79L(1) and 79L(2) designate the bonding pads for the $ø_I$L1 and $ø_I$L2 lines, respectively, in the left circuit 70L; and 79R(1) and 79R(2) designate the bonding pads for the $ø_I$R1 and $ø_I$R2 lines, respectively, in the right circuit 70R.

According to this structure, two thyristors in each the left circuit 70L and right circuit 70R, i.e., total four thyristors may be illuminated simultaneously.

It is appreciated that the structure such that four thyristors are illuminated simultaneously may also be applied to the second, third and fourth examples.

Fourth Embodiment

The present embodiment is directed to a method for driving a diode-coupled self-scanning light-emitting element array by a 3.3V power supply system, and a driver circuit for implementing the driving method.

The minimum value of an operating voltage in the diode-coupled self-scanning light-emitting element array shown in FIG. 3 is determined by the turn-on voltage $V_t$ of a thyristor in a transfer portion. It has already been stated that when the thyristor $T_n$ is turned on, the voltage to turn on the thyristor $T_{n+1}$ is approximated by a gate electrode voltage $V_G$+a diffusion potential $V_D$ of pn junction between a gate layer and anode layer.

Correctly speaking, the turn-on voltage $V_t$ of a thyristor is expressed as follows;

$$V_t = V_G + V_D + R_P \times I_{th}$$

herein, $R_P$ is a gate parasitic resistance, and $I_{th}$ is a threshold current. Also, the gate electrode voltage $V_G$ is expressed as follows;

$$V_G = G_{GON} + V_D$$

herein, $V_{GON}$ is a gate electrode voltage of the turned-on thyristor $T_n$. If GaAs material is used for fabricating a thyristor, then $V_D$=1.2V, $V_{GON}$=0.3, $I_{th}$=about 10 μA, and $V_t$=about 2.8V.

In order to turn on the thyristor $T_{n+1}$, it is required that the anode voltage of the thyristor $T_{n+1}$ exceeds the turn-on voltage $V_t$ during the thyristor $T_n$ is turned on. An overlap time $t_a$ during which the clocks pulses ø1 and ø2 are driven to H level simultaneously is determined as an interval required to turn on the thyristor $T_{n+1}$ by charging the ø1 or ø2 line connected to the thyristor $T_{n+1}$.

Assuming that the capacitances of the ø1 and ø2 lines are C1 and C2, respectively, and the resistances of the current limiting resistors are R1 and R2, the voltage V1 of the ø1 line after t seconds from the time when the ø1 line is driven to H level becomes as follows;

$$V1 = V_H(1-\exp(-t/R1 \times C1))$$

herein, $V_H$ is a voltage of H level. That is, the overlap time $t_a$ has a value in a range which satisfies with the following relation.

$$V_t < V_H(1-\exp(-t_a/R1 \times C1))$$

With respect to the ø2 line, the overlap time $t_a$ has a value in a range which satisfies with the following relation.

$$V_t < V_H(1-\exp(-t_a/R2 \times C2))$$

A thyristor in a light-emitting portion may not be turned on during the overlap time $t_a$, so that a fraction of interval during which a thyristor may be illuminated is decreased as the overlap time $t_a$ is increased.

When a power supply of 3.3V system is used, the operation at 3.0V must be insured on the assumption that a voltage variation of about ±10% may be caused. When driven by a supply voltage of 3.0V, the longer overlap time $t_a$ is required to charge a clock line to 2.8V.

The current limiting resistances R1 and R2 are caused to be small to decrease the overlap time $t_a$, which increase a power consumption because a current through a thyristor after turned on becomes large.

Even if the resistances R1 and R2 are caused to be small, the decrease of the overlap time $t_a$ is saturated due to another factor. This is because the pn-junction between a gate layer and anode layer must be viased in a forward direction to turn on a thyristor. It is now considered that when the thyristor $T_{2n}$ is turned on, the clock pulse is driven to H level to turn on the thyristor. $T_{2n+1}$. The gate voltage $V_G$ of the thyristor $T_{2n+1}$ is higher than the anode voltage $V_A$ when the clock pulse ø1 is at H level. Thereby, the pn-junction between the gate layer and anode layer is reversely viased, so that the pn-junction is regarded as a capacitance $C_P$ in which some charge is stored. The capacitance is charged/discharged through a gate parasitic resistance $R_P$, so that the charge/discharge has a time constant of about $R_P \times C_P$. The time constant of $R_P \times C_P$, therefore, determines the charge/discharge speed in the case of $R_P \times C_P < R1 \times C1$.

According to the driving method of the present example, the overlap time $t_a$ may be shorter by precharging a clock pulse line to a voltage which does not exceed the turn-on voltage $V_t$, even if the lower supply voltage is used. The variation in time of the voltage of the ø1 line is shown in FIG. 31, which is in the case that the overlap time $t_a$ is sufficiently enlarged when the thyristor $T_{2n+1}$ is caused to be turned on with the thyristor $T_{2n}$ being turned on. The curve 101 shows the voltage variation in time of the ø1 line which is precharged to 2V, and the curve 102 the voltage variation in time of the ø1 line which is not precharged.

While the thyristor is turned on at about 25 ns in a case that the ø1 line is precharged to 2V, the thyristor which is not precharged takes about 55 ns to be turned on. The overlap time $t_a$ is required to extend over the time when the thyristor is turned on, so that the overlap time may be shortened by precharging the clock pulse line.

In the diode-coupled self-scanning light-emitting element array shown in FIG. 3, the relation among the current limiting resistance R1, the voltage to be precharged (1V, 2V and 2.5V), and the minimum value of the overlap time $t_a$ required for transferring has been determined. The result is shown in FIG. 32. In the case of no precharge (0V), the overlap time $t_a$ is shortened to only about 40 ns even if the resistance R1 is decreased to as small as 100 Ω. However, the overlap time $t_a$ may be shortened to as small as 10 ns if a precharge is carried out.

While a voltage smaller than the turn-on voltage $V_t$ is selected as a precharge voltage, the voltage smaller than the turn-on voltage $V_t$ by 0.2V or more is preferable in order that a thyristor is not erroneously turned on by an effect of noise.

First Example

Referring to FIG. 33, there is shown an example of a circuit for driving the diode-coupled self-scanning light-emitting element array shown in FIG. 3. A self-scanning light-emitting element array chip 110 and a driver circuit 112 are shown in FIG. 33. Bonding pads of ø1, ø2, $V_{GK}$, $ø_S$ and $ø_I$ are illustrated in the chip 110.

In the driver circuit 112, two power supplies, i.e., power supplies $V_P1$ (3.3V) and $V_P2$ (2.5V) are provided. A CMOS inverter buffers 160 is used for generating a start pulse $ø_S$ and write signal $ø_I$, respectively. The inverter 160 comprises of a P-channel MOSFET 161 and N-channel MOSFET 162. The drain of the P-channel MOSFET 161 is connected to the power supply $V_P1$, and the source of the N-channel MOSFET 162 is grounded. The gates of these MOSFET are connected to control signal terminals 120 and 140, respectively. A connecting point of the source of the P-channel MOSFET 161 and the drain of the N-channel MOSFET 162 is connected to the $ø_S$ bonding pad of the chip 110 through a current limiting resistor $R_S$.

In order to form the clock pulse ø1 and ø2, a circuit 170 is used in which three analog switches 171, 172 and 173 each having a control terminal are combined. Each of the analog switches 171, 172 and 173 uses a type of switch which is closed or opened at H level or L level of the control terminal. One ends of the switches 172 and 173 are connected to the power supply $V_P2$ and $V_P1$, respectively, and the other ends of these switches are both connected to the one end of the switch 171 and connected to the ø1 bonding pad of the chip 110 through a current limiting resistor R1. The other end of the switch 171 is grounded. Each control terminal of the switches 171, 172 and 173 is connected to the terminals 130, 131 and 132, and the terminals 150, 151 and 152, respectively.

Figure 34:
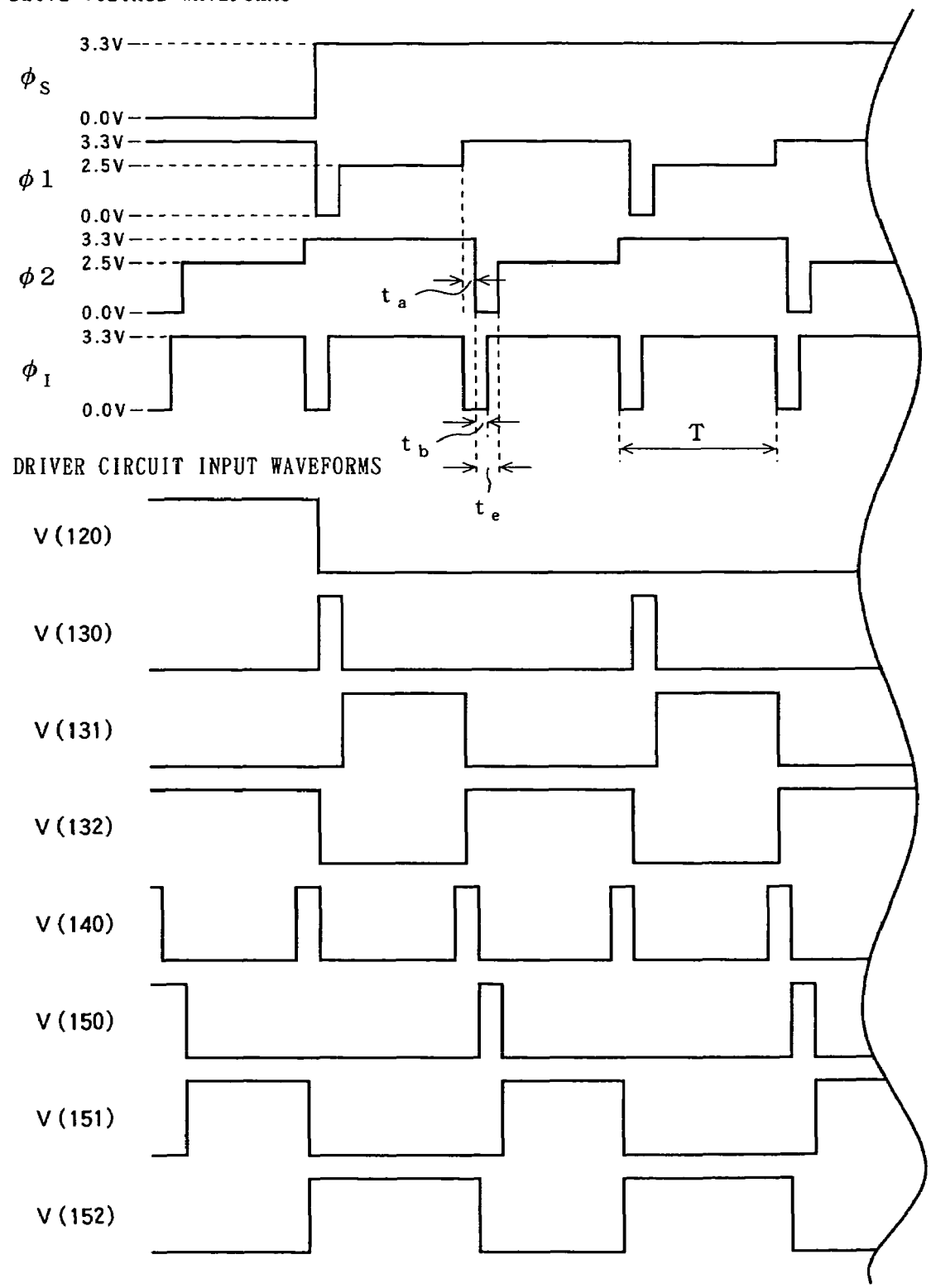
FIG. 34 shows the waveforms of input/output of the drive circuit in FIG. 33.

The waveforms of input/output signals of the driver circuit are shown in FIG. 34. The upper part of FIG. 34 shows the waveforms of the $ø_S$, ø1, ø2, and $ø_I$ applied to the chip 110, and V(120), V(130) . . . of the lower part of FIG. 34 show the waveforms of the control signals at the terminal 120, 130 . . . . When the control voltage V(120) is driven to H level to turn off the FET 161 and turn on the FET 162, the start pulse $ø_S$ falls from 3.3V to 0V so that a thyristor in a transfer portion is turned on by the clock pulse ø1. The start pulse $ø_S$ is returned to 3.3V at the same time as the clock pulse falls.

When the levels of the control voltages V(130), V(131), and V(132) are varied as shown in the figure, the switches 171 and 173 are opened and the switch 172 is closed to precharge the ø1 line from 0V to 2.5V. Then, the switch 172 is opened and the switch 173 is closed to rise the ø1 line to 3.3V. Similarly, when the levels of the control voltages V(150), V(151), and V(152) are varied as shown in the figure, the ø2 line is precharged from 0V to 2.5V and then rises to 3.3V.

The interval $T_a$ is a time during which the clock pulse ø1 of 3.3V and clock pulse ø2 of 3.3V are overlapped. The interval $T_b$ is a time until the write signal $ø_I$ rises after each of the clock pulses ø1 and ø2 fall, and the interval $t_e$ is a time during which each of the clock pulses ø1 and ø2 is driven to 0V, and T is a period of the write signal $ø_I$. The interval $t_b$ is also a time required for suppressing the effect of the thyristor illuminated just before in a light-emitting portion.

According to the present example, the ø1 and ø2 lines are precharged to 2.5V, so that the time during which the voltage of each of the lines rises to 3.3V becomes fast, thereby the overlap time $t_a$ may be shortened.

In the present example, the operation in $t_a$=30 ns, $t_b$=10 ns, $t_e$=100 ns, and T=250 ns has been confirmed.

Second Example

Figure 35:
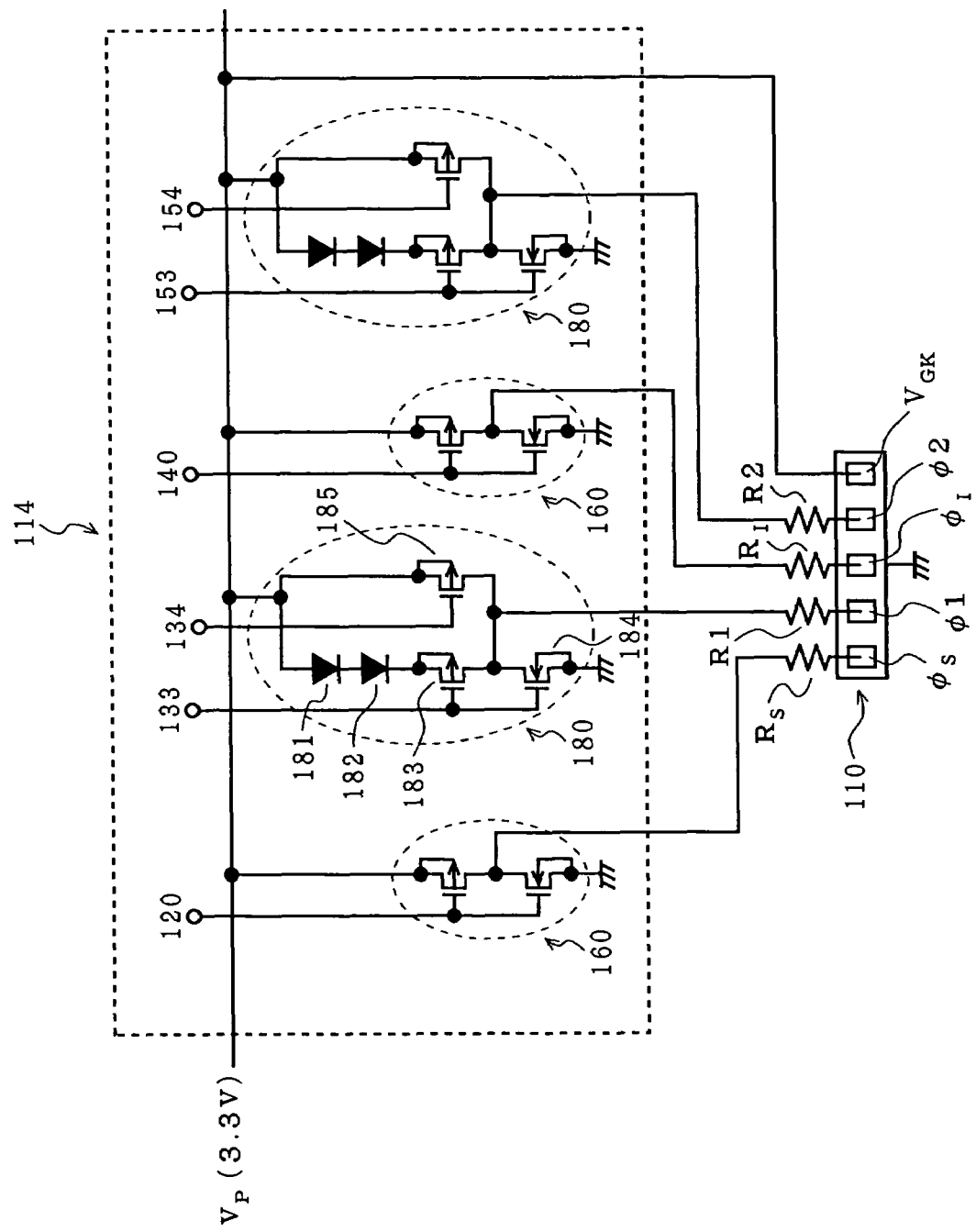
FIG. 35 shows another example of a circuit for driving a diode-coupled self-scanning light-emitting element array.

While two power supplies of 3.3V and 2.5V are prepared in the first example described above, it is desirable that only one power supply of 3.3V is used. For this purpose, a buffer circuit including a level shifter is used for driving the clock pulses ø1 and ø2. A driver circuit of the present example is shown in FIG. 35. A chip 110 and a driver circuit 114 are shown in the figure, the bonding pads for ø1, ø2, $V_{GK}$, $ø_S$ and $ø_I$ being provided on the chip 110.

In the figure, reference numeral 180 designates an inverter buffer circuit including a level shifter. The buffer circuit comprises a level shifter consisting of two stages of diodes 181 and 182, a P-channel MOSFET 183, N-channel MOSFET 184, and a P-channel MOSFET 185. The P-channel MOSFET 183 and N-channel MOSFET 184 are connected in series to the diodes, and the P-channel MOSFET 185 is connected in parallel to the series circuit of the level shifter and the P-channel MOSFET 183. The anode of the diode 181 and the source of the P-channel MOSFET 185 are connected to a power supply $V_P$ (3.3V). The gates of the P-channel MOSFET 183 and 185 are connected to control signal terminals 133 and 134, and control signal terminals 153 and 154, respectively.

The voltage drop per stage of the diodes 181 and 182 which constitute the level shifter is about 0.6V, so that 1.2V is dropped in total for two stages. Therefore, in the case of a 3.3V power supply, the voltage through the diode level shifter becomes 2.1V.

Figure 36:
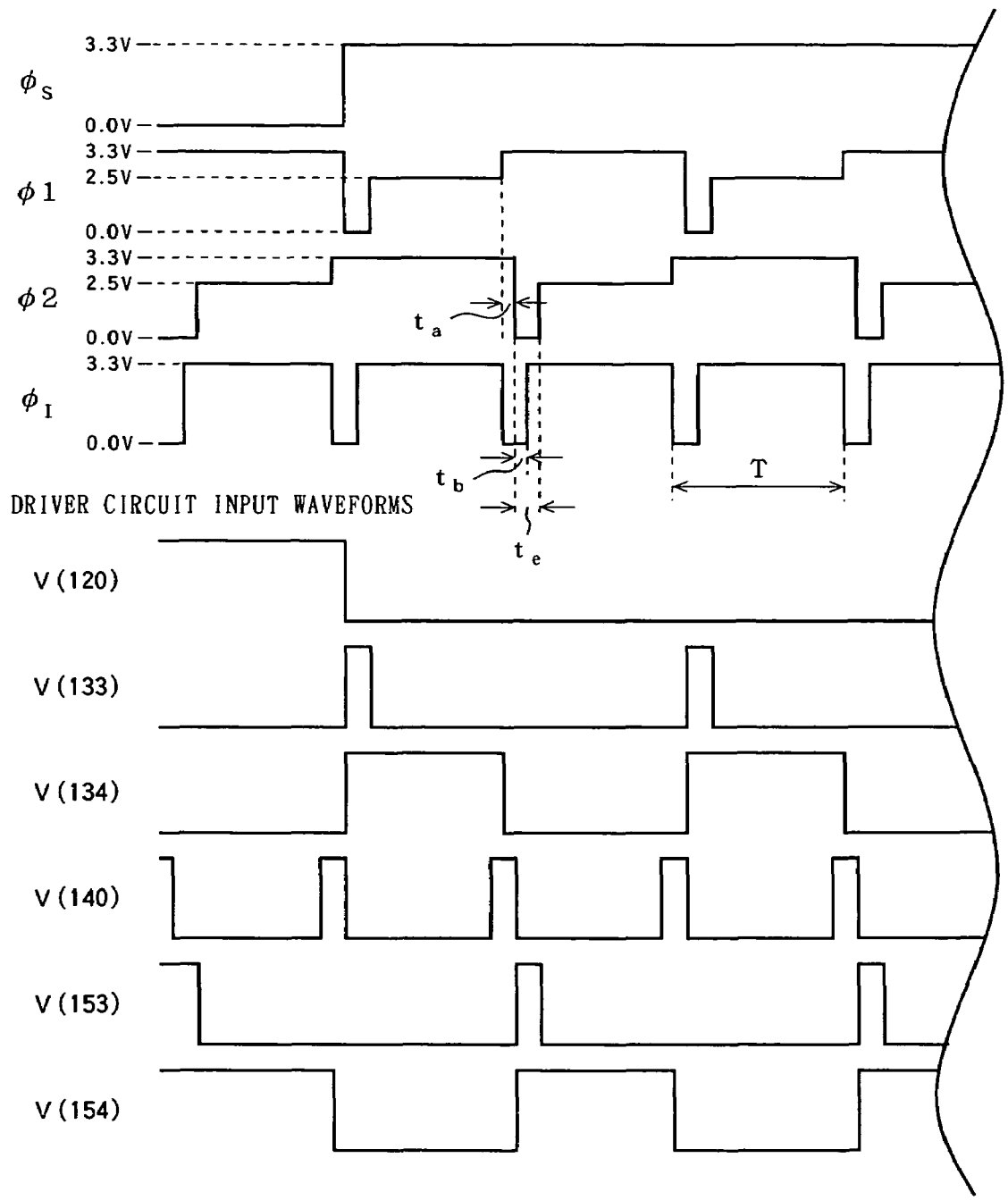
FIG. 36 shows the waveforms of input/output signals of the driver circuit in FIG. 35.

The waveforms of input/output signals of the driver circuit are shown in FIG. 36. In the case of the inverter buffer circuit 180, the control voltage V(133) is driven to H level when the control voltage V(134) is H level, thereby the FET 183 is turned off and the FET 184 is turned on to cause the ø1 line to 0V. When the control voltage V(133) is driven to L level, thereby the FET 183 is turned on and the FET 184 is turned off to cause the ø1 line to 2.1V. When the control voltage V(134) is driven to L level, thereby the FET 185 is turned-on to cause the ø1 line to 3.3V.

The reason why the number of stages of diodes is selected to 2 is to cause the voltage after level shifted not to exceed the turn-on voltage $V_t(=2.8V)$ when the supply voltage swings in a range of 3.3-3.6V.

Third Example

Figure 37:
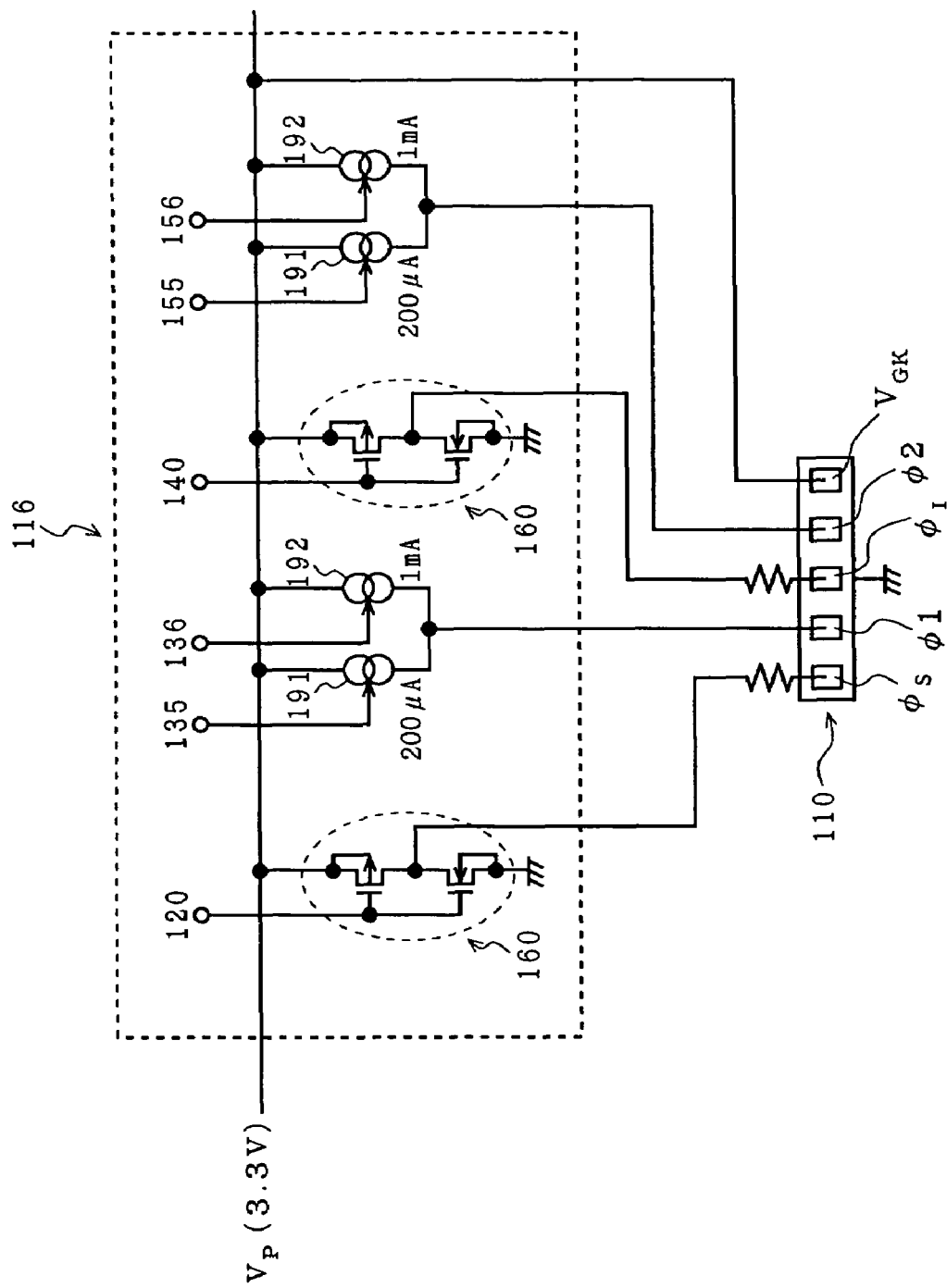
FIG. 37 shows still another example of a circuit for driving a diode-coupled self-scanning light-emitting element array.

While the driver circuit is operated by supplying voltage signals in the first and second examples described above, the driver circuit for clock pulses ø1 and ø2 may be operated by current signals according to the present example. A driver circuit 116 of the present example is shown in FIG. 37. The parallel circuit consisting of current sources 191 (0.2 mA) and 192 (1 mA) each having a control terminal is used as a driver circuit for clock pulses ø1 and ø2.

Figure 38:
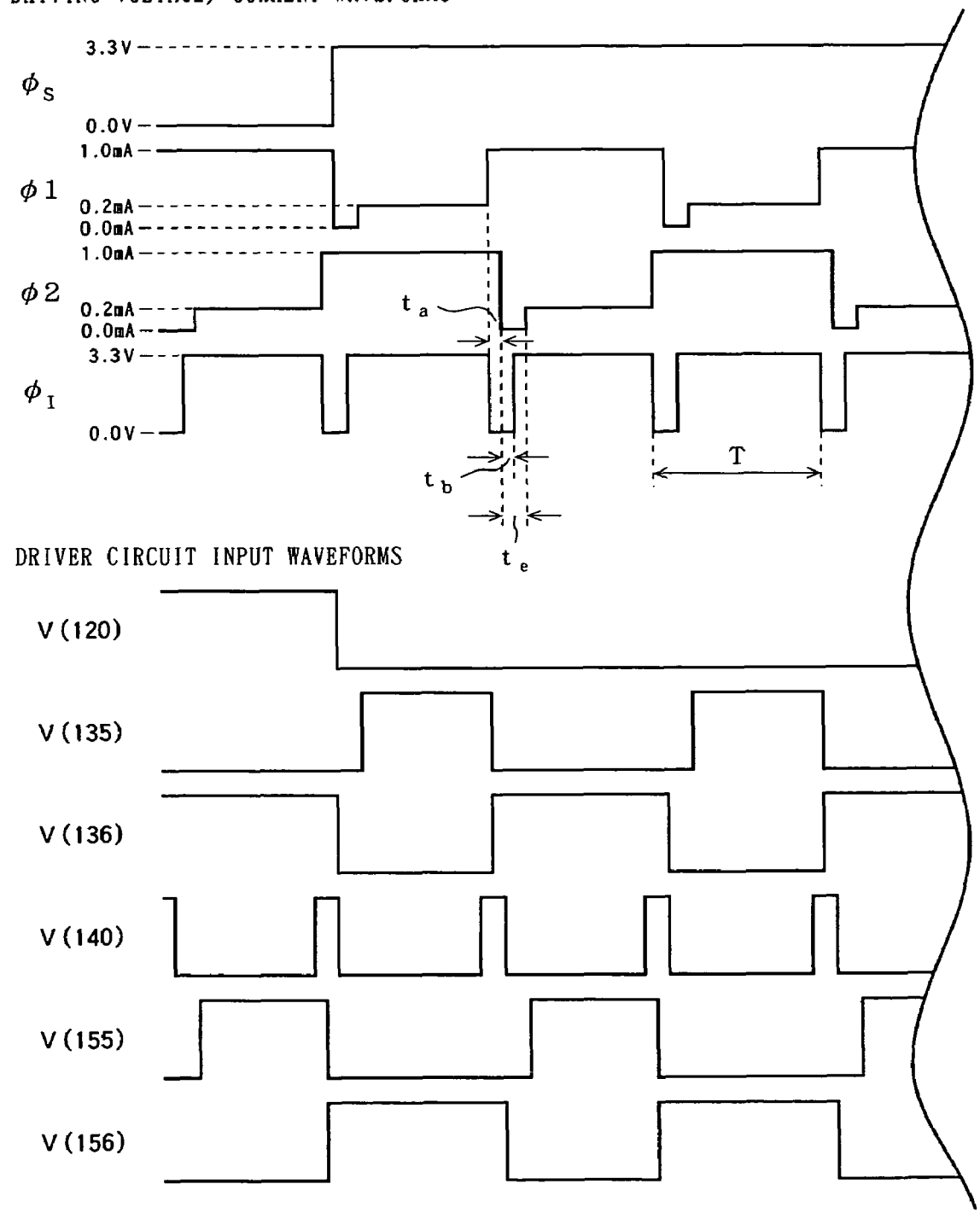
FIG. 38 shows the waveforms of input/output signals of the driver circuit in FIG. 37.

The control terminals of the current sources 191 are connected to the control signal terminals 135 and 155, respectively. The control terminals of the current sources 192 are connected to the control signal terminals 136 and 156, respectively. These current sources 191 and 192 operate to flow predetermined currents of 200 µA and 1 mA, respectively, when the control terminals are at H level, and operate not to follow currents when the control terminals are at L level. The waveforms of input/output signals of the driver circuit are shown in FIG. 38.

When a current of 200 µA is generated through the current sources by driving each of the voltages V(135) and V(155) to H level, the anode voltage of a thyristor in a transfer portion becomes about 2.5V based on the current-voltage (I-V) characteristic of a thyristor shown in FIG. 39. In this state, the thyristor in a transfer portion is not completely turned on. Therefore, a thyristor in a light-emitting portion connected to the thyristor in a transfer portion may not be illuminated. When a current of 1.0 mA is generated through the current sources by driving each of the voltages V(136) and V(156) to H level, a thyristor in a transfer portion may be turned on, thereby a thyristor in a light-emitting portion is illuminated. According to this method, the same result may be obtained as when the ø1 and ø2 lines are precharged.

Fourth Example

In the first and second examples, a voltage of 3.3V is usually applied to a thyristor in a transfer portion in order to hold the on-state thereof. However, the on-state of a thyristor may be held by supplying a holding current thereto. It is enough, therefore, to keep a current value above the value of a holding current. Accordingly, a power consumption may be decreased in the circuit of the first and second example by varying the control signals of the driver circuit to decrease the voltages of ø1 and ø2 after the interval $t_a$.

Figure 40:
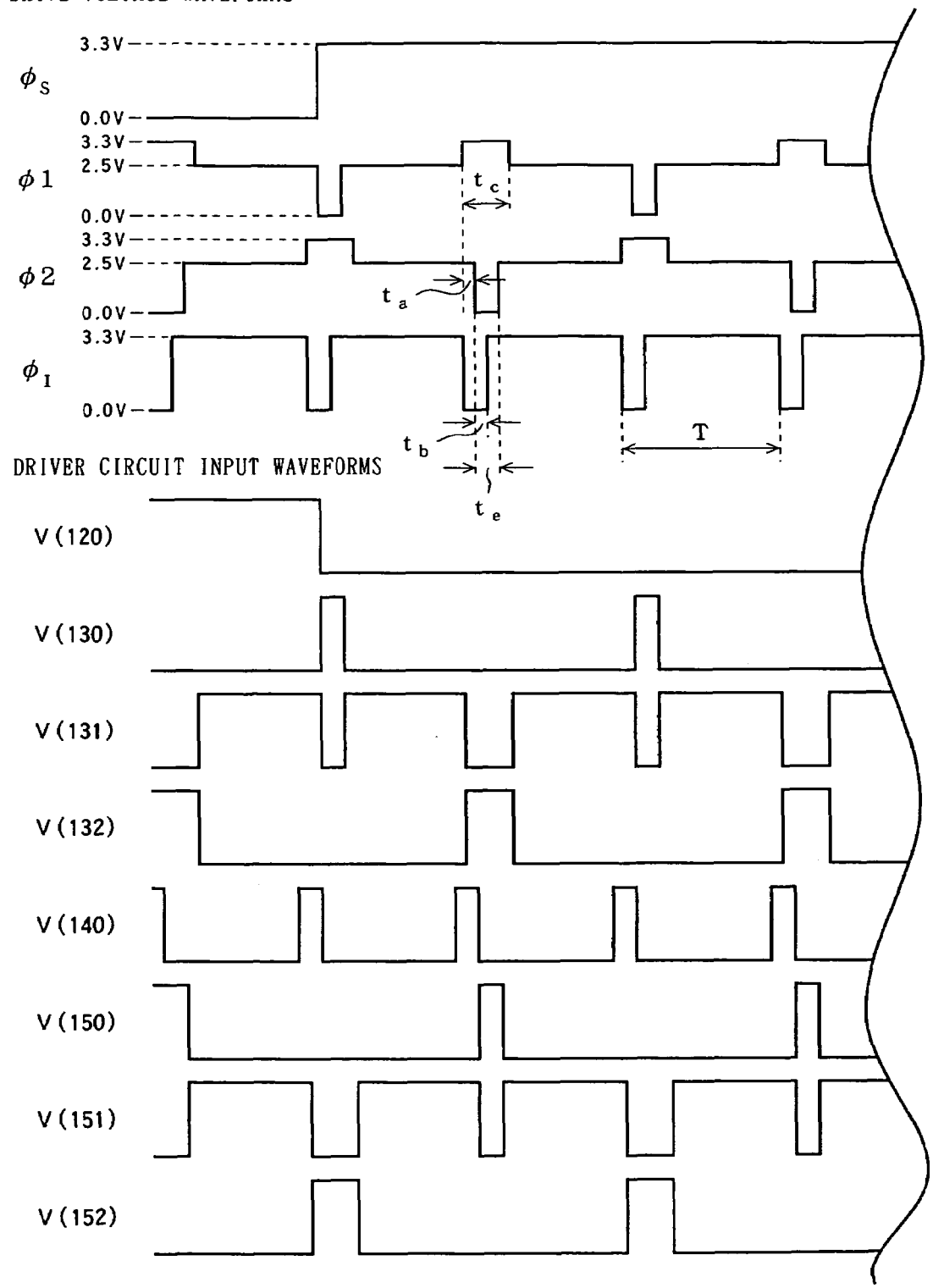
FIG. 40 shows another waveforms of input/output signals of the driver circuit in FIG. 35.

The driver circuit in the first example is now operated by using control signals of waveforms shown in FIG. 40. The waveforms of ø1 and ø2 as shown in the figure may be obtained by the waveforms of V(130), V(131), V(132), V(150), V(151) and V(152) which are input waveforms to the driver circuit. As apparent from the comparison with the waveforms of ø1 and ø2 in FIG. 34, the duration of a voltage of 3.3V is shortened.

Each of the voltages of ø1 and ø2 line is about 1.6V when a thyristor in a transfer portion is turned on. Therefore, when each resistance of the current limiting resistors R1 and R2 is 500 Ω, the current through a turned-on thyristor in a transfer portion is 3.4 mA at 3.2V of ø1 and ø2, and 1.8 mA at 2.5V of ø1 and ø2. In this manner, a current value through a thyristor becomes smaller, thereby a power consumption in a transfer portion may be decreased in approximately half.

Similarly, the duration of a voltage of 3.3V may be shortened by using the driver circuit in the second example. In this case, a power consumption in a transfer portion may also be decreased.

According to the present embodiment, a method for driving a diode-coupled self-scanning light-emitting element array by a power supply of 3.3V system may be implemented, in which the overlap time $t_a$ may be shortened. Further, it is possible to provide a driver circuit for carrying out the driving method.

In the embodiments described above, the case of two-phase clock pulses has been illustrated. However, it is apparent that the embodiments are not limited to the two-phase clock pulses, but applied to a self-scanning light-emitting element array using m-phase (m is an integer of 2 or more) clock pulses.

Fifth Embodiment

The present embodiment is directed to an optical writing head in which stripes are not printed on a paper sheet at the junctions of light-emitting element array chips arrayed in a zigzag manner, and a method for arranging a rod-lens array and a light-emitting element array to implement the above-described optical writing head.

In a self-scanning light-emitting element array, there is an array in which a plurality of chips are arrayed in a linear manner. As shown in FIG. 41A, if a plurality of chips 200 are arrayed in a linear manner with the ends of adjacent chips being butted to each other, it is impossible to make an array pitch of light-emitting element 202 constant over the self-scanning light-emitting element array. In order to avoid this, the chips are arrayed in a zigzag manner as shown in FIG. 41B with the ends of each chip being overlapped to one another to make an array pitch of light-emitting elements at the junctions of chips constant. Herein, the junction corresponds to a portion where an endmost light-emitting element of one self-scanning light-emitting element array chip and an endmost light-emitting element of the other self-scanning light-emitting element array chip are arranged in one array pitch. The junction is shown with enclosing by a dotted line 204 in FIG. 41B.

Also, there is a light-emitting element array in which light-emitting elements themselves are arrayed in a zigzag manner to form two rows of light-emitting elements. This light-emitting element array may realize a doubled resolution compared with one row of light-emitting elements.

When a printing is carried out by an optical writing head using the light-emitting element arrays described above, stripes may be printed on a paper sheet at the junctions of chips or at the adjacent portion between a light-emitting element in one row and a light-emitting element in the other row, depending on the structure of a rod-lens array and the arrangement of the rod-lens array and the light-emitting element array.

The reason thereof will now be described. Referring to FIG. 42, there is shown a rod-lens array 209 in which rod-lenses 206 are stacked triangularly in two rows, i.e., upper and lower rows. In the figure, it is assumed that a straight line drawn in an array direction of rod-lenses, which connects points at which the upper row of rod-lenses and the lower row of rod-lenses are contacted, is an X-axis, and a straight line drawn perpendicularly to the X-axis at a point 210 at which the lower row of adjacent rod-lenses are contacted is a Y-axis.

The rod-lens array is fabricated by arraying rod-lenses regularly and precisely between two frame plates (not shown) with the gap between rod-lenses being filled by means of a black resin to avoid a flare.

It is assumed that D=0.563 mm, TC=9.1 mm, Z=4.45 mm, $L_O$=2.33 mm, $N_o$=1.627, and g=0.843 mm$^{-1}$ at a wave length of 740 nm, herein D is the diameter of a rod-lens, Z is the length thereof, TC is the total conjugate length (the length between an object and an image plane), $L_o$ is the working distance (the length between a lens surface and an object or image plane), $N_o$ is the refractive index on the optical axis of a lens, and g is the secondary index distribution constant.

Figure 43A:
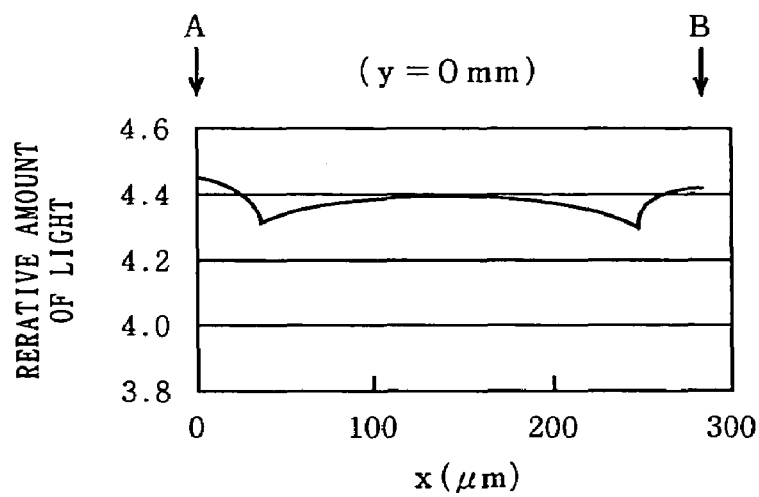
FIGS. 43A, 43B and 43C show the variation in the amount of light in an X-axis direction between points A and B was calculated for three cases of y=0 mm, 0.05 mm, and 0.10 mm.
Figure 43B:
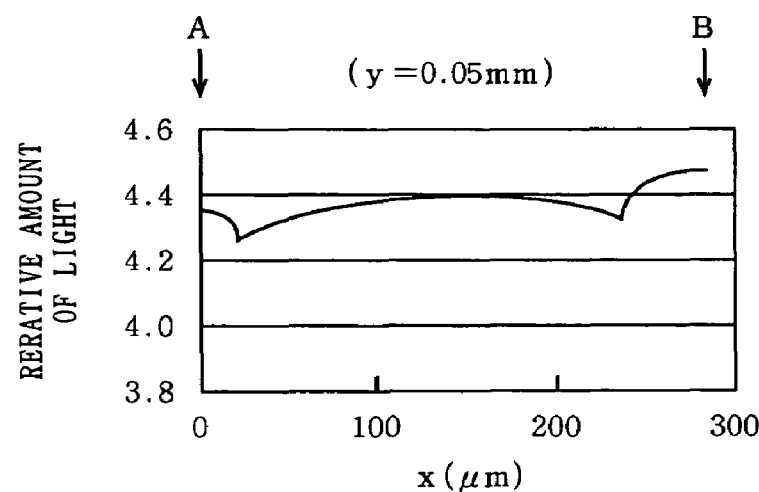
Figure 43C:
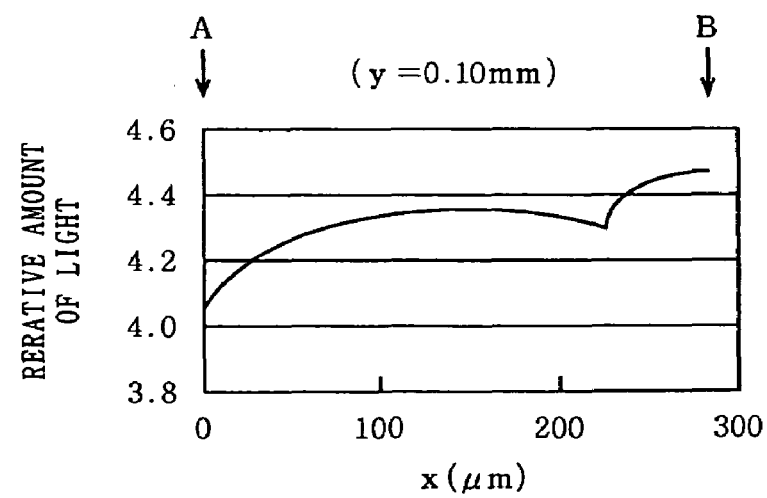

In such a rod-lens array, the variation in the amount of light in the X-axis direction between the points A and B shown in the figure was calculated for three cases of y=0 mm, 0.05 mm, and 0.10 mm (y is a position in the Y-axis direction), the result of which are shown in FIGS. 43A, 43B, and 43C. In these figures, the point A designates the position in x=0, the point B designates the position in the X-axis direction which is equal to the radius of a rod-lens. The positions A and B are that at which adjacent rod-lenses are contacted in the lower row and upper row, respectively. It is appreciated from FIGS. 43A, 43B and 43C that the difference between the amounts of light at the positions A and B is increased as the position y is shifted, resulting in about 10% difference at y=0.10 mm, for example.

With respect to the rod-lens array 209, the light-emitting element array chips are arrayed in a zigzag manner to form two rows of chips, with one row of chips being opposed to the Y-axis and the other row of chips being opposed to a dotted-line shifted by 0.10 mm in the Y-axis direction. If the junctions of the chips come to the points A and B, then the amount of light is discontinuously varied by 10%.

Figure 44A:
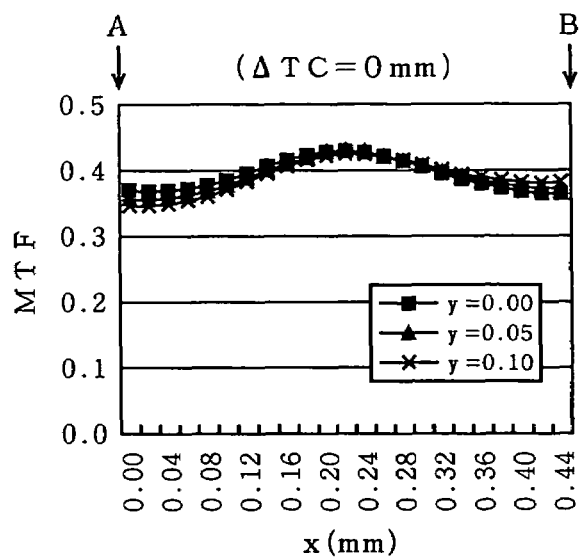
FIGS. 44A, 44B and 44C show MTFs at y=0 mm, 0.05 mm, and 0.10 mm for each case of ΔTC=0 mm, -0.1 mm, and +0.1 mm, respectively.
Figure 44B:
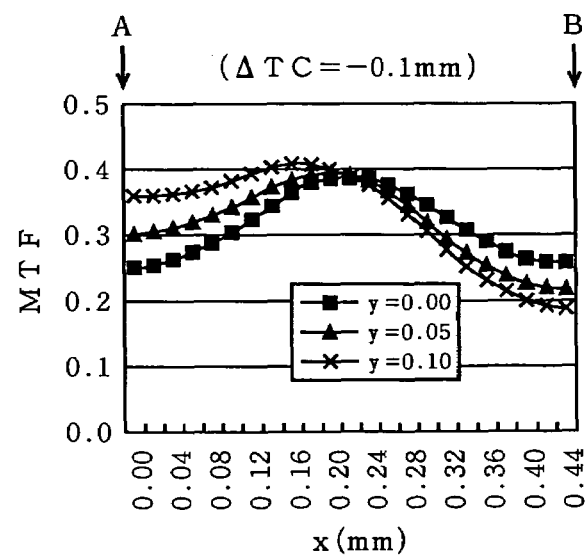
Figure 44C:
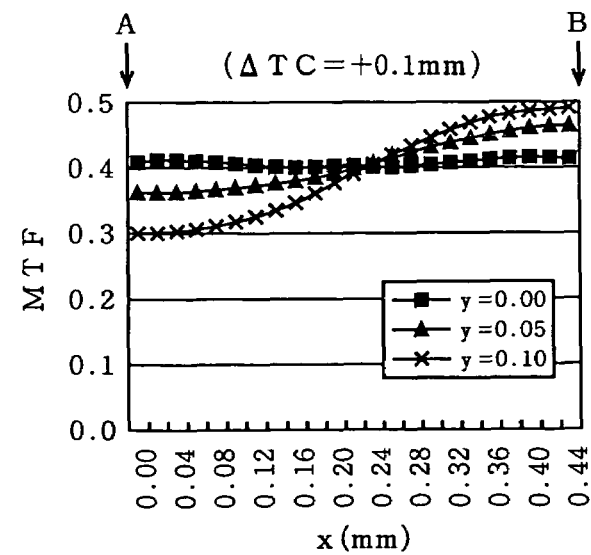

Referring to FIGS. 44A, 44B and 44C, there are shown Modulation Transfer Function (MTF) in a spatial frequency of 24 $L_p$/mm calculated at a wave length of 780 nm for a rod-lens array in which D=0.88 mm, TC=15.3 mm, Z=6.93 mm, $L_o$=4.20 mm, $N_O$=1.625, g=0.531 mm$^{-1}$, $h_4$=0.8, $h_6$=−3.112, and $h_8$=9.205.

FIGS. 44A, 44B and 44C show the MTFs at y=0 mm, 0.05 mm, and 0.10 mm for each case of Δ TC=0 mm, −0.1 mm, and +0.1 mm, respectively, herein ΔTC being a deviation of TC.

The $h_4$, $h_6$ and $h_8$ are index distribution constants of a high order, and the MTF is an index for evaluating an image quality showing an image transfer characteristic of a rod-lens array, which is calculated by the following expression;

$$MTF(W) = \frac{i(w)\max - i(w)\min}{i(w)\max + i(w)\min} \times 100(\%)$$

herein i(w)max and i(w)min are maximum and minimum values of response in a spatial frequency w($L_p$/mm), respectively. As the MTF approaches to 100%, a resolving power becomes larger, i.e., an image which is faithful to an original picture may be formed.

It is appreciated from FIGS. 44A, 44B and 44C that while a problem is no caused when a rod-lens array is used at the best total conjugate length TC in which the MTF is maximum, the effect for MTF variation based on the position in Y-axis direction is larger even for a small TC deviation such as 0.1 mm. For example, the MTF difference between the positions A and B becomes approximately 20%.

Referring to FIG. 45, there is shown an arrangement relation of a rod-lens array 212 and a plurality of light-emitting element array chips arrayed in a zigzag manner, the rod-lens array 212 being composed of rod-lenses 206 each having a diameter D of 0.75 mm stacked triangularly in two rows, and the light-emitting element array chip 214 (having an effective length of 5.4 mm) being composed of 256 light-emitting elements (for example, light-emitting diodes or light-emitting thyristors) arrayed in 1200 dpi. In the figure, 216 and 218 designate frame plates, and 220 designates a black resin. When the junction of the chips comes to the contact position shown by an arrow C between rod-lenses in the upper row, stripes are printed on a paper sheet because the amount of light and MTF are varied discontinuously.

Referring to FIG. 46, there is shown an arrangement relation of a rod-lens array 212 and a plurality of light-emitting elements 222 arrayed in a zigzag manner, the rod-lens array 212 being composed of rod-lenses 206 each having a diameter D of 0.6 mm stacked triangularly in two rows. When the portion between adjacent two light-emitting elements, i.e., one element in the upper row and the other element in the lower row, comes to the contact positions shown by arrows D and F between rod-lenses in the upper row and by an arrow E between rod-lenses in the lower row, stripes are printed on a paper sheet in the same manner as in FIG. 45.

In order to avoid the printing of such stripes, the structure of a rod-lens array is essential. The direction perpendicular to the longitudinal direction of a rod-lens array is now referred to as a thickness direction of the rod-lens array. It is essential that a rod-lens array is structured to be geometrically axisymmetic in the thickness direction, or a rod-lens array is structured by stacking closely two sets of a first and second rod-lens sub-arrays, each set of rod-lens sub-arrays being composed of a plurality of rod-lenses stacked.

With respect to the former rod-lens array shown in FIG. 45 or 46, the light-emitting element array chips or light-emitting elements are arrayed in a zigzag manner to be opposed to axisymmetric two straight lines in a rod-lens array. According to this arrangement, the light-emitting elements are considered to be arrayed in a linear manner viewed from the rod-lens array due to the geometrical axisymmetric of a rod-lens array. Therefore, the amount of light and MTF are not varied discontinuously, even if the junction between light-emitting element array chip or the adjacent portion between light-emitting elements are anywhere.

With respect to the latter rod-lens array structured by stacking sub-arrays, light-emitting element array chips or light-emitting elements are arrayed in a zigzag manner to be opposed to a first longitudinal center line of a first rod-lens sub-array and a second longitudinal center line of a second rod-lens sub-array, or be opposed to two straight lines which are obtained by moving the first and second center lines while maintaining the distance therebetween in the thickness direction of the rod-lens array. According to this arrangement, the light-emitting elements are considered equivalent to be arrayed in a linear manner viewed from the rod-lens array, because two rows of light-emitting elements are equivalent to one row of light-emitting elements in the case that the overlapping degree of a rod-lens array is selected so that light from one row of light-emitting elements does not contribute to the other row of light-emitting elements. Herein, the overlapping degree of a rod-lens array is defined by the ratio of field radius $X_o$ of an image formed by a rod-lens with respect to an array pitch $D_o$ of rod-lenses, i.e., $X_o/D_o$.

First Example

Referring to FIG. 47, there is shown an example in which a plurality of self-scanning light-emitting element array chips 214 are arranged opposing to a rod-lens array 226 composed of odd-numbered rows (three rows in the figure) of rod-lenses 206 stacked triangularly. The rod-lens array 226 has a structure which is geometrically axisymmetiric with respect to an axis 230 corresponding to a longitudinal center line of the center row of rod-lenses. The self-scanning light-emitting element array chips 214 are arranged in a zigzag manner opposing to two lines 242 and 234 which are axisymmetric with respect to the axis 230.

According to the structure of rod-lens array and the arrangement of the light-emitting element array chips with respect to the rod-lens array, a large discontinuous variation of the amount of light and MTF at the junctions of light-emitting array chips may be avoided.

Second Example

Referring to FIG. 48, there is shown an example in which a light-emitting elements array 240 composed of two rows of light-emitting elements arrayed in a zigzag manner is arranged opposing to a rod-lens array 226 composed of three rows of rod-lenses stacked triangularly. In this example, the light-emitting elements 242a and 242b are arrayed in a zigzag manner opposing to two lines 232 and 234 which are axisymmetric with respect to the axis 230.

According to the structure of rod-lens array and the arrangement of light-emitting elements with respect to the rod-lens array, a large discontinuous variation of the amount of light and MTF between adjacent two light-emitting elements 242a and 242b may be avoided.

Third Example

Referring to FIG. 49, there is shown an example in which a plurality of self-scanning light-emitting element array chips 214 are arranged opposing to a rod-lens array 244 composed of rows (two rows in the figure) of rod-lenses 206 stacked tetragonally. Herein, "stacked tetragonally" means that four rod-lenses 206 which are adjacent in up/down and left/right directions are arranged in such a manner that each center thereof are positioned to each vertex of a square. According to the stacking method described above, the rod-lens array has a geometrical axisymmetric structure with respect to the axis 230. The self-scanning light-emitting element array chips 214 are arrayed in a zigzag manner opposing to two lines 232 and 234 which are axisymmetric with respect to the axis 230.

According to the structure of rod-lens array and the arrangement of self-scanning light-emitting elements array chips with respect to the rod-lens array, a large discontinuous variation of the amount of light and MTF at the junctions of light-emitting array chips may be avoided.

Fourth Example

Figure 50:
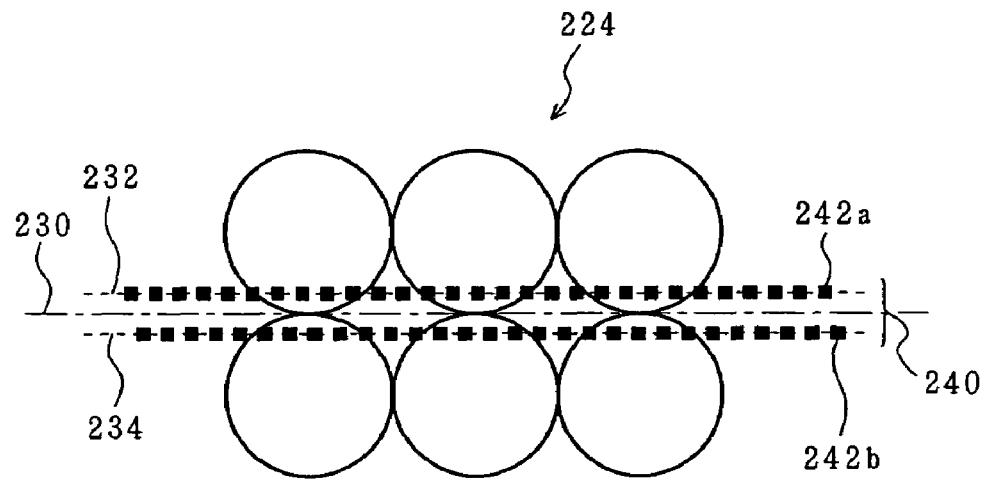
FIG. 50 shows a fourth example of an optical writing head of the present invention.
Figure 51:
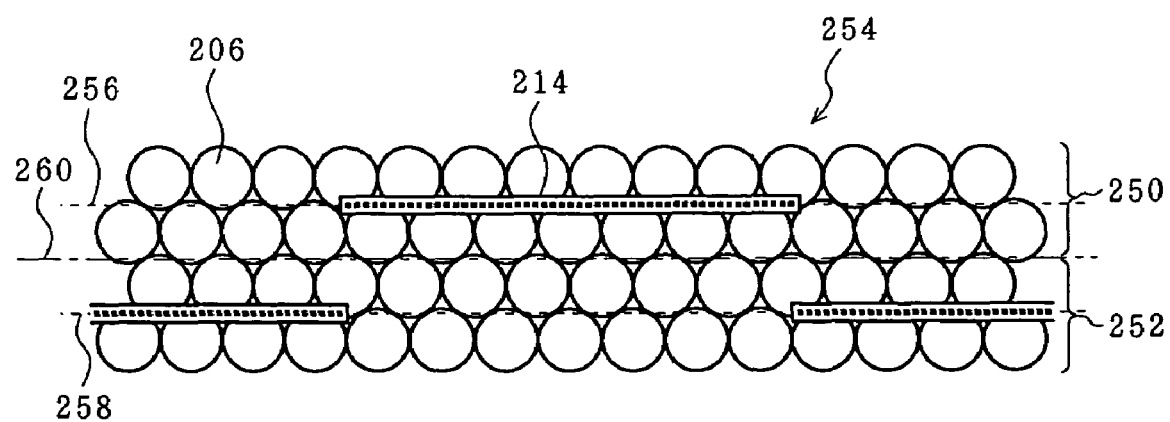
FIG. 51 shows a fifth example of an optical writing head of the present invention.

Referring to FIG. 50, there is shown an example in which a light-emitting elements array 240 composed of two rows of light-emitting elements arrayed in a zigzag manner is arranged opposing to a rod-lens array 226 composed of two rows of rod-lenses stacked triangularly, as shown in FIG. 48. In this example, the light-emitting elements 242a and 242b are arrayed in a zigzag manner opposing to two lines 232 and 234 which are axisymmetric with respect to the axis 230.

According to the structure of rod-lens array and the arrangement of light-emitting elements with respect to the rod-lens array, a large discontinuous variation of the amount of light and MTF between adjacent two light-emitting elements 242a and 242b may be avoided.

Fifth Example

In the four examples described above, a rod-lens array is used which is axisymmetric in a thickness direction thereof. However, the same effect may be obtained, even if a rod-lens array described below which is not axisymmetric in a thickness direction thereof.

Referring to FIG. 49, there is shown a rod-lens array 254 in which two independent sets of rod-lens sub-arrays 250 and 252 are stacked closely, each set of rod-lens sub-arrays being composed of a plurality of rod-lenses 206 stacked triangularly in two rows. In the figure, the longitudinal center lines of respective rod-lens sub-arrays are designated by 256 and 258, respectively, and the longitudinal center lines of the rod-lens array 254 is designated by 260.

The self-scanning light-emitting element array chips 214 are arranged in a zigzag manner opposing to two center lines 256 and 258 of respective rod-lens sub-arrays 250 and 252 of the rod-lens array 254. According to such arrangement of the light-emitting element array chips, the chips are considered equivalent to be arrayed in a linear manner. Therefore, a large discontinuous variation of the amount of light and MTF at the junctions of light-emitting array chips may be avoided.

The same effect may be obtained by arranging the light-emitting element array chips in a zigzag manner opposing two straight lines which are obtained by moving the center lines 256 and 258 while maintaining the distance therebetween in the thickness direction of the rod-lens array 254.

Sixth Example

Referring to FIG. 52, there is shown an example in which a light-emitting elements array 240 composed of light-emitting elements 242a and 242b arrayed in a zigzag manner is arranged opposing to the center lines 256 and 258 of a rod-lens array 254 composed of four rows of rod-lenses stacked triangularly.

According to the structure of rod-lens array and the arrangement of light-emitting elements with respect to the rod-lens array, a large discontinuous variation of the amount of light and MTF between adjacent two light-emitting elements 242a and 242b may be avoided.

The same effect may be obtained by arranging the light-emitting elements in a zigzag manner opposing two straight lines which are obtained by moving the center lines 256 and 258 while maintaining the distance therebetween in the thickness direction of the rod-lens array 254.

According to the present embodiment, in the optical writing head in which the light-emitting element array chips are arrayed in a zigzag manner, or in the optical writing head in which two rows of light-emitting elements are arrayed in a zigzag manner to realize a doubled resolution compared with one row of light-emitting elements, an optical writing head in which stripes are not printed on a paper sheet at the junction of light-emitting element array chips/the positions where adjacent two light-emitting elements may be presented because a large discontinuous variation of the amount of light and MTF at the junctions and positions.

INDUSTRIAL APPLICABILITY

A self-scanning light-emitting element array, a method for driving a self-scanning light-emitting element array and a driver circuit for implementing the method area applicable to an optical writing head of an optical printer so as to realize a high quality of optical writing head.

The invention claimed is:

1. A method for driving a self-scanning light-emitting element array including a self-scanning transfer element array having such a structure that a plurality of three-terminal transfer elements each having a control electrode for controlling a threshold voltage or current are arranged in a linear manner, the control electrodes of the transfer elements neighbored to each other are connected via electrical means having unidirectional characteristic to a voltage or current, two clock pulse lines for applying two-phase clock pulses alternately to one of two terminals except the control electrode of each transfer element are provided, one phase clock pulse of the two-phase clock pulses causes the threshold voltage or current of the transfer elements in the vicinity of a turned-on transfer element to vary via the electrical means, and the other phase clock pulse of the two-phase clock pulses causes the light-emitting element neighbored to the turned-on transfer element to turn on; and a light-emitting element array having such a structure that a plurality of three-terminal light-emitting elements each having a control electrode for controlling a threshold voltage or current are arranged in a linear manner, the control electrodes of the light-emitting element are correspondingly connected to the control electrodes of the transfer elements, and a write signal line for applying a write signal to one of two terminals except the control electrode of each of the light-emitting elements to be illuminated is provided;

the method comprising the steps of:
turning on one transfer element, and
illuminating one light-emitting element corresponding to the turned-on transfer element; or
turning on adjacent two transfer elements simultaneously, and
illuminating adjacent two light-emitting elements corresponding to the turned-on adjacent two transfer element.

2. The method of claim 1, wherein a magnitude of the write signal for illuminating the adjacent two light-emitting elements simultaneously is two times that of the write signal for illuminating one light-emitting element.

3. The method of claim 1 or 2, wherein the self-scanning light-emitting element array is composed of a plurality of self-scanning light-emitting element array chips arranged in a linear manner, and the two-phase clock pulses are applied commonly to the plurality of self-scanning light-emitting element array chips.

4. A method for driving a self-scanning light-emitting element array including a self-scanning transfer element array having such a structure that a plurality of three-terminal a transfer elements each having a control electrode for controlling threshold voltage or current are arranged in a linear manner, the control electrodes of the transfer elements neighbored to each other are connected via electrical means having unidirectional characteristic to a voltage or current, two clock pulse lines for applying two-phase clock pulses alternately to one of two terminals except the control electrode of each transfer element are provided, one phase clock pulse of the two-phase clock pulses causes the threshold voltage or current of the transfer elements in the vicinity of a turned-on transfer element to vary via the electrical means, and the other phase clock pulse of the two-phase clock pulses causes the light-emitting element neighbored to the turned-on transfer element to turn on; and a light-emitting element array having such a structure that a plurality of three-terminal light-emitting elements each having a control electrode for controlling a threshold voltage or current are arranged in a linear manner, the control electrodes of the light-emitting element are correspondingly connected to the control electrodes of the transfer elements, and a write signal line for applying a write signal to one of two terminals except the control electrode of each of the light-emitting elements to be illuminated is provided;

the method comprising the steps of:
providing a pattern in which an on-state is transferred in adjacent two transfer elements not to illuminate both of adjacent two light-emitting elements corresponding the adjacent two transfer elements, and a pattern in which an on-state is transferred in adjacent two transfer elements to illuminate one of adjacent two light-emitting elements corresponding the turned-on transfer element, and a pattern in which adjacent two transfer elements are turned on simultaneously to illuminate both of adjacent two light-emitting elements corresponding the adjacent two transfer elements simultaneously,
combining the patterns to illuminate the light-emitting elements.

5. The method of claim 1 or 4, wherein each of the transfer element and light-emitting element is a three-terminal thyristor of pnpn-structure.

6. A self-scanning light-emitting element array comprising:
a self-scanning transfer element array having such a structure that a plurality of three-terminal transfer elements each having a control electrode for controlling a threshold voltage or current are arranged in a linear manner, the control electrodes of the transfer elements neighbored to each other are connected via electrical means having unidirectional characteristic to a voltage or current, two clock pulse lines for applying two-phase clock pulses alternately to one of two terminals except the control electrode of each transfer element are provided, one phase clock pulse of the two-phase clock pulses causes the threshold voltage or current of the transfer elements in the vicinity of a turned-on transfer element to vary via the electrical means, and the other phase clock pulse of the two-phase clock pulses causes the light-emitting element neighbored to the turned-on transfer element to turn on; and
a light-emitting element array having such a structure that a plurality of three-terminal light-emitting elements each having a control electrode for controlling a threshold voltage or current are arranged in a linear manner, the control electrodes of the light-emitting element are correspondingly connected to the control electrodes of the transfer elements, and a write signal line for applying a write signal to one of two terminals except the control electrode of each of the light-emitting elements to be illuminated is provided;
wherein one of two terminals except the control electrode of each of the light-emitting elements is connected to the write signal line through a resistor, respectively.

7. The self-scanning light-emitting element array of claim 6, wherein a resistance of the resistor is selected such that a current applied to one light-emitting element does not illuminate a light-emitting element neighbored thereto, but a current the value thereof is two times that of the current applied to said one light-emitting element illuminates the neighbored light-emitting element together with said one light-emitting element.

8. The light-emitting element array of claim 7, wherein each of the transfer element and light-emitting element is a three-terminal thyristor of pnpn-structure.

9. A method for driving a self-scanning light-emitting element array of claim 6, the method comprising a step of controlling the write signal applied to said one terminal of the light-emitting element corresponding to the transfer element turned on for both the case in which one light-emitting element is illuminated and the case in which adjacent two light-emitting elements are illuminated simultaneously.

10. A method for driving a self-scanning light-emitting element array of claim 9, the method comprising a step of controlling the write signal in every the two-phase clock pulse to illuminate the adjacent two light-emitting elements simultaneously.

11. A self-scanning light-emitting element array chip comprising:
- a first circuit including,
  - a self-scanning transfer element array having such a structure that a plurality of three-terminal transfer elements each having a control electrode for controlling a threshold voltage or current are arranged in a linear manner, the control electrodes of the transfer elements neighbored to each other are connected via electrical means having unidirectional characteristic to a voltage or current, two clock pulse lines for applying two-phase clock pulses alternately to one of two terminals except the control electrode of each transfer element are provided, one phase clock pulse of the two-phase clock pulses causes the threshold voltage or current of the transfer elements in the vicinity of a turned-on transfer element to vary via the electrical means, and the other phase clock pulse of the two-phase clock pulses causes the light-emitting element neighbored to the turned-on transfer element to turn on, and
  - a light-emitting element array having such a structure that a plurality of three-terminal light-emitting elements each having a control electrode for controlling a threshold voltage or current are arranged in a linear manner, the control electrodes of the light-emitting element are correspondingly connected to the control electrodes of the transfer elements, and a write signal line for applying a write signal to one of two terminals except the control electrode of each of the light-emitting elements to be illuminated is provided;
- a second circuit including,
  - a self-scanning transfer element array having such a structure that a plurality of three-terminal transfer elements each having a control electrode for controlling a threshold voltage or current are arranged in a linear manner, the control electrodes of the transfer elements neighbored to each other are connected via electrical means having unidirectional characteristic to a voltage or current, two clock pulse lines for applying two-phase clock pulses alternately to one of two terminals except the control electrode of each transfer element are provided, one phase clock pulse of the two-phase clock pulses causes the threshold voltage or current of the transfer elements in the vicinity of a turned-on transfer element to vary via the electrical means, and the other phase clock pulse of the two-phase clock pulses causes the light-emitting element neighbored to the turned-on transfer element to turn on, and
  - a light-emitting element array having such a structure that a plurality of three-terminal light-emitting elements each having a control electrode for controlling a threshold voltage or current are arranged in a linear manner, the control electrodes of the light-emitting element are correspondingly connected to the control electrodes of the transfer elements, and a write signal line for applying a write signal to one of two terminals except the control electrode of each of the light-emitting elements to be illuminated is provided; and
- one power supply line connected through respective load resistors to respective control electrodes of the transfer elements in the first and second circuits.

12. A self-scanning light-emitting element array chip comprising:
- a first circuit including,
  - a self-scanning transfer element array having such a structure that a plurality of three-terminal transfer elements each having a control electrode for controlling a threshold voltage or current are arranged in a linear manner, the control electrodes of the transfer elements neighbored to each other are connected via electrical means having unidirectional characteristic to a voltage or current, two clock pulse lines for applying two-phase clock pulses alternately to one of two terminals except the control electrode of each transfer element are provided, one phase clock pulse of the two-phase clock pulses causes the threshold voltage or current of the transfer elements in the vicinity of a turned-on transfer element to vary via the electrical means, and the other phase clock pulse of the two-phase clock pulses causes the light-emitting element neighbored to the turned-on transfer element to turn on, and
  - a light-emitting element array having such a structure that a plurality of three-terminal light-emitting elements each having a control electrode for controlling a threshold voltage or current are arranged in a linear manner, the control electrodes of the light-emitting element are correspondingly connected to the control electrodes of the transfer elements, and a write signal line for applying a write signal to one of two terminals except the control electrode of each of the light-emitting elements to be illuminated is provided;
- a second circuit including,
  - a self-scanning transfer element array having such a structure that a plurality of three-terminal transfer elements each having a control electrode for controlling a threshold voltage or current are arranged in a linear manner, the control electrodes of the transfer elements neighbored to each other are connected via electrical means having unidirectional characteristic to a voltage or current, two clock pulse lines for applying two-phase clock pulses alternately to one of two terminals except the control electrode of each transfer element are provided, one phase clock pulse of the two-phase clock pulses causes the threshold voltage or current of the transfer elements in the vicinity of a turned-on transfer element to vary via the electrical means, and the other phase clock pulse of the two-phase clock pulses causes the light-emitting element neighbored to the turned-on transfer element to turn on, and a light-emitting element array having such a structure that a plurality of three-terminal light-emitting elements each having a control electrode for controlling a threshold voltage or current are arranged in a linear manner, the control electrodes of the light-emitting element are correspondingly connected to the control electrodes of the transfer elements, and a write signal line for applying a write signal to one of two terminals except the control electrode of each of the light-emitting elements to be illuminated is provided;

two clock pulse lines connected to each other for applying one phase clock pulse to the first and second circuits;

two clock pulse lines connected to each other for applying the other phase clock pulse to the first and second circuits; and one power supply line connected through respective load resistors to respective control electrodes of the transfer elements in the first and second circuits.

13. A self-scanning light-emitting element array chip comprising:

a first circuit including, a self-scanning transfer element array having such a structure that a plurality of three-terminal transfer elements each having a control electrode for controlling a threshold voltage or current are arranged in a linear manner, the control electrodes of the transfer elements neighbored to each other are connected via electrical means having unidirectional characteristic to a voltage or current, two clock pulse lines for applying two-phase clock pulses alternately to one of two terminals except the control electrode of each transfer element are provided, one phase clock pulse of the two-phase clock pulses causes the threshold voltage or current of the transfer elements in the vicinity of a turned-on transfer element to vary via the electrical means, and the other phase clock pulse of the two-phase clock pulses causes the light-emitting element neighbored to the turned-on transfer element to turn on, and a light-emitting element array having such a structure that a plurality of three-terminal light-emitting elements each having a control electrode for controlling a threshold voltage or current are arranged in a linear manner, the control electrodes of the light-emitting element are correspondingly connected to the control electrodes of the transfer elements, and a write signal line for applying a write signal to one of two terminals except the control electrode of each of the light-emitting elements to be illuminated is provided;

a second circuit including, a self-scanning transfer element array having such a structure that a plurality of three-terminal transfer elements each having a control electrode for controlling a threshold voltage or current are arranged in a linear manner, the control electrodes of the transfer elements neighbored to each other are connected via electrical means having unidirectional characteristic to a voltage or current, two clock pulse lines for applying two-phase clock pulses alternately to one of two terminals except the control electrode of each transfer element are provided, one phase clock pulse of the two-phase clock pulses causes the threshold voltage or current of the transfer elements in the vicinity of a turned-on transfer element to vary via the electrical means, and the other phase clock pulse of the two-phase clock pulses causes the light-emitting element neighbored to the turned-on transfer element to turn on, and a light-emitting element array having such a structure that a plurality of three-terminal light-emitting elements each having a control electrode for controlling a threshold voltage or current are arranged in a linear manner, the control electrodes of the light-emitting element are correspondingly connected to the control electrodes of the transfer elements, and a write signal line for applying a writer signal to one of two terminals except the control electrode of each of the light-emitting elements to be illuminated is provided; and one power supply line connected through respective load resistors to respective control electrodes of the transfer elements in the first and second circuits, wherein one of the two clock pulse lines is connected through a diode to the control electrode of a transfer element to be first turned on in the first circuit, and one of the two clock pulse lines is connected through a diode to the control electrode of a transfer element to be first turned on in the second circuit.

14. A self-scanning light-emitting element array chip comprising:

a first circuit including, a self-scanning transfer element array having such a structure that a plurality of three-terminal transfer elements each having a control electrode for controlling a threshold voltage or current are arranged in a linear manner, the control electrodes of the transfer elements neighbored to each other are connected via electrical means having unidirectional characteristic to a voltage or current, two clock pulse lines for applying two-phase clock pulses alternately to one of two terminals except the control electrode of each transfer element are provided, one phase clock pulse of the two-phase clock pulses causes the threshold voltage or current of the transfer elements in the vicinity of a turned-on transfer element to vary via the electrical means, and the other phase clock pulse of the two-phase clock pulses causes the light-emitting element neighbored to the turned-on transfer element to turn on, and a light-emitting element array having such a structure that a plurality of three-terminal light-emitting elements each having a control electrode for controlling a threshold voltage or current are arranged in a linear manner, the control electrodes of the light-emitting element are correspondingly connected to the control electrodes of the transfer elements, and a write signal line for applying a write signal to one of two terminals except the control electrode of each of the light-emitting elements to be illuminated is provided;

a second circuit including, a self-scanning transfer element array having such a structure that a plurality of three-terminal transfer elements each having a control electrode for controlling a threshold voltage or current are arranged in a linear manner, the control electrodes of the transfer elements neighbored to each other are connected via electrical means having unidirectional characteristic to a voltage or current, two clock pulse lines for applying two-phase clock pulses alternately to one of two terminals except the control electrode of each transfer element are provided, one phase clock pulse of the two-phase clock pulses causes the threshold voltage or current of the transfer elements in the vicinity of a turned-on transfer element to vary via the electrical means, and the other phase clock pulse of the two-phase clock pulses causes the light-emitting element neighbored to the turned-on transfer element to turn on, and a light-emitting element array having such a structure that a plurality of three-terminal light-emitting elements each having a control electrode for controlling a threshold voltage or current are arranged in a linear manner, the control electrodes of the light-emitting element are correspondingly connected to the control electrodes of the transfer elements, and a write signal line for applying a write signal to one of two terminals except the control electrode of each of the light-emitting elements to be illuminated is provided; and one first clock pulse line for applying one phase clock pulse to the first and second circuits;

one first current limiting resistor provided in the first clock pulse line, one second clock pulse line for applying the other phase clock pulse to the first and second circuits;

one second current limiting resistor provided in the second clock pulse line, a third resistor provided between a terminal of each transfer element and the first or second clock pulse line; and one power supply line connected through respective load resistors to respective control electrodes of the transfer elements in the first and second circuits.

15. The self-scanning light-emitting element array chip of claim 14, wherein each resistance of the first and second current limiting resistors and a resistance of the third resistor are determined so that one transfer element of the first circuit and one transfer element of the second circuit are turned on simultaneously.

16. The self-scanning light-emitting element array chip of any one of claims 11-15, wherein each write signal line of the first and second circuits is divided into two write signal lines, and respective terminals of the light-emitting elements are alternately connected to the divided two write signal lines.

17. The self-scanning light-emitting element array chip of any one of claims 11-15, wherein each of the transfer element and light-emitting element is a three-terminal thyristor of pnpn-structure.

18. A method for driving a self-scanning light-emitting element array including a self-scanning transfer element array having such a structure that a plurality of three-terminal transfer elements each having a control electrode for a controlling threshold voltage or current are arranged in a linear manner, the control electrodes of the transfer elements neighbored to each other are connected via electrical means having unidirectional characteristic to a voltage or current, m (m is an integer of 2 or more) clock pulse lines for applying m-phase clock pulses in turn to one of two terminals except the control electrode of each transfer element are provided, one of the m-phase clock pulses causes the threshold voltage or current of the transfer elements in the vicinity of a turned-on transfer element to vary via the electrical means, and another one of the m-phase clock pulses causes the light-emitting element neighbored to the turned-on transfer element to turn on; and a light-emitting element array having such a structure that a plurality of three-terminal light-emitting elements each having a control electrode for controlling a threshold voltage or current are arranged in a linear manner, the control electrodes of the light-emitting element are correspondingly connected to the control electrodes of the transfer elements, and a write signal line for applying a current to one of two terminals except the control electrode of each of the light-emitting elements to be illuminated is provided;

the method comprising a step of:

precharging each of the clock pulse lines to a predetermined voltage prior to turn on each of the transfer-elements, the predetermined voltage being smaller than $V_t$ which is a voltage of the clock pulse to turn on the transfer element.

19. The method of claim 18, wherein each of the transfer element and light-emitting element is a three-terminal thyristor of pnpn-structure.

20. The method of claim 19, wherein the duration of the voltage $V_t$ of the clock pulse is at least a duration during which a holding current is caused to be flown to the transfer element.

21. The method of claim 19 or 20, wherein the voltage $V_t$ is 3.3V.

22. A driver circuit for driving a self-scanning light-emitting element array including a self-scanning transfer element array having such a structure that a plurality of three-terminal transfer elements each having a control electrode for controlling a threshold voltage or current are arranged in a linear manner, the control electrodes of the transfer elements neighbored to each other are connected via electrical means having unidirectional characteristic to a voltage or current, m (m is an integer of 2 or more) clock pulse lines for applying m-phase clock pulses in turn to one of two terminals except the control electrode of each transfer element are provided, one of the m-phase clock pulses causes the threshold voltage or current of the transfer elements in the vicinity of a turned-on transfer element to vary via the electrical means, and the another one of the m-phase clock pulses causes the light-emitting element neighbored to the turned-on transfer element to turn on; and a light-emitting element array having such a structure that a plurality of three-terminal light-emitting elements each having a control electrode for controlling a threshold voltage or current are arranged in a linear manner, the control electrodes of the light-emitting element are correspondingly connected to the control electrodes of the transfer elements, and a write signal line for applying a current to one of two terminals except the control electrode of each of the light-emitting elements to be illuminated is provided;

the driver circuit comprising:

a first voltage supply for applying a voltage $V_t$ which is a voltage of the clock pulse to turn on the transfer element;

a second voltage supply for applying a voltage which is smaller than the voltage $V_t$; and a switch circuit for setting the voltage of each of the clock pulse lines to the voltage $V_t$ after precharging each of the clock pulse lines to a voltage smaller than the voltage $V_t$ prior to turn on each of the transfer-elements by using the first and second voltage supplies.

23. A driver circuit for driving a self-scanning light-emitting element array including a self-scanning transfer element array having such a structure that a plurality of three-terminal transfer elements each having a control electrode for controlling a threshold voltage or current are arranged in a linear manner, the control electrodes of the transfer elements neighbored to each other are connected via electrical means having unidirectional characteristic to a voltage or current, m (m is an integer of 2 or more) clock pulse lines for applying m-phase clock pulses in turn to one of two terminals except the control electrode of each transfer element are provided, one of the m-phase clock pulses causes the threshold voltage or current of the transfer elements in the vicinity of a turned-on transfer element to vary via the electrical means, and the another one of the m-phase clock pulses causes the light-emitting element neighbored to the turned-on transfer element to turn on; and a light-emitting element array having such a structure that a plurality of three-terminal light-emitting elements each having a control electrode for controlling a threshold voltage or current are arranged in a linear manner, the control electrodes of the light-emitting element are correspondingly connected to the control electrodes of the transfer elements, and a write signal line for applying a current to one of two terminals except the control electrode of each of the light-emitting elements to be illuminated is provided;

the driver circuit comprising:

a voltage supply for applying a voltage $V_t$ which is a voltage of the clock pulse to turn on the transfer element; and a switch circuit for setting the voltage of each of the clock pulse lines to the voltage $V_t$ after precharging each of the clock pulse lines to a voltage smaller than the voltage $V_t$ prior to turn on each of the transfer-elements by using the voltage supply.

24. The driver circuit of claim 23, wherein the switch circuit includes two current sources.

25. The driver circuit of claim 23, wherein the duration of the voltage $V_t$ of the clock pulse is a duration during which a holding current is caused to be flown to the transfer element.

26. The driver circuit of claim 22 or 23, wherein the voltage $V_t$ is 3.3V.

27. An optical writing head comprising:

a rod-lens array composed of a plurality of rod-lenses stacked and arranged so as to be geometrically axisymmetric in a thickness direction thereof; and a light-emitting element array composed of a plurality of light-emitting element array chips arranged in a zigzag manner opposing to the rod-lens array, each light-emitting element array chip including a plurality of light-emitting elements arranged in a linear manner;

wherein the light-emitting element array chips are arranged in a zigzag manner opposing to two lines which are axisymmetric in the rod-lens array.

28. An optical writing head comprising:

a rod-lens array composed of a plurality of rod-lenses stacked and arranged so as to be geometrically axisymmetric in a thickness direction thereof; and a light-emitting element array composed of a plurality of light-emitting elements arranged in a zigzag manner opposing to the rod-lens array to form two rows of light-emitting elements, wherein the light-emitting elements are arranged in a zigzag manner opposing to two lines which are axisymmetric in the rod-lens array.

29. The optical writing head of claim 27 or 28, wherein the rod-lens array are composed of odd-numbered rows of rod-lenses stacked triangularly.

30. The optical writing head of claim 27 or 28, wherein the rod-lens array are composed of a plurality of rod-lenses stacked tetragonally.

31. An optical writing head comprising:

a rod-lens array composed of first and second sets of rod-lens sub-arrays stacked closely, each set of rod-lens sub-array consisting of a plurality rod-lenses stacked; and a light-emitting element array composed of a plurality of light-emitting element array chip arranged in a zigzag manner opposing to the rod-lens array, each light-emitting element array including a plurality of light-emitting elements arranged in a linear manner;

wherein the light-emitting element array chips are arranged in a zigzag manner opposing to two lines which are obtained by moving a longitudinal first center line of the first set of rod-lens sub-array and a longitudinal second center line of the second set of rod-lens sub-array while maintaining the distance therebetween in a thickness direction of the rod-lens array.

32. An optical writing head comprising:

a rod-lens array composed of first and second sets of rod-lens sub-arrays stacked closely, each set of rod-lens sub-array consisting of a plurality rod-lenses stacked; and a light-emitting element array composed of a plurality of light-emitting elements arranged in a zigzag manner opposing to the rod-lens array to form two rows of light-emitting elements, wherein the plurality of light-emitting elements are arranged in a zigzag manner opposing to two lines which are obtained by moving a longitudinal first center line of the first set of rod-lens sub-array and a longitudinal second center line of the second set of rod-lens sub-array while maintaining the distance therebetween in a thickness direction of the rod-lens array.

33. The optical writing head of claim 31 or 32, wherein the rod-lens array are composed of even-numbered rows of rod-lenses stacked triangularly, the even-numbered rows of rod-lenses being four or more of rod-lenses.

34. A method for arranging a rod-lens array and a light-emitting element array, comprising the steps of:

providing a rod-lens array composed of a plurality of rod-lenses stacked and arranged so as to be geometrically axisymmetric in a thickness direction thereof; and arranging light-emitting element array chips in a zigzag manner opposing to two lines which are axisymmetric in the rod-lens array, each light-emitting element array chip including a plurality of light-emitting elements arranged in a linear manner.

35. A method for arranging a rod-lens array and a light-emitting element array, comprising the steps of:

providing a rod-lens array composed of a plurality of rod-lenses stacked and arranged so as to be geometrically axisymmetric in a thickness direction thereof; and arranging light-emitting elements are arranged in a zigzag manner opposing to two lines which are axisymmetric in the rod-lens array.

36. A method for arranging a rod-lens array and a light-emitting element array, comprising the steps of:

providing a rod-lens array composed of first and second sets of rod-lens sub-arrays stacked closely, each set of rod-lens sub-array consisting of a plurality rod-lenses stacked; and arranging light-emitting element array chips in a zigzag manner opposing to two lines which are obtained by moving a longitudinal first center line of the first set of rod-lens sub-array and a longitudinal second center line of the second set of rod-lens sub-array while maintaining the distance therebetween in a thickness direction of the rod-lens array.

37. A method for arranging a rod-lens array and a light-emitting element array, comprising the steps of:
providing a rod-lens array composed of first and second sets of rod-lens sub-arrays stacked closely, each set of rod-lens sub-array consisting of a plurality rod-lenses stacked; and
arranging a plurality of light-emitting elements in a zigzag manner opposing to two lines which are obtained by moving a longitudinal first center line of the first set of rod-lens sub-array and a longitudinal second center line of the second set of rod-lens sub-array while maintaining the distance therebetween in a thickness direction of the rod-lens array.

* * * * *